United States Patent
Park et al.

(10) Patent No.: US 12,095,554 B2
(45) Date of Patent: Sep. 17, 2024

(54) BROADCAST SIGNAL TRANSMITTING DEVICE AND BROADCAST SIGNAL TRANSMITTING METHOD WHICH USE CHANNEL BONDING

(71) Applicant: ELECTRONICS AND TELECOMMUNICATIONS RESEARCH INSTITUTE, Daejeon (KR)

(72) Inventors: Sung-Ik Park, Daejeon (KR); Jae-Young Lee, Daejeon (KR); Sun-Hyoung Kwon, Daejeon (KR); Nam-Ho Hur, Sejong (KR); Heung-Mook Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/165,876

(22) Filed: Feb. 7, 2023

(65) Prior Publication Data

US 2023/0188255 A1 Jun. 15, 2023

Related U.S. Application Data

(63) Continuation of application No. 17/397,843, filed on Aug. 9, 2021, now Pat. No. 11,606,168, which is a
(Continued)

(30) Foreign Application Priority Data

Nov. 3, 2017 (KR) .......................... 10-2017-0145958
Oct. 30, 2018 (KR) .......................... 10-2018-0131137

(51) Int. Cl.
*H04K 1/10* (2006.01)
*H04J 99/00* (2009.01)
(Continued)

(52) U.S. Cl.
CPC ............ *H04L 1/0041* (2013.01); *H04J 99/00* (2022.08); *H04L 1/0057* (2013.01);
(Continued)

(58) Field of Classification Search
CPC ... H04L 1/0041; H04L 1/0057; H04L 5/0014; H04L 5/0075; H04L 1/0071; H04L 27/2626; H04L 1/0058; H04J 99/00
(Continued)

(56) References Cited

U.S. PATENT DOCUMENTS

2016/0352873 A1  12/2016  Oh et al.
2017/0019207 A1   1/2017  Park et al.
(Continued)

FOREIGN PATENT DOCUMENTS

KR   20170094187 A      8/2017
WO   WO2016072747 A1    5/2016
WO   WO2017146157 A1    8/2017

OTHER PUBLICATIONS

Search Report for International Application No. PCT/KR2018/013123 dated Feb. 7, 2019.
(Continued)

*Primary Examiner* — Phuong Phu

(57) ABSTRACT

An apparatus and method for transmitting broadcast signal to which channel bonding is applied are disclosed. The apparatus according to the present invention includes an input formatting unit configured to generate baseband packets corresponding to a plurality of packet types using data corresponding to a physical layer pipe; a stream partitioner configured to partition the baseband packets into a plurality of partitioned streams corresponding to the plurality of packet types; BICM units configured to perform error correction encoding, interleaving and modulation corresponding to the plurality of partitioned streams, respectively; and
(Continued)

waveform generators configured to generate RF transmission signals corresponding to the plurality of partitioned streams, respectively.

6 Claims, 37 Drawing Sheets

Related U.S. Application Data continuation of application No. 16/760,000, filed as application No. PCT/KR2018/013123 on Oct. 31, 2018, now Pat. No. 11,128,509.

(51) Int. Cl.
  *H04L 1/00* (2006.01)
  *H04L 5/00* (2006.01)
  *H04L 27/28* (2006.01)
  *H04L 27/26* (2006.01)

(52) U.S. Cl.
  CPC .......... *H04L 1/0071* (2013.01); *H04L 5/0014* (2013.01); *H04L 5/0075* (2013.01); *H04L 27/2626* (2013.01)

(58) Field of Classification Search
  USPC ................................ 375/260, 346, 347, 349
  See application file for complete search history.

(56) References Cited

U.S. PATENT DOCUMENTS

2017/0134046 A1* 5/2017 Myung ................. H04L 1/0058
2017/0366381 A1 12/2017 Zoellner et al.

OTHER PUBLICATIONS

Telecommunications Technology Association, "Transmission and Reception for Terrestrial UHDTV Broadcasting Service", TTAK.KO-07.0127 /R1, TTA Standard, Dec. 2016.

* cited by examiner $$\begin{pmatrix} g_{i,1} \\ g_{i,2} \end{pmatrix} = \begin{pmatrix} 1 & 0 \\ 0 & 1 \end{pmatrix} \cdot \begin{pmatrix} S_{i,1} \\ S_{i,2} \end{pmatrix} \text{ for i even}$$

$$\begin{pmatrix} g_{i,1} \\ g_{i,2} \end{pmatrix} = \begin{pmatrix} 0 & 1 \\ 1 & 0 \end{pmatrix} \cdot \begin{pmatrix} S_{i,1} \\ S_{i,2} \end{pmatrix} \text{ for i odd,}$$

FIG. 25

BROADCAST SIGNAL TRANSMITTING DEVICE AND BROADCAST SIGNAL TRANSMITTING METHOD WHICH USE CHANNEL BONDING

CROSS-REFERENCE TO RELATED APPLICATION

This application is a continuation of U.S. patent application Ser. No. 17/397,843, filed Aug. 9, 2021, which is a continuation of U.S. patent application Ser. No. 16/760,000, filed Apr. 28, 2020, now U.S. Pat. No. 11,128,509, and claims priority to PCT application no. PCT/KR2018/013123 filed Oct. 31, 2018, which claims priority to Korean application No. 10-2018-0131137 filed Oct. 30, 2018 and Korean application No. 10-2017-0145958 filed Nov. 3, 2017, the contents of which are incorporated by reference.

TECHNICAL FIELD

The present invention relates to broadcast signal transmission/reception technology that is used in a broadcasting system and, more particularly, to a broadcast signal transmission/reception system that transmits/receives data using two or more RF channels.

BACKGROUND ART

Bit-Interleaved Coded Modulation (BICM) is bandwidth-efficient transmission technology, and is implemented in such a manner that an error-correction coder, a bit-by-bit interleaver and a high-order modulator are combined with one another.

BICM can provide excellent performance using a simple structure because it uses a low-density parity check (LDPC) coder or a Turbo coder as the error-correction coder. Furthermore, BICM can provide high-level flexibility because it can select modulation order and the length and code rate of an error correction code in various forms. Due to these advantages, BICM has been used in broadcasting standards, such as DVB-T2 and DVB-NGH, and has a strong possibility of being used in other next-generation broadcasting systems.

To support multiple services at the same time, multiplexing, i.e., the process of mixing a plurality of signals, is required. Of multiplexing techniques, currently widely used techniques include Time Division Multiplexing (TDM) adapted to divide and use time resources and Frequency Division Multiplexing (FDM) adapted to divide and use frequency resources. That is, TDM is a method of assigning time segments to respective services, and FDM is a technique for assigning frequency resource segments to respective services and then using them. Recently, there is an urgent need for new multiplexing technology that is applicable to a next generation broadcasting system and provides greater flexibility and performance than TDM and FDM.

DISCLOSURE

Technical Problem

An object of the present invention is to generate baseband packets with a proper size corresponding to each RF channel when channel bonding is performed using two or more RF channels.

Furthermore, an object of the present invention is to generate each partitioned stream corresponding to each RF channel efficiently by assigning baseband packets corresponding to each RF channel with a proper ratio when the channel bonding is performed.

Furthermore, an object of the present invention is to assign baseband packets for channel bonding to a plurality of RF channels properly so that receivers are able to operate efficiently.

Technical Solution

In order to accomplish the above objects, the present invention provides an apparatus for transmitting broadcast signal, comprising: an input formatting unit configured to generate baseband packets corresponding to a plurality of packet types using data corresponding to one physical layer pipe (PLP); a stream partitioner configured to partition the baseband packets into a plurality of partitioned streams corresponding to the plurality of packet types; BICM units configured to perform error correction encoding, interleaving and modulation corresponding to the plurality of partitioned streams, respectively; and waveform generators configured to generate RF transmission signals corresponding to the plurality of partitioned streams, respectively.

In this case, the BICM units may perform the error correction encoding, the interleaving and the modulation for each of the plurality of partitioned streams individually.

In this case, the packet types may be one-to-one mapped to RF channels to be channel bonded.

In this case, the input formatting unit may generate baseband packets corresponding to one of the plurality of packet types using a baseband packet length corresponding to BICM parameters for one of the RF channels.

In this case, the BICM parameters may include at least one of a FEC type parameter, a code rate parameter and a modulation parameter corresponding to the one of the RF channels.

In this case, the input formatting unit may decide the number ($N_{BBpacket}$) of consecutive baseband packets for each of the packet types, and allocate consecutively as many baseband packets as the number of consecutive baseband packets corresponding to each of the packet types.

In this case, the stream partitioner may perform partitioning using the number of consecutive baseband packets corresponding to each of the packet types.

In this case, the stream partitioner may allocate no more than 5 consecutive baseband packets to the same RF channel.

In this case, the baseband packets may include baseband packets corresponding to two or more different baseband packet lengths.

In this case, the partitioned streams may be identified corresponding to a combination of a RF channel identifier (L1D_rf_id) corresponding to one of the RF channels and a physical layer pipe identifier (L1D_plp_id) corresponding to the physical layer pipe.

Furthermore, an embodiment of the present invention provides a method of transmitting broadcast signal, comprising: generating baseband packets corresponding to a plurality of packet types using data corresponding to one physical layer pipe (PLP); partitioning the baseband packets into a plurality of partitioned streams corresponding to the plurality of packet types; performing error correction encoding, interleaving and modulation corresponding to each of the plurality of partitioned streams; and generating RF transmission signals corresponding to the plurality of partitioned streams, respectively.

In this case, the performing error correction encoding, interleaving and modulation may be performed individually for each of the plurality of partitioned streams.

In this case, the packet types may be one-to-one mapped to RF channels to be channel bonded.

In this case, the generating baseband packets may generate baseband packets corresponding to one of the plurality of packet types using a baseband packet length corresponding to BICM parameters for one of the RF channels.

In this case, the BICM parameters may include at least one of a FEC type parameter, a code rate parameter and a modulation parameter corresponding to the one of the RF channels.

In this case, the generating baseband packets may decide the number ($N_{BBpacket}$) of consecutive baseband packets for each of the packet types, and allocate consecutively as many baseband packets as the number of consecutive baseband packets corresponding to each of the packet types.

In this case, the partitioning may be performed using the number of consecutive baseband packets corresponding to each of the packet types.

In this case, the partitioning may allocate no more than 5 consecutive baseband packets to the same RF channel.

In this case, the baseband packet may include baseband packets corresponding to two or more different baseband packet lengths.

In this case, the partitioned streams may be identified corresponding to a combination of a RF channel identifier (L1D_rf_id) corresponding to one of the RF channels and a physical layer pipe identifier (L1D_plp_id) corresponding the physical layer pipe.

Advantageous Effects

According to the present invention, baseband packets corresponding to each RF channel are generated with a proper size when channel bonding is performed using two or more RF channels.

Furthermore, according to the present invention, each partitioned stream corresponding to each RF channel is generated efficiently by assigning baseband packets corresponding to each RF channel with a proper ratio when the channel bonding is performed.

Furthermore, according to the present invention, receivers are able to operate efficiently by assigning baseband packets for channel bonding to a plurality of RF channels properly.

DESCRIPTION OF DRAWINGS

FIG. 25 is a diagram for mathematically expressing the output of the cell exchanger;

MODE FOR INVENTION

Figure 1:
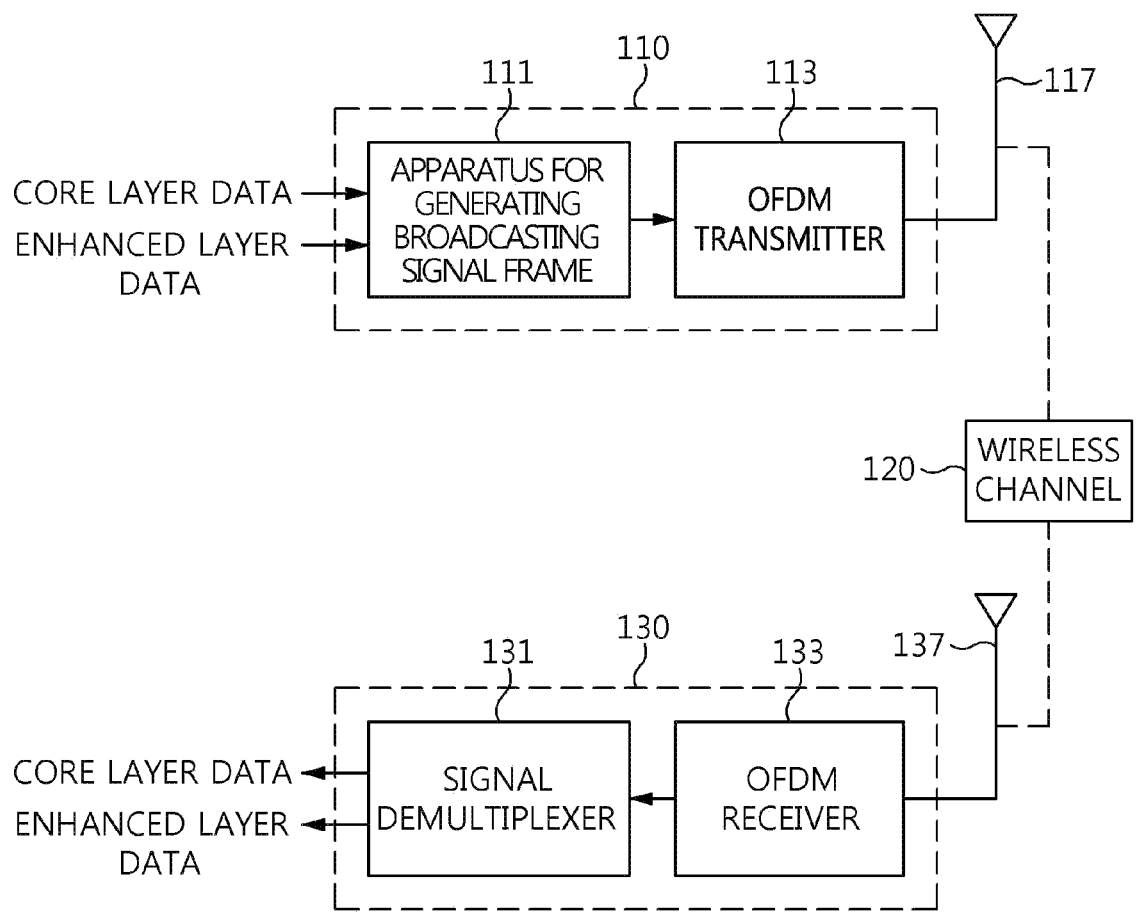
FIG. 1 is a block diagram showing a broadcast signal transmission/reception system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram showing a broadcast signal transmission/reception system according to an embodiment of the present invention.

Referring to FIG. 1, a broadcast signal transmission/reception system according to the embodiment of the present invention includes a broadcast signal transmission apparatus 110, a wireless channel 120, and a broadcast signal reception apparatus 130.

The broadcast signal transmission apparatus 110 includes an apparatus for generating broadcast signal frame 111 which generate the broadcast signal frame by multiplexing core layer data and enhanced layer data, and an OFDM transmitter 113.

The apparatus 111 combines a core layer signal corresponding to core layer data and an enhanced layer signal corresponding to enhanced layer data at different power levels, and generates a multiplexed signal by performing interleaving that is applied to both the core layer signal and the enhanced layer signal. In this case, the apparatus 111 may generate a broadcast signal frame including a bootstrap and a preamble using a time-interleaved signal. In this case, the broadcast signal frame may be an ATSC 3.0 frame.

The OFDM transmitter 113 transmits the multiplexed signal using an OFDM communication method via an antenna 117, thereby allowing the transmitted OFDM signal to be received via the antenna 137 of the broadcast signal reception apparatus 130 over the wireless channel 120.

The broadcast signal reception apparatus 130 includes an OFDM receiver 133 and a signal demultiplexer 131. When the signal transmitted over the wireless channel 120 is received via the antenna 137, the OFDM receiver 133 receives an OFDM signal via synchronization, channel estimation and equalization.

In this case, the OFDM receiver 133 may detect and demodulate the bootstrap from the OFDM signal, demodulate the preamble using information included in the bootstrap, and demodulate the super-imposed payload using information included in the preamble.

The signal demultiplexer 131 restores the core layer data from the signal (super-imposed payload) received via the OFDM receiver 133 first, and then restores the enhanced layer data via cancellation corresponding to the restored core layer data. In this case, the signal demultiplexer 131 may generate a broadcast signal frame first, may restore the bootstrap, may restore the preamble using the information included in the bootstrap, and may use the signaling information included in the preamble for the restoration of a data signal. In this case, the signaling information may be L1 signaling information and may include injection level information, normalizing factor information, etc.

In this case, the preamble may include a PLP identification information for identifying Physical Layer Pipes (PLPs); and a layer identification information for identifying layers corresponding to division of layers.

In this case, the PLP identification information and the layer identification information may be included in the preamble as fields different from each other.

In this case, the time interleaver information may be included in the preamble for each of the Physical Layer Pipes (PLPs) without checking a condition of a conditional statement corresponding to the layer identification information.

In this case, the preamble may selectively include an injection level information corresponding to the injection level controller for each of the Physical Layer Pipes (PLPs) based on a result of comparing the layer identification information with a predetermined value.

In this case, the preamble may include type information, start position information and size information of the Physical Layer Pipes In this case, the type information may be for identifying one among a first type corresponding to a non-dispersed physical layer pipe and a second type corresponding to a dispersed physical layer pipe.

In this case, the non-dispersed physical layer pipe may be assigned for contiguous data cell indices, and the dispersed physical layer pipe may include two or more subslices.

In this case, the type information may be selectively signaled according to a result of comparing the layer identification information with a predetermined value for each of the Physical Layer Pipes (PLPs).

In this case, the type information may be signaled only for the core layer.

In this case, the start position information may be identical to an index corresponding to the first data cell of the physical layer pipe.

In this case, the start position information may indicate the start position of the physical layer pipe using cell addressing scheme.

In this case, the start position information may be included in the preamble for each of the Physical Layer Pipes (PLPs) without checking a condition of a conditional statement corresponding to the layer identification information.

In this case, the size information may be generated based on the number of data cells assigned to the physical layer pipe.

In this case, the size information may be included in the preamble for each of the Physical Layer Pipes (PLPs) without checking a condition of a conditional statement corresponding to the layer identification information.

As will be described in detail later, the apparatus 111 shown in FIG. 1 may include a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; and a frame builder configured to generate a broadcast signal frame including a preamble for signaling, size information of Physical Layer Pipes (PLPs) and time interleaver information shared by the core layer signal and the enhanced layer signal, using the time-interleaved signal. In this case, the broadcast signal transmission apparatus 110 shown in FIG. 1 may be viewed as including: a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; a frame builder configured to generate a broadcast signal frame including a preamble for signaling size information of Physical Layer Pipes (PLPs) and time interleaver information shared by the core layer signal and the enhanced layer signal, using the time-interleaved signal; and an OFDM transmitter configured to transmit the broadcast signal frame using OFDM communication scheme through an antenna.

As will be described in detail later, the signal demultiplexer shown in FIG. 1 may include a time deinterleaver configured to generate a time-deinterleaved signal by applying time deinterleaving to a received signal corresponding to a broadcast signal frame; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller. In this case, the broadcast signal reception apparatus 130 shown in FIG. 1 may be viewed as including: an OFDM receiver configured to generate a received signal by performing any one or more of synchronization, channel estimation and equalization on a transmitted signal corresponding to a broadcast signal frame; a time deinterleaver configured to generate a time-deinterleaved signal by applying time deinterleaving to the received signal; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller.

Although not explicitly shown in FIG. 1, a broadcast signal transmission/reception system according to an embodiment of the present invention may multiplex/demultiplex one or more pieces of extension layer data in addition to the core layer data and the enhanced layer data. In this case, the extension layer data may be multiplexed at a power level lower than that of the core layer data and the enhanced layer data. Furthermore, when two or more extension layers are included, the injection power level of a second extension layer may be lower than the injection power level of a first extension layer, and the injection power level of a third extension layer may be lower than the injection power level of the second extension layer.

Figure 2:
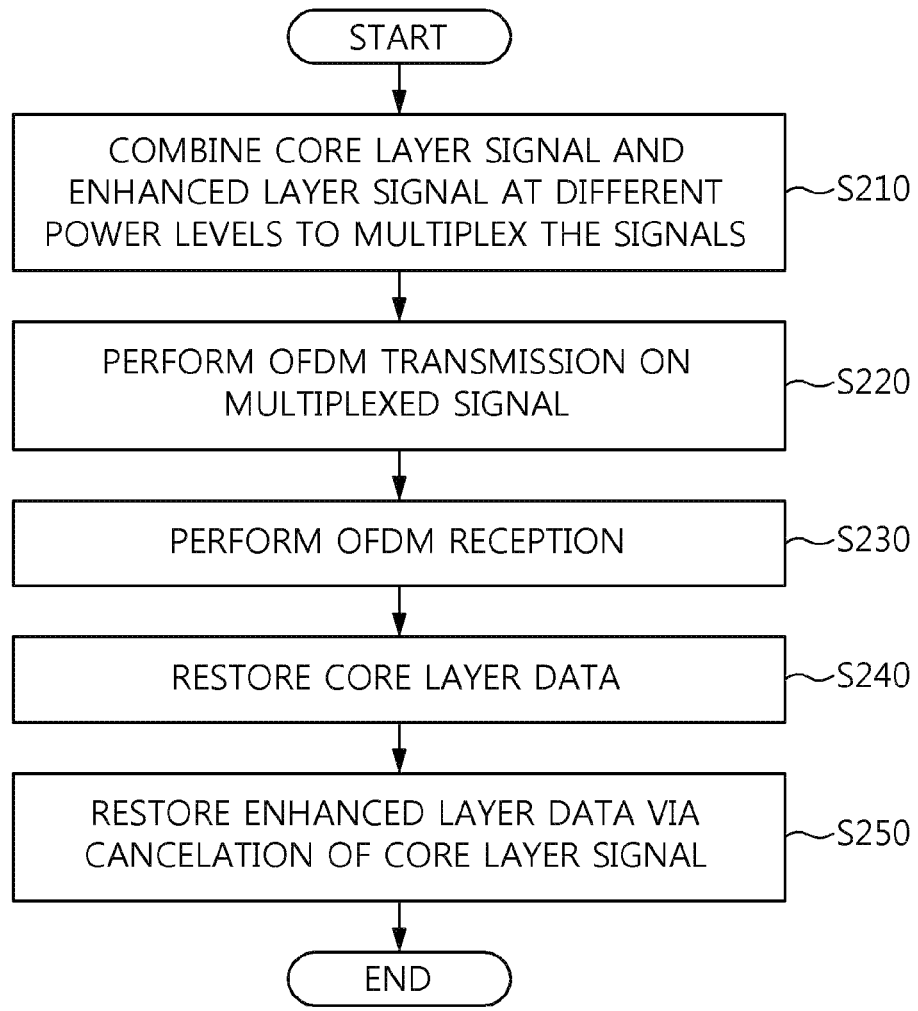
FIG. 2 is an operation flowchart showing a broadcast signal transmission/reception method according to an embodiment of the present invention.

FIG. 2 is an operation flowchart showing a broadcast signal transmission/reception method according to an embodiment of the present invention.

Referring to FIG. 2, in the broadcast signal transmission/reception method according to the embodiment of the present invention, a core layer signal and an enhanced layer signal are combined at different power levels and then multiplexed to generate a broadcast signal frame including a preamble for signaling size information of Physical Layer Pipes (PLPs) and time interleaver information shared by the core layer signal and the enhanced layer signal at step S210.

In this case, the broadcast signal frame generated at step S210 may include the bootstrap, the preamble and a superimposed payload. In this case, at least of the bootstrap and the preamble may include L1 signaling information. In this case, the L1 signaling information may include injection level information and normalizing factor information.

In this case, the preamble may include a PLP identification information for identifying Physical Layer Pipes (PLPs); and a layer identification information for identifying layers corresponding to division of layers.

In this case, the PLP identification information and the layer identification information may be included in the preamble as fields different from each other.

In this case, the time interleaver information may be included in the preamble for each of the Physical Layer Pipes (PLPs) without checking a condition of a conditional statement corresponding to the layer identification information.

In this case, the preamble may selectively include an injection level information corresponding to the injection level controller for each of the Physical Layer Pipes (PLPs)

based on a result of comparing the layer identification information with a predetermined value.

In this case, the preamble may include type information, start position information and size information of the Physical Layer Pipes In this case, the type information may be for identifying one among a first type corresponding to a non-dispersed physical layer pipe and a second type corresponding to a dispersed physical layer pipe.

In this case, the non-dispersed physical layer pipe may be assigned for contiguous data cell indices, and the dispersed physical layer pipe may include two or more subslices.

In this case, the type information may be selectively signaled according to a result of comparing the layer identification information with a predetermined value for each of the Physical Layer Pipes (PLPs).

In this case, the type information may be signaled only for the core layer.

In this case, the start position information may be identical to an index corresponding to the first data cell of the physical layer pipe.

In this case, the start position information may indicate the start position of the physical layer pipe using cell addressing scheme.

In this case, the start position information may be included in the preamble for each of the Physical Layer Pipes (PLPs) without checking a condition of a conditional statement corresponding to the layer identification information.

In this case, the size information may be generated based on the number of data cells assigned to the physical layer pipe.

In this case, the size information may be included in the preamble for each of the Physical Layer Pipes (PLPs) without checking a condition of a conditional statement corresponding to the layer identification information.

Furthermore, in the broadcast signal transmission/reception method according to the embodiment of the present invention, the broadcast signal frame is OFDM transmitted at step S220.

Furthermore, in the broadcast signal transmission/reception method according to the embodiment of the present invention, the transmitted signal is OFDM received at step S230.

In this case, at step S230, synchronization, channel estimation and equalization may be performed.

In this case, the bootstrap may be restored, the preamble may be restored using a signal included in the restored bootstrap, and the data signal may be restored using the signaling information included in the preamble at step S230.

Furthermore, in the broadcast signal transmission/reception method according to the embodiment of the present invention, core layer data is restored from the received signal at step S240.

Furthermore, in the broadcast signal transmission/reception method according to the embodiment of the present invention, enhanced layer data is restored via the cancellation of the core layer signal at step S250.

In particular, steps S240 and S250 shown in FIG. 2 may correspond to demultiplexing operations corresponding to step S210.

As will be described in detail later, step S210 shown in FIG. 2 may include generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; and generating a broadcast signal frame including a preamble for signaling size information of Physical Layer Pipes (PLPs) and time interleaver information shared by the core layer signal and the enhanced layer signal, using the time-interleaved signal.

In this case, the broadcast signal transmission method of steps S210 and S220 may be viewed as including generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; generating a broadcast signal frame including a preamble for signaling size information of Physical Layer Pipes (PLPs) and time interleaver information shared by the core layer signal and the enhanced layer signal, using the time-interleaved signal; and transmitting the broadcast signal frame using an OFDM communication scheme through an antenna.

As will be described in detail later, steps S240 and S250 shown in FIG. 2 may include generating a time-deinterleaved signal by applying time deinterleaving to a received signal corresponding to a broadcast signal frame; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced signal. In this case, a broadcast signal reception method according to an embodiment of the present invention may be viewed as including: generating a received signal by performing any one or more of synchronization, channel estimation and equalization on a transmitted signal corresponding to a broadcast signal frame; generating a time-deinterleaved signal by applying time deinterleaving to the received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced layer signal.

Figure 3:
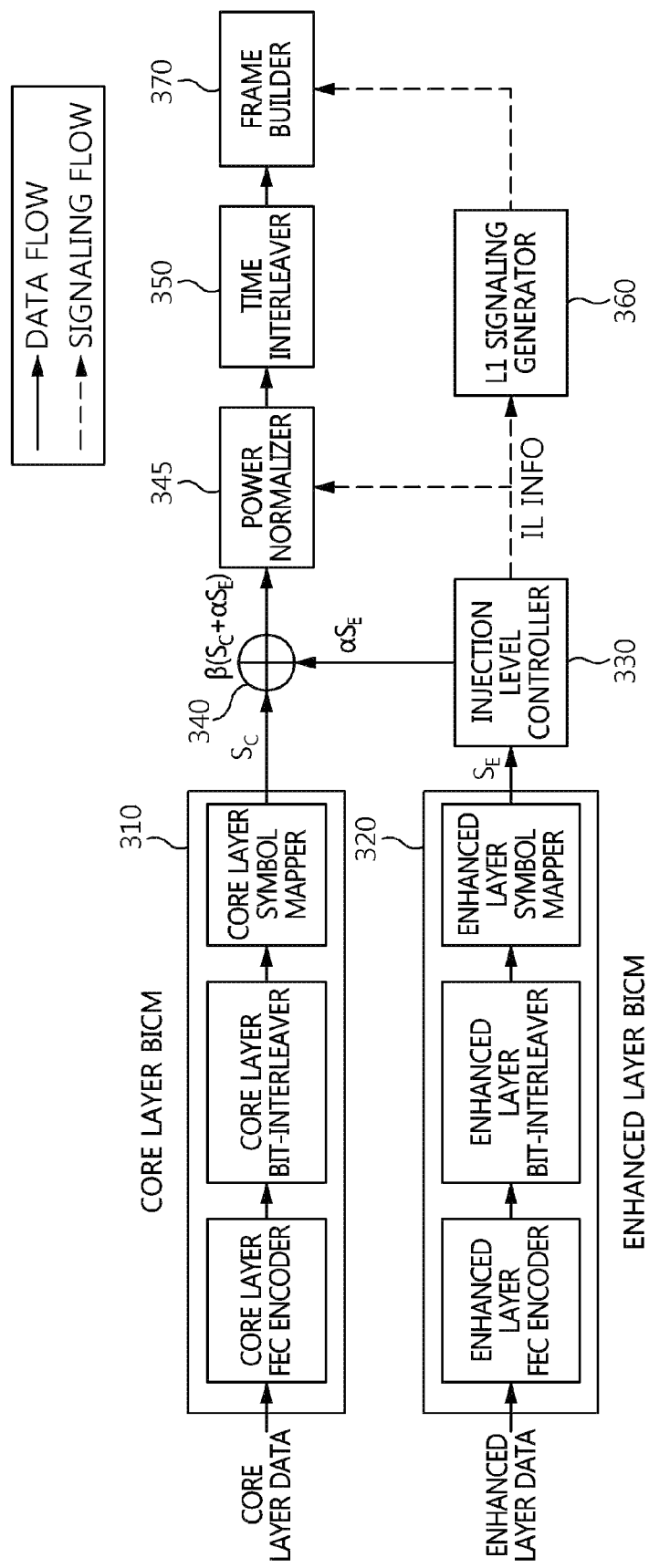
FIG. 3 is a block diagram showing an example of the apparatus for generating broadcast signal frame in FIG. 1.

FIG. 3 is a block diagram showing an example of the apparatus for generating broadcast signal frame in FIG. 1.

Referring to FIG. 3, the apparatus for generating broadcast signal frame according to an embodiment of the present invention may include a core layer BICM unit 310, an enhanced layer BICM unit 320, an injection level controller 330, a combiner 340, a power normalizer 345, and a time interleaver 350, a signaling generation unit 360, and a frame builder 370.

Generally, a BICM device includes an error correction encoder, a bit interleaver, and a symbol mapper. Each of the core layer BICM unit 310 and the enhanced layer BICM unit 320 shown in FIG. 3 may include an error correction encoder, a bit interleaver, and a symbol mapper. In particular, each of the error correction encoders (the core layer FEC encoder, and the enhanced layer FEC encoder) shown in FIG. 3 may be formed by connecting a BCH encoder and an LDPC encoder in series. In this case, the input of the error correction encoder is input to the BCH encoder, the output of the BCH encoder is input to the LDPC encoder, and the output of the LDPC encoder may be the output of the error correction encoder.

As shown in FIG. 3, core layer data and enhanced layer data pass through respective different BICM units, and are then combined by the combiner 340. That is, the term "Layered Division Multiplexing (LDM)" used herein may refer to combining the pieces of data of a plurality of layers into a single piece of data using differences in power and then transmitting the combined data.

That is, the core layer data passes through the core layer BICM unit 310, the enhanced layer data passes through the enhanced layer BICM unit 320 and then the injection level controller 330, and the core layer data and the enhanced layer data are combined by the combiner 340. In this case, the enhanced layer BICM unit 320 may perform BICM encoding different from that of the core layer BICM unit 310. That is, the enhanced layer BICM unit 320 may perform higher bit rate error correction encoding or symbol mapping than the core layer BICM unit 310. Furthermore, the enhanced layer BICM unit 320 may perform less robust error correction encoding or symbol mapping than the core layer BICM unit 310.

For example, the core layer error correction encoder may exhibit a lower bit rate than the enhanced layer error correction encoder. In this case, the enhanced layer symbol mapper may be less robust than the core layer symbol mapper.

The combiner 340 may be viewed as functioning to combine the core layer signal and the enhanced layer signal at different power levels. In an embodiment, power level adjustment may be performed on the core layer signal rather than the enhanced layer signal. In this case, the power of the core layer signal may be adjusted to be higher than the power of the enhanced layer signal.

The core layer data may use forward error correction (FEC) code having a low code rate in order to perform robust reception, while the enhanced layer data may use FEC code having a high code rate in order to achieve a high data transmission rate.

That is, the core layer data may have a broader coverage than the enhanced layer data in the same reception environment.

The enhanced layer data having passed through the enhanced layer BICM unit 320 is adjusted in gain (or power) by the injection level controller 330, and is combined with the core layer data by the combiner 340.

That is, the injection level controller 330 generates a power-reduced enhanced layer signal by reducing the power of the enhanced layer signal. In this case, the magnitude of the signal adjusted by the injection level controller 330 may be determined based on an injection level. In this case, an injection level in the case where signal B is inserted into signal A may be defined by Equation 1 below:

$$\text{Injection level (dB)} = -10 \, \log_{10}\left(\frac{\text{Signal power of } B}{\text{Signal power of } A}\right) \quad (1)$$

For example, assuming that the injection level is 3 dB when the enhanced layer signal is inserted into the core layer signal, Equation 1 means that the enhanced layer signal has power corresponding to half of the power of the core layer signal.

In this case, the injection level controller 330 may adjust the power level of the enhanced layer signal from 0 dB to 25.0 dB in steps of 0.5 dB or 1 dB.

In general, transmission power that is assigned to the core layer is higher than transmission power that is assigned to the enhanced layer, which enables the receiver to decode core layer data first.

In this case, the combiner 340 may be viewed as generating a multiplexed signal by combining the core layer signal with the power-reduced enhanced layer signal.

The signal obtained by the combination of the combiner 340 is provided to the power normalizer 345 so that the power of the signal can be reduced by a power level corresponding to an increase in power caused by the combination of the core layer signal and the enhanced layer signal, and then power adjustment is performed. That is, the power normalizer 345 reduces the power of the signal, obtained by the multiplexing of the combiner 340, to a power level corresponding to the core layer signal. Since the level of the combined signal is higher than the level of one layer signal, the power normalizing of the power normalizer 345 is required in order to prevent amplitude clipping, etc. in the remaining portion of a broadcast signal transmission/reception system.

In this case, the power normalizer 345 may adjust the magnitude of the combined signal to an appropriate value by multiplying the magnitude of the combined signal by the normalizing factor of Equation 2 below. Injection level information used to calculate Equation 2 below may be transferred to the power normalizer 345 via a signaling flow:

$$\text{Normalizing factor} = (\sqrt{(1+10^{-Injectionlevel(dB)/10})})^{-1} \quad (2)$$

Assuming that the power levels of the core layer signal and the enhanced layer signal are normalized to 1 when an enhanced layer signal $S_E$ is injected into a core layer signal $S_C$ at a preset injection level, a combined signal may be expressed by $S_C + \alpha S_E$.

In this case, $\alpha$ is scaling factors corresponding to various injection levels. That is, the injection level controller 330 may correspond to the scaling factor.

For example, when the injection level of an enhanced layer is 3 dB, a combined signal may be expressed by $$S_C + \sqrt{\frac{1}{2}} S_E.$$

Since the power of a combined signal (a multiplexed signal) increases compared to a core layer signal, the power normalizer 345 needs to mitigate the increase in power.

The output of the power normalizer 345 may be expressed by $\beta(S_C + \alpha S_E)$.

In this case, $\beta$ is normalizing factors based on various injection levels of the enhanced layer.

When the injection level of the enhanced layer is 3 dB, the power of the combined signal is increased by 50% compared to that of the core layer signal. Accordingly, the output of the power normalizer 345 may be expressed by $$\sqrt{\frac{2}{3}}\left(S_c + \sqrt{\frac{1}{2}} S_E\right).$$

Table 1 below lists scaling factors α and normalizing factors β for various injection levels (CL: Core Layer, EL: Enhanced Layer). The relationships among the injection level, the scaling factor α and the normalizing factor β may be defined by Equation 3 below:

$$\begin{cases} \alpha = 10^{\left(\frac{-Injection\ level}{20}\right)} \\ \beta = \frac{1}{\sqrt{1+\alpha^2}} \end{cases} \quad (3)$$

TABLE 1

| EL Injection level relative to CL | Scaling factor α | Normalizing factor β |
|---|---|---|
| 3.0 dB | 0.7079458 | 0.8161736 |
| 3.5 dB | 0.6683439 | 0.8314061 |
| 4.0 dB | 0.6309573 | 0.8457262 |
| 4.5 dB | 0.5956621 | 0.8591327 |
| 5.0 dB | 0.5623413 | 0.8716346 |
| 5.5 dB | 0.5308844 | 0.8832495 |
| 6.0 dB | 0.5011872 | 0.8940022 |
| 6.5 dB | 0.4731513 | 0.9039241 |
| 7.0 dB | 0.4466836 | 0.9130512 |
| 7.5 dB | 0.4216965 | 0.9214231 |
| 8.0 dB | 0.3981072 | 0.9290819 |
| 8.5 dB | 0.3758374 | 0.9360712 |
| 9.0 dB | 0.3548134 | 0.9424353 |
| 9.5 dB | 0.3349654 | 0.9482180 |
| 10.0 dB | 0.3162278 | 0.9534626 |

That is, the power normalizer 345 corresponds to the normalizing factor, and reduces the power of the multiplexed signal by a level by which the combiner 340 has increased the power.

In this case, each of the normalizing factor and the scaling factor may be a rational number that is larger than 0 and smaller than 1.

In this case, the scaling factor may decrease as a reduction in power corresponding to the injection level controller 330 becomes larger, and the normalizing factor may increase as a reduction in power corresponding to the injection level controller 330 becomes larger.

The power normalized signal passes through the time interleaver 350 for distributing burst errors occurring over a channel.

In this case, the time interleaver 350 may be viewed as performing interleaving that is applied to both the core layer signal and the enhanced layer signal. That is, the core layer and the enhanced layer share the time interleaver, thereby preventing the unnecessary use of memory and also reducing latency at the receiver.

Although will be described later in greater detail, the enhanced layer signal may correspond to enhanced layer data restored based on cancellation corresponding to the restoration of core layer data corresponding to the core layer signal. The combiner 340 may combine one or more extension layer signals having power levels lower than those of the core layer signal and the enhanced layer signal with the core layer signal and the enhanced layer signal.

Meanwhile, L1 signaling information including injection level information is encoded by the signaling generation unit 360 including signaling-dedicated BICM. In this case, the signaling generation unit 360 may receive injection level information IL INFO from the injection level controller 330, and may generate an L1 signaling signal.

In L1 signaling, L1 refers to Layer-1 in the lowest layer of the ISO 7 layer model. In this case, the L1 signaling may be included in a preamble.

In general, the L1 signaling may include an FFT size, a guard interval size, etc., i.e., the important parameters of the OFDM transmitter, a channel code rate, modulation information, etc., i.e., BICM important parameters. This L1 signaling signal is combined with data signal into a broadcast signal frame.

The frame builder 370 generates a broadcast signal frame by combining the L1 signaling signal with a data signal. In this case, the frame builder 370 may generate the broadcast signal frame including a preamble for signaling size information of Physical Layer Pipes (PLPs) and time interleaver information shared by the core layer signal and the enhanced layer signal, using the time interleaved signal. In this case, the broadcast signal frame may further include a bootstrap.

In this case, the frame builder 370 may include a bootstrap generator configured to generate the bootstrap, a preamble generator configured to generate the preamble, and a superimposed payload generator configured to generate a superimposed payload corresponding to the time-interleaved signal.

In this case, the bootstrap may be shorter than the preamble, and have a fixed-length.

In this case, the bootstrap may include a symbol representing a structure of the preamble, the symbol corresponding to a fixed-length bit string representing a combination of a modulation scheme/code rate, a FFT size, a guard interval length and a pilot pattern of the preamble.

In this case, the symbol may correspond to a lookup table in which a preamble structure corresponding to a second FFT size is allocated prior to a preamble structure corresponding to a first FFT size, the second FFT size being less than the first FFT size when the modulation scheme/code rates are the same, and a preamble structure corresponding to a second guard interval length is allocated prior to a preamble structure corresponding to a first guard interval length, the second guard interval length being longer than the first guard interval length when the modulation scheme/code rates are the same and the FFT sizes are the same.

The broadcast signal frame may be transmitted via the OFDM transmitter that is robust to a multi-path and the Doppler phenomenon. In this case, the OFDM transmitter may be viewed as being responsible for the transmission signal generation of the next generation broadcasting system.

In this case, the preamble may include a PLP identification information for identifying Physical Layer Pipes (PLPs); and a layer identification information for identifying layers corresponding to division of layers.

In this case, the PLP identification information and the layer identification information may be included in the preamble as fields different from each other.

In this case, the time interleaver information may be included in the preamble for each of the Physical Layer Pipes (PLPs) without checking a condition of a conditional statement corresponding to the layer identification information (j).

In this case, the preamble may selectively include an injection level information corresponding to the injection level controller for each of the Physical Layer Pipes (PLPs) based on a result of comparing (IF(j>0)) the layer identification information with a predetermined value.

In this case, the preamble may include type information, start position information and size information of the Physical Layer Pipes In this case, the type information may be for identifying one among a first type corresponding to a non-dispersed physical layer pipe and a second type corresponding to a dispersed physical layer pipe.

In this case, the non-dispersed physical layer pipe may be assigned for contiguous data cell indices, and the dispersed physical layer pipe may include two or more subslices.

In this case, the type information may be selectively signaled according to a result of comparing the layer identification information with a predetermined value for each of the Physical Layer Pipes (PLPs).

In this case, the type information may be signaled only for the core layer.

In this case, the start position information may be identical to an index corresponding to the first data cell of the physical layer pipe.

In this case, the start position information may indicate the start position of the physical layer pipe using cell addressing scheme.

In this case, the start position information may be included in the preamble for each of the Physical Layer Pipes (PLPs) without checking a condition of a conditional statement corresponding to the layer identification information.

In this case, the size information may be generated based on the number of data cells assigned to the physical layer pipe.

In this case, the size information may be included in the preamble for each of the Physical Layer Pipes (PLPs) without checking a condition of a conditional statement corresponding to the layer identification information.

Figure 4:
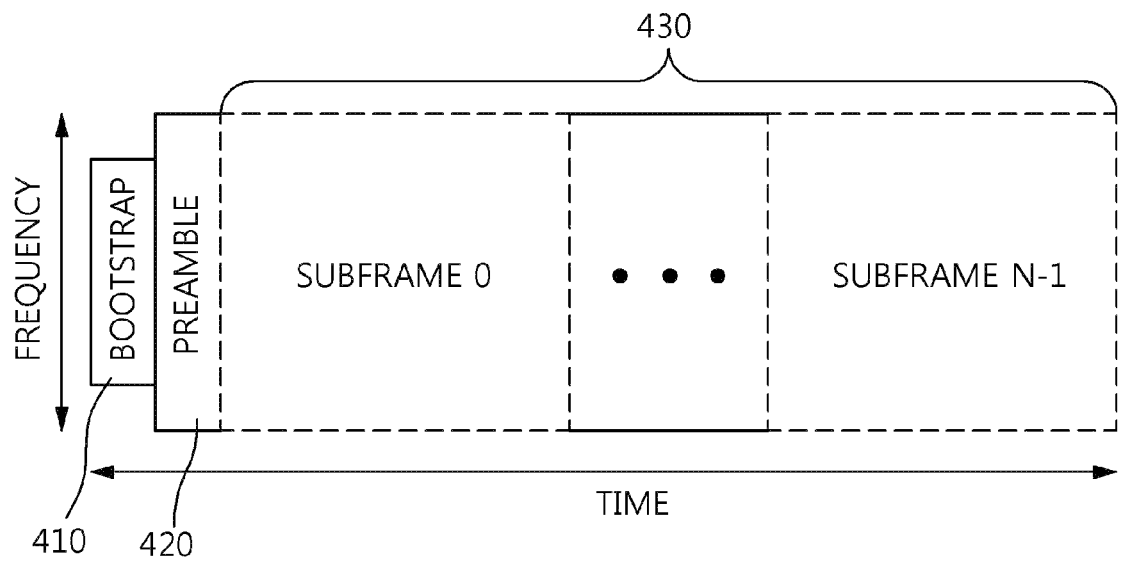
FIG. 4 is a diagram showing an example of the structure of a broadcast signal frame.

FIG. 4 is a diagram showing an example of the structure of a broadcast signal frame.

Referring to FIG. 4, a broadcast signal frame includes the bootstrap 410, the preamble 420 and the super-imposed payload 430.

The frame shown in FIG. 4, may be included in the super-frame.

In this case, the broadcast signal frame may include at least one of OFDM symbols. The broadcast signal frame may include a reference symbol or a pilot symbol.

The frame structure in which the Layered Division Multiplexing (LDM) is applied includes the bootstrap 410, the preamble 420 and the super-imposed payload 430 as shown in FIG. 4.

In this case, the bootstrap 410 and the preamble 420 may be seen as the two hierarchical preambles.

In this case, the bootstrap 410 may have a shorter length than the preamble 420 for the fast acquisition and detection. In this case, the bootstrap 410 may have a fixed-length. In this case, the bootstrap may include a fixed-length symbol. For example, the bootstrap 410 may consist of four OFDM symbols each of which has 0.5 ms length so that the bootstrap 410 may correspond to the fixed time length of 2 ms.

In this case, the bootstrap 410 may have a fixed bandwidth, and the preamble 420 and the super-imposed payload 430 may have a variable bandwidth wider than the bootstrap 410.

The preamble 420 may transmit detailed signaling information using a robust LDPC code. In this case, the length of the preamble 420 can be varied according to the signaling information.

In this case, both the bootstrap 410 and the payload 430 may be seen as a common signal which is shared by a plurality of layers.

The super-imposed payload 430 may correspond to a multiplexed signal of at least two layer signals. In this case, the super-imposed payload 430 may be generated by combining a core layer payload and an enhanced layer payload at different power levels. In this case, the core layer payload may include am in-band signaling section. In this case, the in-band signaling section may include signaling information for the enhanced layer service.

In this case, the bootstrap 410 may include a symbol representing a preamble structure.

In this case, the symbol which included in the bootstrap for representing the preamble structure may be set as shown in the Table 2 below.

TABLE 2

| preamble_structure | L1-Basic Mode | FFT Size | GI Length (samples) | Pilot Pattern (DX) |
| --- | --- | --- | --- | --- |
| 0 | L1-Basic Mode 1 | 8192 | 2048 | 3 |
| 1 | L1-Basic Mode 1 | 8192 | 1536 | 4 |
| 2 | L1-Basic Mode 1 | 8192 | 1024 | 3 |
| 3 | L1-Basic Mode 1 | 8192 | 768 | 4 |
| 4 | L1-Basic Mode 1 | 16384 | 4096 | 3 |
| 5 | L1-Basic Mode 1 | 16384 | 3648 | 4 |
| 6 | L1-Basic Mode 1 | 16384 | 2432 | 3 |
| 7 | L1-Basic Mode 1 | 16384 | 1536 | 4 |
| 8 | L1-Basic Mode 1 | 16384 | 1024 | 6 |
| 9 | L1-Basic Mode 1 | 16384 | 768 | 8 |
| 10 | L1-Basic Mode 1 | 32768 | 4864 | 3 |
| 11 | L1-Basic Mode 1 | 32768 | 3648 | 3 |
| 12 | L1-Basic Mode 1 | 32768 | 3648 | 8 |
| 13 | L1-Basic Mode 1 | 32768 | 2432 | 6 |
| 14 | L1-Basic Mode 1 | 32768 | 1536 | 8 |
| 15 | L1-Basic Mode 1 | 32768 | 1024 | 12 |
| 16 | L1-Basic Mode 1 | 32768 | 768 | 16 |
| 17 | L1-Basic Mode 2 | 8192 | 2048 | 3 |
| 18 | L1-Basic Mode 2 | 8192 | 1536 | 4 |
| 19 | L1-Basic Mode 2 | 8192 | 1024 | 3 |
| 20 | L1-Basic Mode 2 | 8192 | 768 | 4 |
| 21 | L1-Basic Mode 2 | 16384 | 4096 | 3 |
| 22 | L1-Basic Mode 2 | 16384 | 3648 | 4 |
| 23 | L1-Basic Mode 2 | 16384 | 2432 | 3 |
| 24 | L1-Basic Mode 2 | 16384 | 1536 | 4 |
| 25 | L1-Basic Mode 2 | 16384 | 1024 | 6 |
| 26 | L1-Basic Mode 2 | 16384 | 768 | 8 |
| 27 | L1-Basic Mode 2 | 32768 | 4864 | 3 |
| 28 | L1-Basic Mode 2 | 32768 | 3648 | 3 |
| 29 | L1-Basic Mode 2 | 32768 | 3648 | 8 |
| 30 | L1-Basic Mode 2 | 32768 | 2432 | 6 |
| 31 | L1-Basic Mode 2 | 32768 | 1536 | 8 |
| 32 | L1-Basic Mode 2 | 32768 | 1024 | 12 |
| 33 | L1-Basic Mode 2 | 32768 | 768 | 16 |
| 34 | L1-Basic Mode 3 | 8192 | 2048 | 3 |
| 35 | L1-Basic Mode 3 | 8192 | 1536 | 4 |
| 36 | L1-Basic Mode 3 | 8192 | 1024 | 3 |
| 37 | L1-Basic Mode 3 | 8192 | 768 | 4 |
| 38 | L1-Basic Mode 3 | 16384 | 4096 | 3 |
| 39 | L1-Basic Mode 3 | 16384 | 3648 | 4 |
| 40 | L1-Basic Mode 3 | 16384 | 2432 | 3 |
| 41 | L1-Basic Mode 3 | 16384 | 1536 | 4 |
| 42 | L1-Basic Mode 3 | 16384 | 1024 | 6 |
| 43 | L1-Basic Mode 3 | 16384 | 768 | 8 |
| 44 | L1-Basic Mode 3 | 32768 | 4864 | 3 |
| 45 | L1-Basic Mode 3 | 32768 | 3648 | 3 |
| 46 | L1-Basic Mode 3 | 32768 | 3648 | 8 |
| 47 | L1-Basic Mode 3 | 32768 | 2432 | 6 |
| 48 | L1-Basic Mode 3 | 32768 | 1536 | 8 |
| 49 | L1-Basic Mode 3 | 32768 | 1024 | 12 |
| 50 | L1-Basic Mode 3 | 32768 | 768 | 16 |
| 51 | L1-Basic Mode 4 | 8192 | 2048 | 3 |
| 52 | L1-Basic Mode 4 | 8192 | 1536 | 4 |
| 53 | L1-Basic Mode 4 | 8192 | 1024 | 3 |
| 54 | L1-Basic Mode 4 | 8192 | 768 | 4 |
| 55 | L1-Basic Mode 4 | 16384 | 4096 | 3 |
| 56 | L1-Basic Mode 4 | 16384 | 3648 | 4 |
| 57 | L1-Basic Mode 4 | 16384 | 2432 | 3 |
| 58 | L1-Basic Mode 4 | 16384 | 1536 | 4 |

TABLE 2-continued

| preamble_structure | L1-Basic Mode | FFT Size | GI Length (samples) | Pilot Pattern (DX) |
|---|---|---|---|---|
| 59 | L1-Basic Mode 4 | 16384 | 1024 | 6 |
| 60 | L1-Basic Mode 4 | 16384 | 768 | 8 |
| 61 | L1-Basic Mode 4 | 32768 | 4864 | 3 |
| 62 | L1-Basic Mode 4 | 32768 | 3648 | 3 |
| 63 | L1-Basic Mode 4 | 32768 | 3648 | 8 |
| 64 | L1-Basic Mode 4 | 32768 | 2432 | 6 |
| 65 | L1-Basic Mode 4 | 32768 | 1536 | 8 |
| 66 | L1-Basic Mode 4 | 32768 | 1024 | 12 |
| 67 | L1-Basic Mode 4 | 32768 | 768 | 16 |
| 68 | L1-Basic Mode 5 | 8192 | 2048 | 3 |
| 69 | L1-Basic Mode 5 | 8192 | 1536 | 4 |
| 70 | L1-Basic Mode 5 | 8192 | 1024 | 3 |
| 71 | L1-Basic Mode 5 | 8192 | 768 | 4 |
| 72 | L1-Basic Mode 5 | 16384 | 4096 | 3 |
| 73 | L1-Basic Mode 5 | 16384 | 3648 | 4 |
| 74 | L1-Basic Mode 5 | 16384 | 2432 | 3 |
| 75 | L1-Basic Mode 5 | 16384 | 1536 | 4 |
| 76 | L1-Basic Mode 5 | 16384 | 1024 | 6 |
| 77 | L1-Basic Mode 5 | 16384 | 768 | 8 |
| 78 | L1-Basic Mode 5 | 32768 | 4864 | 3 |
| 79 | L1-Basic Mode 5 | 32768 | 3648 | 3 |
| 80 | L1-Basic Mode 5 | 32768 | 3648 | 8 |
| 81 | L1-Basic Mode 5 | 32768 | 2432 | 6 |
| 82 | L1-Basic Mode 5 | 32768 | 1536 | 8 |
| 83 | L1-Basic Mode 5 | 32768 | 1024 | 12 |
| 84 | L1-Basic Mode 5 | 32768 | 768 | 16 |
| 85 | L1-Basic Mode 6 | 8192 | 2048 | 3 |
| 86 | L1-Basic Mode 6 | 8192 | 1536 | 4 |
| 87 | L1-Basic Mode 6 | 8192 | 1024 | 3 |
| 88 | L1-Basic Mode 6 | 8192 | 768 | 4 |
| 89 | L1-Basic Mode 6 | 16384 | 4096 | 3 |
| 90 | L1-Basic Mode 6 | 16384 | 3648 | 4 |
| 91 | L1-Basic Mode 6 | 16384 | 2432 | 3 |
| 92 | L1-Basic Mode 6 | 16384 | 1536 | 4 |
| 93 | L1-Basic Mode 6 | 16384 | 1024 | 6 |
| 94 | L1-Basic Mode 6 | 16384 | 768 | 8 |
| 95 | L1-Basic Mode 6 | 32768 | 4864 | 3 |
| 96 | L1-Basic Mode 6 | 32768 | 3648 | 3 |
| 97 | L1-Basic Mode 6 | 32768 | 3648 | 8 |
| 98 | L1-Basic Mode 6 | 32768 | 2432 | 6 |
| 99 | L1-Basic Mode 6 | 32768 | 1536 | 8 |
| 100 | L1-Basic Mode 6 | 32768 | 1024 | 12 |
| 101 | L1-Basic Mode 6 | 32768 | 768 | 16 |
| 102 | L1-Basic Mode 7 | 8192 | 2048 | 3 |
| 103 | L1-Basic Mode 7 | 8192 | 1536 | 4 |
| 104 | L1-Basic Mode 7 | 8192 | 1024 | 3 |
| 105 | L1-Basic Mode 7 | 8192 | 768 | 4 |
| 106 | L1-Basic Mode 7 | 16384 | 4096 | 3 |
| 107 | L1-Basic Mode 7 | 16384 | 3648 | 4 |
| 108 | L1-Basic Mode 7 | 16384 | 2432 | 3 |
| 109 | L1-Basic Mode 7 | 16384 | 1536 | 4 |
| 110 | L1-Basic Mode 7 | 16384 | 1024 | 6 |
| 111 | L1-Basic Mode 7 | 16384 | 768 | 8 |
| 112 | L1-Basic Mode 7 | 32768 | 4864 | 3 |
| 113 | L1-Basic Mode 7 | 32768 | 3648 | 3 |
| 114 | L1-Basic Mode 7 | 32768 | 3648 | 8 |
| 115 | L1-Basic Mode 7 | 32768 | 2432 | 6 |
| 116 | L1-Basic Mode 7 | 32768 | 1536 | 8 |
| 117 | L1-Basic Mode 7 | 32768 | 1024 | 12 |
| 118 | L1-Basic Mode 7 | 32768 | 768 | 16 |
| 119 | Reserved | Reserved | Reserved | Reserved |
| 120 | Reserved | Reserved | Reserved | Reserved |
| 121 | Reserved | Reserved | Reserved | Reserved |
| 122 | Reserved | Reserved | Reserved | Reserved |
| 123 | Reserved | Reserved | Reserved | Reserved |
| 124 | Reserved | Reserved | Reserved | Reserved |
| 125 | Reserved | Reserved | Reserved | Reserved |
| 126 | Reserved | Reserved | Reserved | Reserved |
| 127 | Reserved | Reserved | Reserved | Reserved |

For example, a fixed-length symbol of 7-bit may be assigned for representing the preamble structure shown in the Table 2.

The L1-Basic Mode 1, L1-Basic Mode 2 and L1-Basic Mode 3 in the Table 2 may correspond to QPSK and 3/15 LDPC.

The L1 Basic Mode 4 in the Table 2 may correspond to 16-NUC (Non Uniform Constellation) and 3/15 LDPC.

The L1 Basic Mode 5 in the Table 2 may correspond to 64-NUC (Non Uniform Constellation) and 3/15 LDPC.

The L1-Basic Mode 6 and L1-Basic Mode 7 in the Table 2 may correspond to 256-NUC (Non Uniform Constellation) and 3/15 LDPC. Hereafter, the modulation scheme/code rate represents a combination of a modulation scheme and a code rate such as QPSK and 3/15 LDPC.

The FFT size in the Table 2 may represent a size of Fast Fourier Transform.

The GI length in the Table 2 may represent the Guard Interval Length, may represent a length of the guard interval which is not data in a time domain. In this case, the guard interval is longer, the system is more robust.

The Pilot Pattern in the Table 2 may represent Dx of the pilot pattern. Although it is not shown in the Table 2 explicitly, Dy may be all 1 in the example of Table 2. For example, Dx=3 may mean that one pilot for channel estimation is included in x-axis direction in every three symbols. For example, Dy=1 may mean the pilot is included every time in y-axis direction.

As shown in the Table 2, the preamble structure corresponding to a second modulation scheme/code rate which is more robust than a first modulation scheme/code rate may be allocated in the lookup table prior to the preamble structure corresponding to the first modulation scheme/code rate.

In this case, the being allocated prior to other preamble structure may mean being stored in the lookup table corresponding to a serial number less than the serial number of the other preamble structure.

Furthermore, the preamble structure corresponding to a second FFT size which is shorter than a first FFT size may be allocated in the lookup table prior to the preamble structure corresponding to a first FFT size in case of the same modulation scheme/code rate.

Furthermore, the preamble structure corresponding to a second guard interval which is longer than a first guard interval may be allocated in the lookup table prior to the preamble structure corresponding to the first guard interval in case of the same modulation scheme/code rate and the same FFT size.

As shown in the Table 2, the setting of the order in which the preamble structures are assigned in the lookup table may make the recognition of the preamble structure using the bootstrap more efficient.

Figure 5:
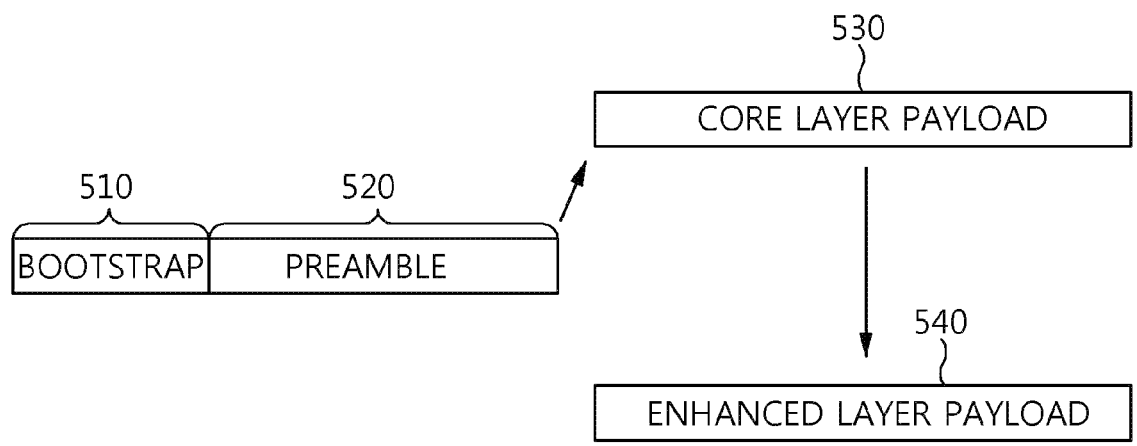
FIG. 5 is a diagram showing an example of the receiving process of the broadcast signal frame shown in FIG. 4.

FIG. 5 is a diagram showing an example of the receiving process of the broadcast signal frame shown in FIG. 4.

Referring to FIG. 5, the bootstrap 510 is detected and demodulated, and the signaling information is reconstructed by the demodulation of the preamble 520 using the demodulated information.

The core layer data 530 is demodulated using the signaling information and the enhanced layer signal is demodulated through the cancellation process corresponding to the core layer data. In this case, the cancellation corresponding to the core layer data will be described in detail later.

Figure 6:
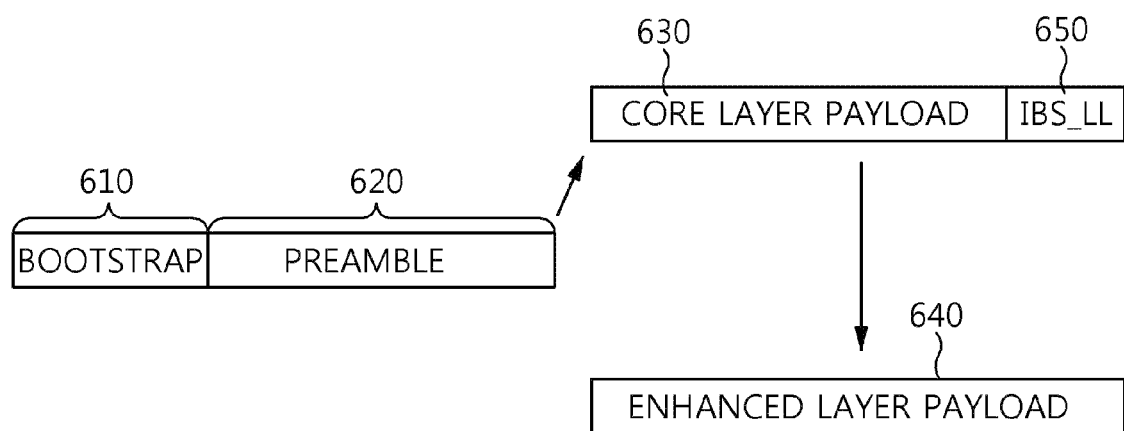
FIG. 6 is a diagram showing another example of the receiving process of the broadcast signal frame shown in FIG. 4.

FIG. 6 is a diagram showing another example of the receiving process of the broadcast signal frame shown in FIG. 4.

Referring to FIG. 6, the bootstrap 610 is detected and demodulated, and the signaling information is reconstructed by the demodulation of the preamble 620 using the demodulated information.

The core layer data 630 is demodulated using the signaling information. In this case, the core layer data 630 includes in-band signaling section 650. The in-band signaling section 650 includes signaling information for the enhanced layer service. The bandwidth is used more efficiently through the in-band signaling section 650. In this case, the in-band signaling section 650 may be included in the core layer which is more robust than the enhanced layer.

The basic signaling information and the information for the core layer service may be transferred through the preamble 620 and the signaling information for the enhanced layer service may be transferred through the in-band signaling section 650 in the example of the FIG. 6.

The enhanced layer signal is demodulated through the cancellation process corresponding to the core layer data.

In this case, the signaling information may be L1 (Layer-1) signaling information. The L1 signaling information may include information for physical layer parameters.

receiver. That is, the injection level of each layer is contained in the L1 signaling information and then transferred to the receiver.

In the present invention, the adjustment of power may correspond to increasing or decreasing the power of an input signal, and may correspond to increasing or decreasing the gain of an input signal.

The power normalizer 345 mitigates an increase in power caused by the combination of a plurality of layer signals by means of the combiner 340.

In the example shown in FIG. 7, the power normalizer 345 may adjust the power of a signal to appropriate magnitude by multiplying the magnitude of a signal, into which the signals of the respective layers are combined, by a normalizing factor by using Equation 4 below:

$$\text{Normalizing factor} = \left(\sqrt{(1 + 10^{-\text{Injection level \#1}(dB)/10} + 10^{-\text{Injection level \#2}(dB)/10} + \ldots + 10^{-\text{Injection level \#}(N+1)(dB)/10})}\right)^{-1} \quad (4)$$

Referring to FIG. 4, a broadcast signal frame includes an L1 signaling signal and a data signal. For example, the broadcast signal frame may be an ATSC 3.0 frame.

Figure 7:
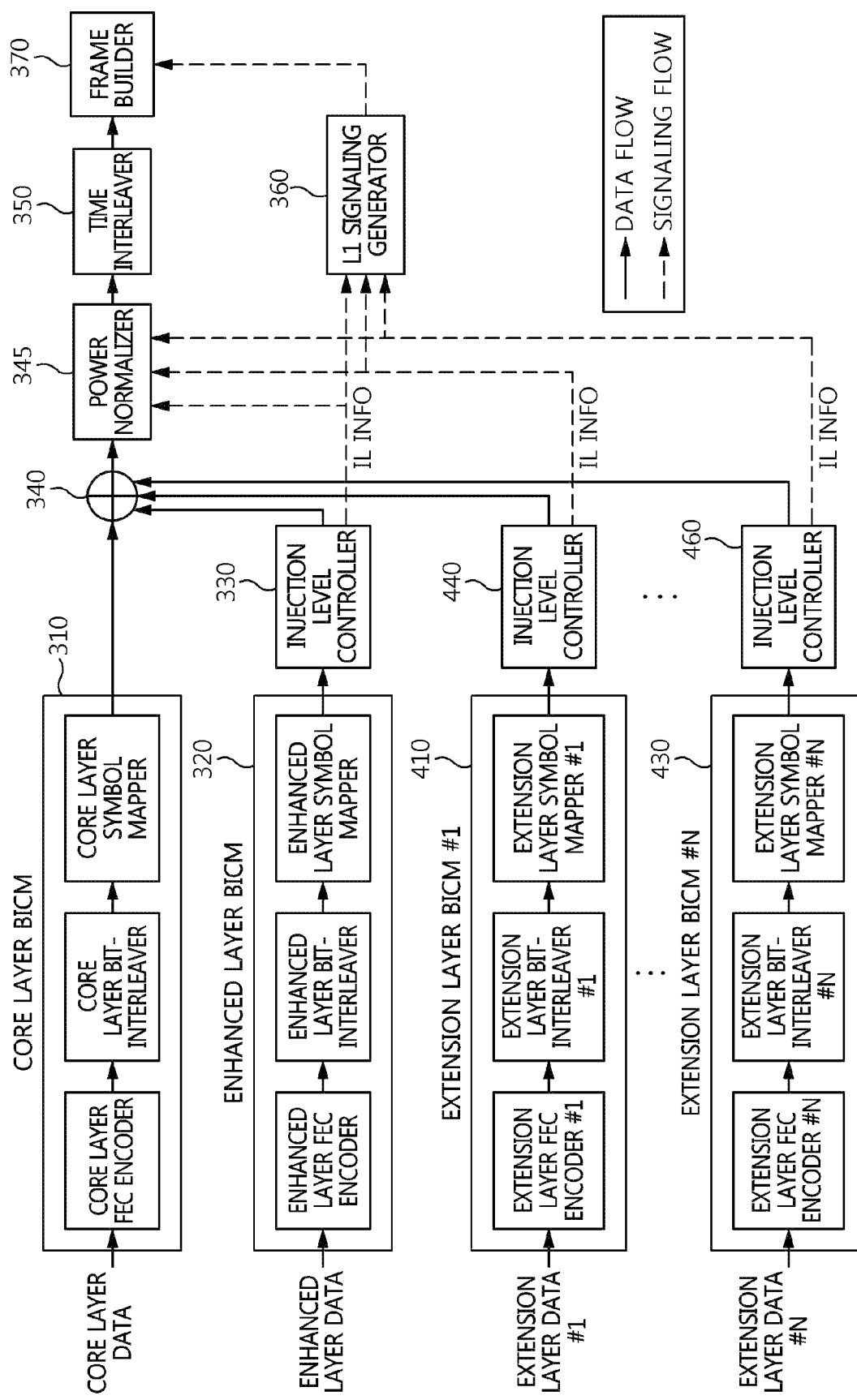
FIG. 7 is a block diagram showing another example of the apparatus for generating broadcast signal frame shown in FIG. 1.

FIG. 7 is a block diagram showing another example of the apparatus for generating broadcast signal frame shown in FIG. 1.

Referring to FIG. 7, it can be seen that an apparatus for generating broadcast signal frame multiplexes data corresponding to N (N is a natural number that is equal to or larger than 1) extension layers together in addition to core layer data and enhanced layer data.

That is, the apparatus for generating the broadcast signal frame in FIG. 7 includes N extension layer BICM units 410, . . . , 430 and injection level controllers 440, . . . , 460 in addition to a core layer BICM unit 310, an enhanced layer BICM unit 320, an injection level controller 330, a combiner 340, a power normalizer 345, a time interleaver 350, a signaling generation unit 360, and a frame builder 370.

The core layer BICM unit 310, enhanced layer BICM unit 320, injection level controller 330, combiner 340, power normalizer 345, time interleaver 350, signaling generation unit 360 and frame builder 370 shown in FIG. 7 have been described in detail with reference to FIG. 3.

Each of the N extension layer BICM units 410, . . . , 430 independently performs BICM encoding, and each of the injection level controllers 440, . . . , 460 performs power reduction corresponding to a corresponding extension layer, thereby enabling a power reduced extension layer signal to be combined with other layer signals via the combiner 340.

In this case, each of the error correction encoders of the extension layer BICM units 410, . . . , 430 may be formed by connecting a BCH encoder and an LDPC encoder in series.

In particular, it is preferred that a reduction in power corresponding to each of the injection level controllers 440, . . . , 460 be higher than the reduction in power of the injection level controller 330. That is, a lower one of the injection level controllers 330, 440, . . . , 460 shown in FIG. 7 may correspond to a larger reduction in power.

Injection level information provided by the injection level controllers 330, 440 and 460 shown in FIG. 7 is included in the broadcast signal frame of the frame builder 370 via the signaling generation unit 360, and is then transmitted to the The time interleaver 350 performs interleaving equally applied to the signals of the layers by interleaving the signals combined by the combiner 340.

Figure 8:
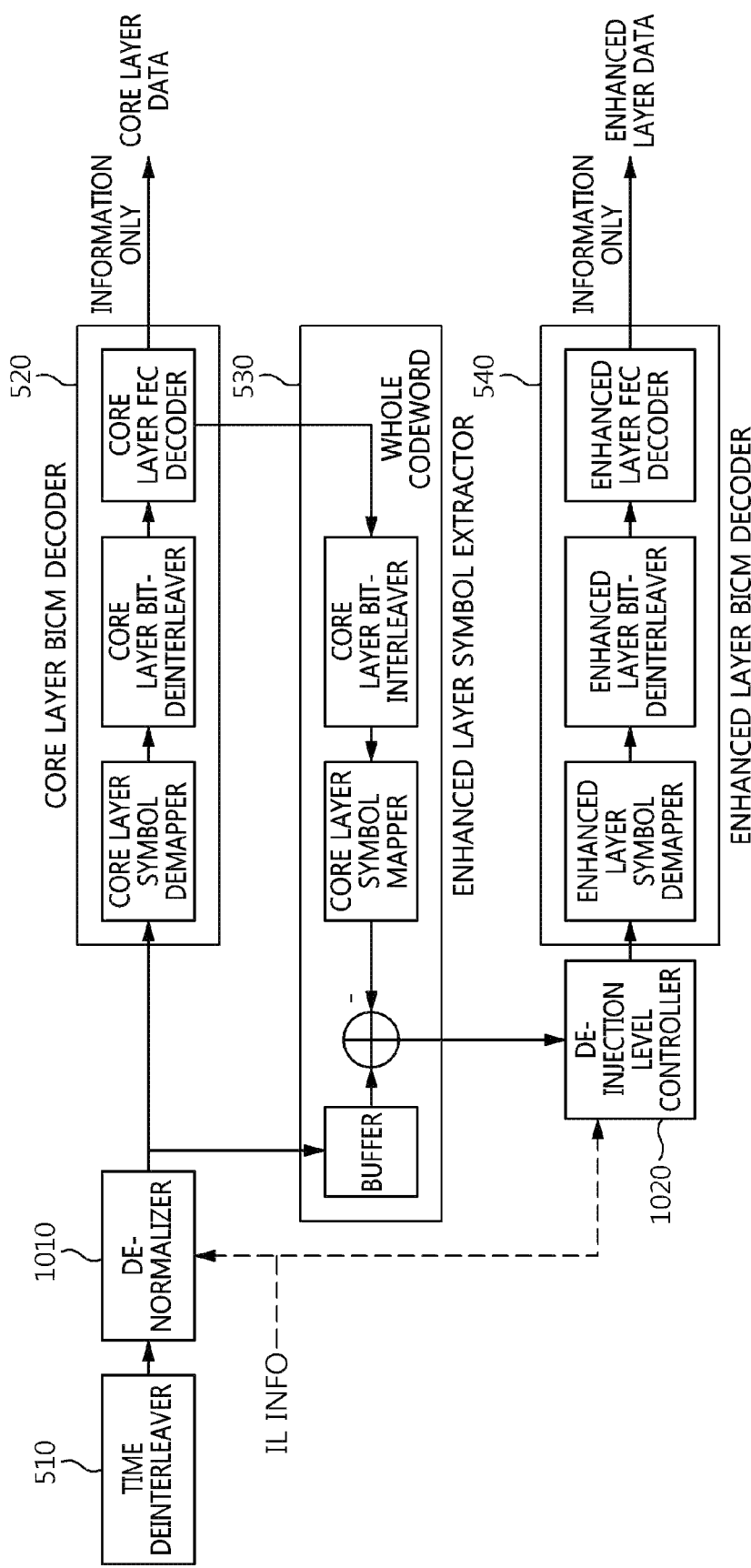
FIG. 8 is a block diagram showing an example of the signal demultiplexer shown in FIG. 1.

FIG. 8 is a block diagram showing still an example of the signal demultiplexer shown in FIG. 1.

Referring to FIG. 8, a signal demultiplexer according to an embodiment of the present invention includes a time deinterleaver 510, a de-normalizer 1010, core layer BICM decoder 520, an enhanced layer symbol extractor 530, a de-injection level controller 1020, and an enhanced layer BICM decoder 540.

In this case, the signal demultiplexer shown in FIG. 8 may correspond to the apparatus for generating the broadcast signal frame shown in FIG. 3.

The time deinterleaver 510 receives a received signal from an OFDM receiver for performing operations, such as time/frequency synchronization, channel estimation and equalization, and performs an operation related to the distribution of burst errors occurring over a channel. In this case, the L1 signaling information is decoded by the OFDM receiver first, and is then used for the decoding of data. In particular, the injection level information of the L1 signaling information may be transferred to the de-normalizer 1010 and the de-injection level controller 1020. In this case, the OFDM receiver may decode the received signal in the form of a broadcast signal frame, for example, an ATSC 3.0 frame, may extract the data symbol part of the frame, and may provide the extracted data symbol part to the time deinterleaver 510. That is, the time deinterleaver 510 distributes burst errors occurring over a channel by performing deinterleaving while passing a data symbol therethrough.

The de-normalizer 1010 corresponds to the power normalizer of the transmitter, and increases power by a level by which the power normalizer has decreased the power. That is, the de-normalizer 1010 divides the received signal by the normalizing factor of Equation 2.

Although the de-normalizer 1010 is illustrated as adjusting the power of the output signal of the time interleaver 510 in the example shown in FIG. 8, the de-normalizer 1010 may be located before the time interleaver 510 so that power adjustment is performed before interleaving in some embodiments.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In this case, the core layer symbol demapper may calculate an LLR value for each bit using a predetermined constellation. In this case, the constellation used by the core layer symbol mapper may vary depending on the combination of the code rate and the modulation order that are used by the transmitter.

In this case, the core layer bit deinterleaver may perform deinterleaving on calculated LLR values on an LDPC code word basis.

In particular, the core layer error correction decoder may output only information bits, or may output all bits in which information bits have been mixed with parity bits. In this case, the core layer error correction decoder may output only information bits as core layer data, and may output all bits in which information bits have been mixed with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

Furthermore, the enhanced layer error correction decoder may be formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

The enhanced layer symbol extractor 530 may receive all bits from the core layer error correction decoder of the core layer BICM decoder 520, may extract enhanced layer symbols from the output signal of the time deinterleaver 510 or de-normalizer 1010. In an embodiment, the enhanced layer symbol extractor 530 may not be provided with all bits by the error correction decoder of the core layer BICM decoder 520, but may be provided with LDPC information bits or BCH information bits by the error correction decoder of the core layer BICM decoder 520.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020. In particular, when LDPC information bits are provided, the enhanced layer symbol extractor 530 may further include a core layer LDPC encoder. Furthermore, when BCH information bits are provided, the enhanced layer symbol extractor 530 may further include not only a core layer LDPC encoder but also a core layer BCH encoder.

In this case, the core layer LDPC encoder, core layer BCH encoder, core layer bit interleaver and core layer symbol mapper included in the enhanced layer symbol extractor 530 may be the same as the LDPC encoder, BCH encoder, bit interleaver and symbol mapper of the core layer described with reference to FIG. 3.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540. For example, if at the transmitter, the power used to combine the enhanced layer signal is lower than the power used to combine the core layer signal by 3 dB, the de-injection level controller 1020 functions to increase the power of the input signal by 3 dB.

In this case, the de-injection level controller 1020 may be viewed as receiving injection level information from the OFDM receiver and multiplying an extracted enhanced layer signal by the enhanced layer gain of Equation 5:

$$\text{Enhanced layer gain} = (\sqrt{10^{-Injectionlevel(dB)/10}})^{-1} \quad (5)$$

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

Although the enhanced layer BICM decoder 540 performs a task similar to a task that is performed by the core layer BICM decoder 520, the enhanced layer LDPC decoder generally performs LDPC decoding related to a code rate equal to or higher than 6/15.

For example, the core layer may use LDPC code having a code rate equal to or higher than 5/15, and the enhanced layer may use LDPC code having a code rate equal to or higher than 6/15. In this case, in a reception environment in which enhanced layer data can be decoded, core layer data may be decoded using only a small number of LDPC decoding iterations. Using this characteristic, in the hardware of the receiver, a single LDPC decoder is shared by the core layer and the enhanced layer, and thus the cost required to implement the hardware can be reduced. In this case, the core layer LDPC decoder may use only some time resources (LDPC decoding iterations), and the enhanced layer LDPC decoder may use most time resources.

That is, the signal demultiplexer shown in FIG. 8 restores core layer data first, leaves only the enhanced layer symbols by cancellation the core layer symbols in the received signal symbols, and then restores enhanced layer data by increasing the power of the enhanced layer symbols. As described with reference to FIGS. 3 and 5, signals corresponding to respective layers are combined at different power levels, and thus data restoration having the smallest error can be achieved only if restoration starts with a signal combined with the strongest power.

Accordingly, in the example shown in FIG. 8, the signal demultiplexer may include the time deinterleaver 510 configured to generate a time-deinterleaved signal by applying time deinterleaving to a received signal; a de-normalizer 1010 configured to increase the power of the received signal or the time-deinterleaved signal by a level corresponding to a reduction in power by the power normalizer of the transmitter; the core layer BICM decoder 520 configured to restore core layer data from the signal power-adjusted by the de-normalizer 1010; the enhanced layer symbol extractor 530 configured to extract an enhanced layer signal by performing cancellation, corresponding to the core layer data, on the signal power-adjusted by the de-normalizer 1010 using the output signal of the core layer FEC decoder of the core layer BICM decoder 520; a de-injection level controller 1020 configured to increase the power of the enhanced layer signal by a level corresponding to a reduction in power by the injection power level controller of the transmitter; and an enhanced layer BICM decoder 540 configured to restore enhanced layer data using the output signal of the de-injection level controller 1020.

In this case, the enhanced layer symbol extractor may receive all code words from the core layer LDPC decoder of the core layer BICM decoder, and may immediately perform bit interleaving on the all code words.

In this case, the enhanced layer symbol extractor may receive information bits from the core layer LDPC decoder of the core layer BICM decoder, and may perform core layer LDPC encoding and then bit interleaving on the information bits.

In this case, the enhanced layer symbol extractor may receive information bits from the core layer BCH decoder of the core layer BICM decoder, and may perform core layer BCH encoding and core layer LDPC encoding and then bit interleaving on the information bits.

In this case, the de-normalizer and the de-injection level controller may receive injection level information IL INFO provided based on L1 signaling, and may perform power control based on the injection level information.

In this case, the core layer BICM decoder may have a bit rate lower than that of the enhanced layer BICM decoder, and may be more robust than the enhanced layer BICM decoder.

In this case, the de-normalizer may correspond to the reciprocal of the normalizing factor.

In this case, the de-injection level controller may correspond to the reciprocal of the scaling factor.

In this case, the enhanced layer data may be restored based on cancellation corresponding to the restoration of core layer data corresponding to the core layer signal.

In this case, the signal demultiplexer further may include one or more extension layer symbol extractors each configured to extract an extension layer signal by performing cancellation corresponding to previous layer data; one or more de-injection level controllers each configured to increase the power of the extension layer signal by a level corresponding to a reduction in power by the injection level controller of the transmitter; and one or more extension layer BICM decoders configured to restore one or more pieces of extension layer data using the output signals of the one or more de-injection level controllers.

From the configuration shown in FIG. 8, it can be seen that a signal demultiplexing method according to an embodiment of the present invention includes generating a time-deinterleaved signal by applying time deinterleaving to a received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation, corresponding to the core layer data, on the power-adjusted signal; increasing the power of the enhanced layer signal by a level corresponding to a reduction in power by the injection power level controller of the transmitter; and restoring enhanced layer data using the enhanced layer data.

In this case, extracting the enhanced layer signal may include receiving all code words from the core layer LDPC decoder of the core layer BICM decoder, and immediately performing bit interleaving on the all code words.

In this case, extracting the enhanced layer signal may include receiving information bits from the core layer LDPC decoder of the core layer BICM decoder, and performing core layer LDPC encoding and then bit interleaving on the information bits.

In this case, extracting the enhanced layer signal may include receiving information bits from the core layer BCH decoder of the core layer BICM decoder, and performing core layer BCH encoding and core layer LDPC encoding and then bit interleaving on the information bits.

Figure 9:
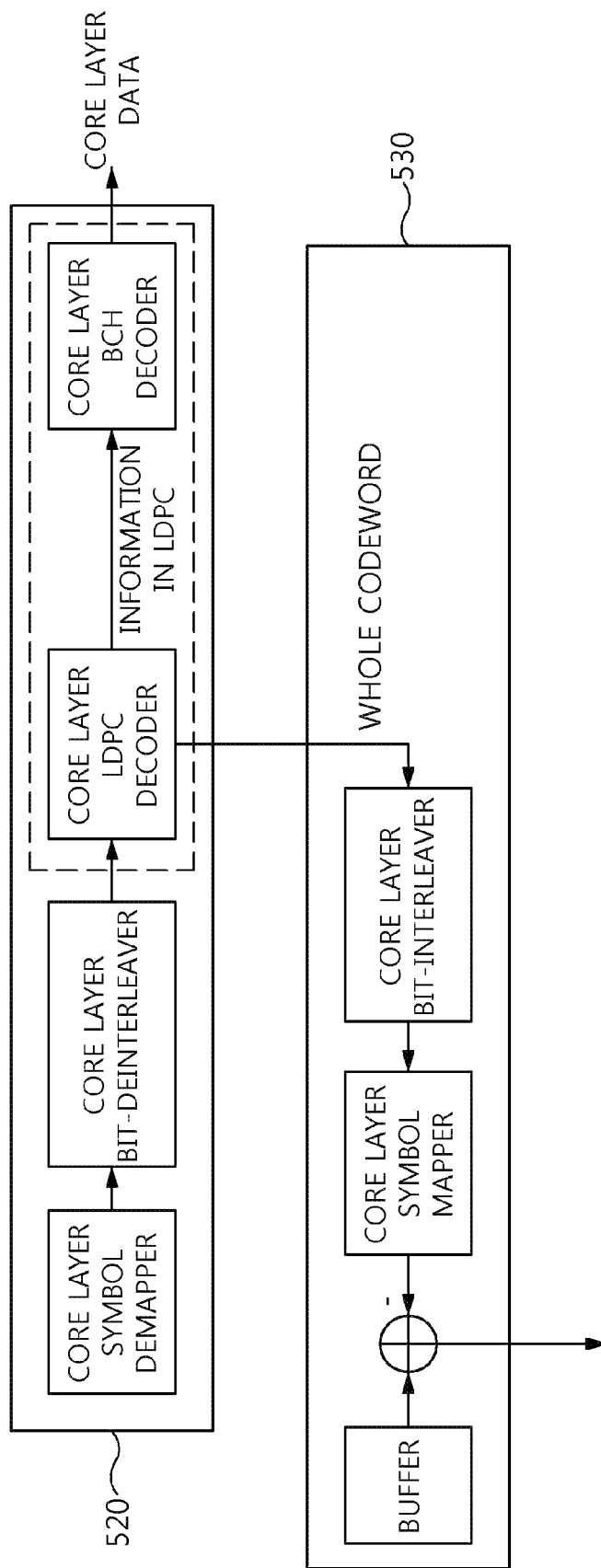
FIG. 9 is a block diagram showing an example of the core layer BICM decoder and the enhanced layer symbol extractor shown in FIG. 8.

FIG. 9 is a block diagram showing an example of the core layer BICM decoder 520 and the enhanced layer symbol extractor 530 shown in FIG. 8.

Referring to FIG. 9, the core layer BICM decoder 520 includes a core layer symbol demapper, a core layer bit deinterleaver, a core layer LDPC decoder, and a core layer BCH decoder.

That is, in the example shown in FIG. 9, the core layer error correction decoder includes the core layer LDPC decoder and the core layer BCH decoder.

Furthermore, in the example shown in FIG. 9, the core layer LDPC decoder provides all code words, including parity bits, to the enhanced layer symbol extractor 530. That is, although the LDPC decoder generally outputs only the information bits of all the LDPC code words, the LDPC decoder may output all the code words.

In this case, although the enhanced layer symbol extractor 530 may be easily implemented because it does not need to include a core layer LDPC encoder or a core layer BCH encoder, there is a possibility that a residual error may remain in the LDPC code parity part.

Figure 10:
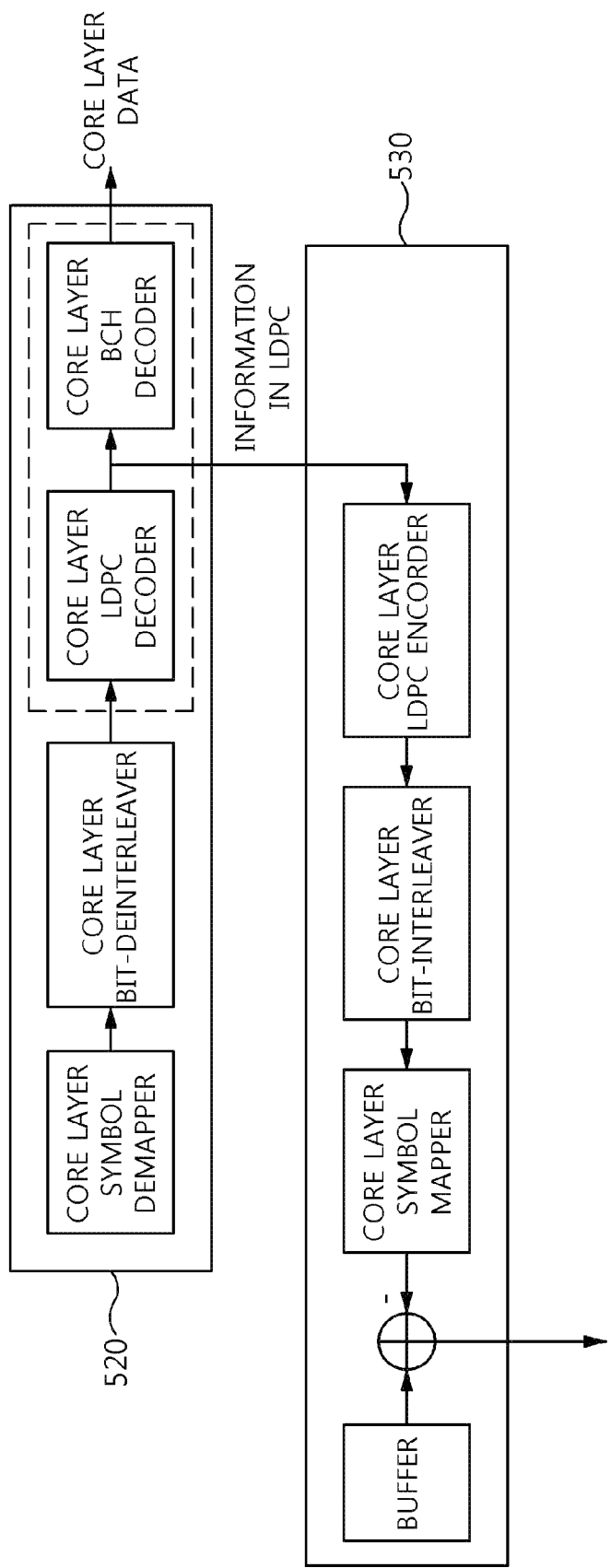
FIG. 10 is a block diagram showing another example of the core layer BICM decoder and the enhanced layer symbol extractor shown in FIG. 8.

FIG. 10 is a block diagram showing another example of the core layer BICM decoder 520 and the enhanced layer symbol extractor 530 shown in FIG. 8.

Referring to FIG. 10, the core layer BICM decoder 520 includes a core layer symbol demapper, a core layer bit deinterleaver, a core layer LDPC decoder, and a core layer BCH decoder.

That is, in the example shown in FIG. 10, the core layer error correction decoder includes the core layer LDPC decoder and the core layer BCH decoder.

Furthermore, in the example shown in FIG. 10, the core layer LDPC decoder provides information bits, excluding parity bits, to the enhanced layer symbol extractor 530.

In this case, although the enhanced layer symbol extractor 530 does not need to include a core layer BCH encoder, it must include a core layer LDPC encoder.

A residual error that may remain in the LDPC code parity part may be eliminated more desirably in the example shown in FIG. 10 than in the example shown in FIG. 9.

Figure 11:
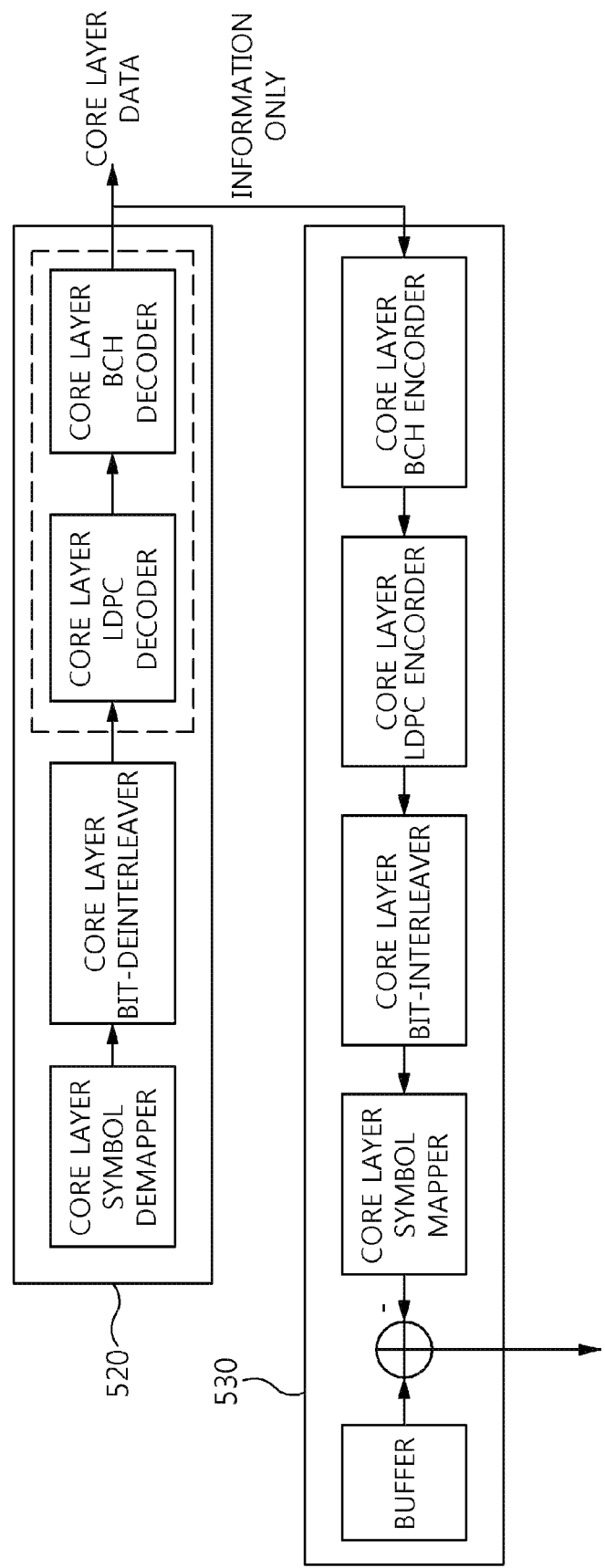
FIG. 11 is a block diagram showing still another example of the core layer BICM decoder and the enhanced layer symbol extractor shown in FIG. 8.

FIG. 11 is a block diagram showing still another example of the core layer BICM decoder 520 and the enhanced layer symbol extractor 530 shown in FIG. 8.

Referring to FIG. 11, the core layer BICM decoder 520 includes a core layer symbol demapper, a core layer bit deinterleaver, a core layer LDPC decoder, and a core layer BCH decoder.

That is, in the example shown in FIG. 11, the core layer error correction decoder includes the core layer LDPC decoder and the core layer BCH decoder.

In the example shown in FIG. 11, the output of the core layer BCH decoder corresponding to core layer data is provided to the enhanced layer symbol extractor 530.

In this case, although the enhanced layer symbol extractor 530 has high complexity because it must include both a core layer LDPC encoder and a core layer BCH encoder, it guarantees higher performance than those in the examples of FIGS. 9 and 10.

Figure 12:
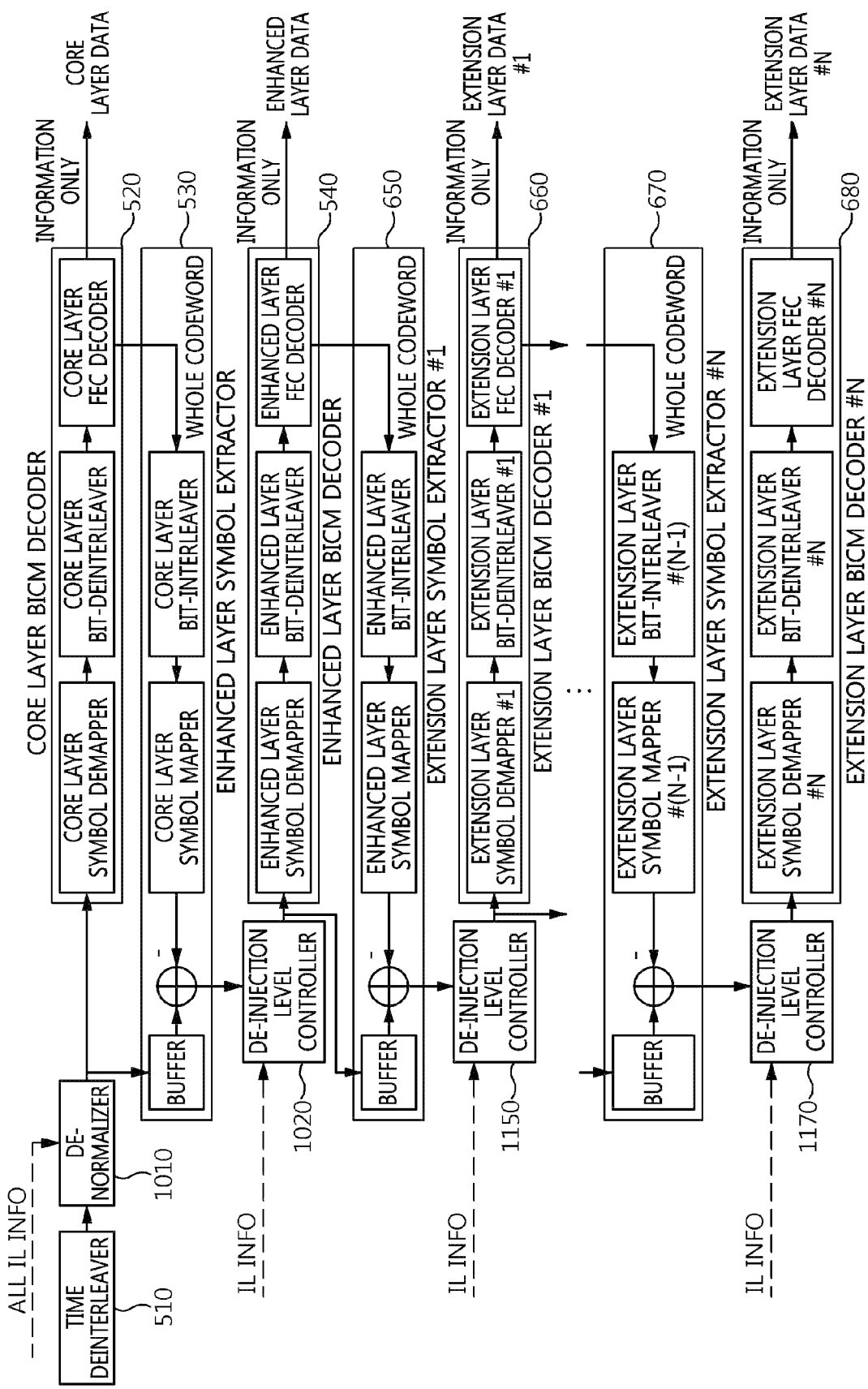
FIG. 12 is a block diagram showing another example of the signal demultiplexer shown in FIG. 1.

FIG. 12 is a block diagram showing another example of the signal demultiplexer shown in FIG. 1.

Referring to FIG. 12, a signal demultiplexer according to an embodiment of the present invention includes a time deinterleaver 510, a de-normalizer 1010, a core layer BICM decoder 520, an enhanced layer symbol extractor 530, an enhanced layer BICM decoder 540, one or more extension layer symbol extractors 650 and 670, one or more extension layer BICM decoders 660 and 680, and de-injection level controllers 1020, 1150 and 1170.

In this case, the signal demultiplexer shown in FIG. 12 may correspond to the apparatus for generating broadcast signal frame shown in FIG. 7.

The time deinterleaver 510 receives a received signal from an OFDM receiver for performing operations, such as synchronization, channel estimation and equalization, and performs an operation related to the distribution of burst errors occurring over a channel. In this case, L1 signaling information may be decoded by the OFDM receiver first, and then may be used for data decoding. In particular, the injection level information of the L1 signaling information may be transferred to the de-normalizer 1010 and the de-injection level controllers 1020, 1150 and 1170.

In this case, the de-normalizer 1010 may obtain the injection level information of all layers, may obtain a de-normalizing factor using Equation 6 below, and may multiply the input signal with the de-normalizing factor:

Although the de-normalizer 1010 is illustrated as adjusting the power of the output signal of the time interleaver 510 in the example shown in FIG. 12, the de-normalizer 1010 may be located before the time interleaver 510 so that power adjustment can be performed before interleaving in an embodiment.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In particular, the core layer error correction decoder may output only information bits, or may output all bits in which information bits have been combined with parity bits. In this case, the core layer error correction decoder may output only information bits as core layer data, and may output all bits in which information bits have been combined with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

The enhanced layer error correction decoder may be also formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

$$\text{De-normalizing factor} = (\text{normalizing factor})^{-1} = \left( \sqrt{\left(1 + 10^{-Injection\ level\ \#1(dB)/10} + 10^{-Injection\ level\ \#2(dB)/10} + \ldots + 10^{-Injection\ level\ \#(N+1)(dB)/10}\right)} \right) \quad (6)$$

That is, the de-normalizing factor is the reciprocal of the normalizing factor expressed by Equation 4 above.

In an embodiment, when the N1 signaling includes not only injection level information but also normalizing factor information, the de-normalizer 1010 may simply obtain a de-normalizing factor by taking the reciprocal of a normalizing factor without the need to calculate the de-normalizing factor using an injection level.

The de-normalizer 1010 corresponds to the power normalizer of the transmitter, and increases power by a level by which the power normalizer has decreased the power.

Moreover, the extension layer error correction decoder may be also formed by connecting an extension layer LDPC decoder and an extension layer BCH decoder in series. That is, the input of the extension layer error correction decoder may be input to the extension layer LDPC decoder, the output of the extension layer LDPC decoder may be input to the extension layer BCH decoder, and the output of the extension layer BCH decoder may become the output of the extension layer error correction decoder.

In particular, the tradeoff between the complexity of implementation, regarding which of the outputs of the error correction decoders will be used, which has been described with reference to FIGS. 9, 10 and 11, and performance is applied to not only the core layer BICM decoder 520 and enhanced layer symbol extractor 530 of FIG. 12 but also the extension layer symbol extractors 650 and 670 and the extension layer BICM decoders 660 and 680.

The enhanced layer symbol extractor 530 may receive the all bits from the core layer BICM decoder 520 of the core layer error correction decoder, and may extract enhanced layer symbols from the output signal of the time deinterleaver 510 or the denormalizer 1010. In an embodiment, the enhanced layer symbol extractor 530 may not receive all bits from the error correction decoder of the core layer BICM decoder 520, but may receive LDPC information bits or BCH information bits.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020.

In this case, the core layer bit interleaver and core layer symbol mapper included in the enhanced layer symbol extractor 530 may be the same as the core layer bit interleaver and the core layer symbol mapper shown in FIG. 7.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540.

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

In particular, the enhanced layer error correction decoder may output only information bits, and may output all bits in which information bits have been combined with parity bits. In this case, the enhanced layer error correction decoder may output only information bits as enhanced layer data, and may output all bits in which information bits have been mixed with parity bits to the extension layer symbol extractor 650.

The extension layer symbol extractor 650 receives all bits from the enhanced layer error correction decoder of the enhanced layer BICM decoder 540, and extracts extension layer symbols from the output signal of the de-injection level controller 1020.

In this case, the de-injection level controller 1020 may amplify the power of the output signal of the subtracter of the enhanced layer symbol extractor 530.

In this case, the extension layer symbol extractor 650 includes a buffer, a subtracter, an enhanced layer symbol mapper, and an enhanced layer bit interleaver. The buffer stores the output signal of the de-injection level controller 1020. The enhanced layer bit interleaver receives the all bits information (bits+parity bits) of the enhanced layer BICM decoder, and performs enhanced layer bit interleaving that is the same as that of the transmitter. The enhanced layer symbol mapper generates enhanced layer symbols, which are the same as those of the transmitter, from the interleaved signal. The subtracter obtains extension layer symbols by subtracting the output signal of the enhanced layer symbol mapper from the signal stored in the buffer, and transfers the extension layer symbols to the extension layer BICM decoder 660.

In this case, the enhanced layer bit interleaver and the enhanced layer symbol mapper included in the extension layer symbol extractor 650 may be the same as the enhanced layer bit interleaver and the enhanced layer symbol mapper shown in FIG. 7.

The de-injection level controller 1150 increases power by a level by which the injection level controller of a corresponding layer has decreased the power at the transmitter.

In this case, the de-injection level controller may be viewed as performing the operation of multiplying the extension layer gain of Equation 7 below. In this case, a 0-th injection level may be considered to be 0 dB:

$$n\text{-}th \text{ extension layer gain} = \frac{10^{-Injection\ level\ \#(n-1)(dB)/10}}{10^{-Injection\ level\ \#n(dB)/10}} \quad (7)$$

The extension layer BICM decoder 660 receives the extension layer symbols whose power has been increased by the de-injection level controller 1150, and restores extension layer data.

In this case, the extension layer BICM decoder 660 may include an extension layer symbol demapper, an extension layer bit deinterleaver, and an extension layer error correction decoder. The extension layer symbol demapper calculates LLR values related to the extension layer symbols, the extension layer bit deinterleaver strongly mixes the calculated LLR values with burst errors, and the extension layer error correction decoder corrects error occurring over a channel.

In particular, each of the extension layer symbol extractor and the extension layer BICM decoder may include two or more extractors or decoders if two or more extension layers are present.

That is, in the example shown in FIG. 12, the extension layer error correction decoder of the extension layer BICM decoder 660 may output only information bits, and may output all bits in which information bits have been combined with parity bits. In this case, the extension layer error correction decoder outputs only information bits as extension layer data, and may output all bits in which information bits have been mixed with parity bits to the subsequent extension layer symbol extractor 670.

The configuration and operation of the extension layer symbol extractor 670, the extension layer BICM decoder 680 and the de-injection level controller 1170 can be easily understood from the configuration and operation of the above-described extension layer symbol extractor 650, extension layer BICM decoder 660 and de-injection level controller 1150.

A lower one of the de-injection level controllers 1020, 1150 and 1170 shown in FIG. 12 may correspond to a larger increase in power. That is, the de-injection level controller 1150 may increase power more than the de-injection level controller 1020, and the de-injection level controller 1170 may increase power more than the de-injection level controller 1150.

It can be seen that the signal demultiplexer shown in FIG. 12 restores core layer data first, restores enhanced layer data using the cancellation of core layer symbols, and restores extension layer data using the cancellation of enhanced layer symbols. Two or more extension layers may be provided, in which case restoration starts with an extension layer combined at a higher power level.

Figure 13:
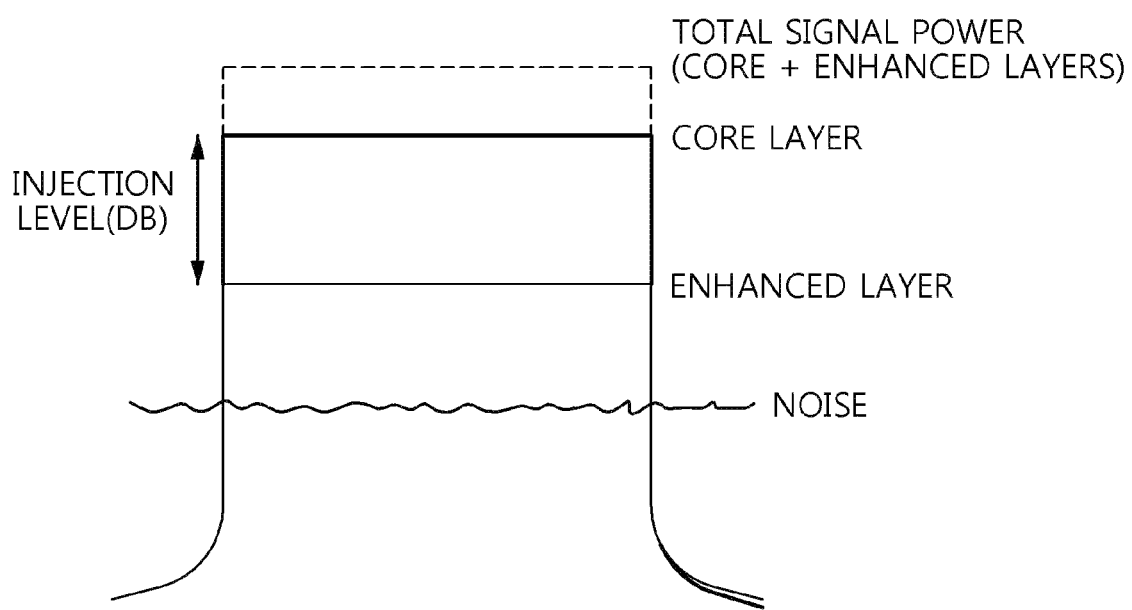
FIG. 13 is a diagram showing an increase in power attributable to the combination of a core layer signal and an enhanced layer signal.

FIG. 13 is a diagram showing in an increase in power attributable to the combination of a core layer signal and an enhanced layer signal.

Referring to FIG. 13, it can be seen that when a multiplexed signal is generated by combining a core layer signal with an enhanced layer signal whose power has been reduced by an injection level, the power level of the multiplexed signal is higher than the power level of the core layer signal or the enhanced layer signal.

In this case, the injection level that is adjusted by the injection level controllers shown in FIGS. 3 and 7 may be adjusted from 0 dB to 25.0 dB in steps of 0.5 dB or 1 dB. When the injection level is 3.0 dB, the power of the enhanced layer signal is lower than that of the core layer signal by 3 dB. When the injection level is 10.0 dB, the power of the enhanced layer signal is lower than that of the core layer signal by 10 dB. This relationship may be applied not only between a core layer signal and an enhanced layer signal but also between an enhanced layer signal and an extension layer signal or between extension layer signals.

The power normalizers shown in FIGS. 3 and 7 may adjust the power level after the combination, thereby solving problems, such as the distortion of the signal, that may be caused by an increase in power attributable to the combination.

Figure 14:
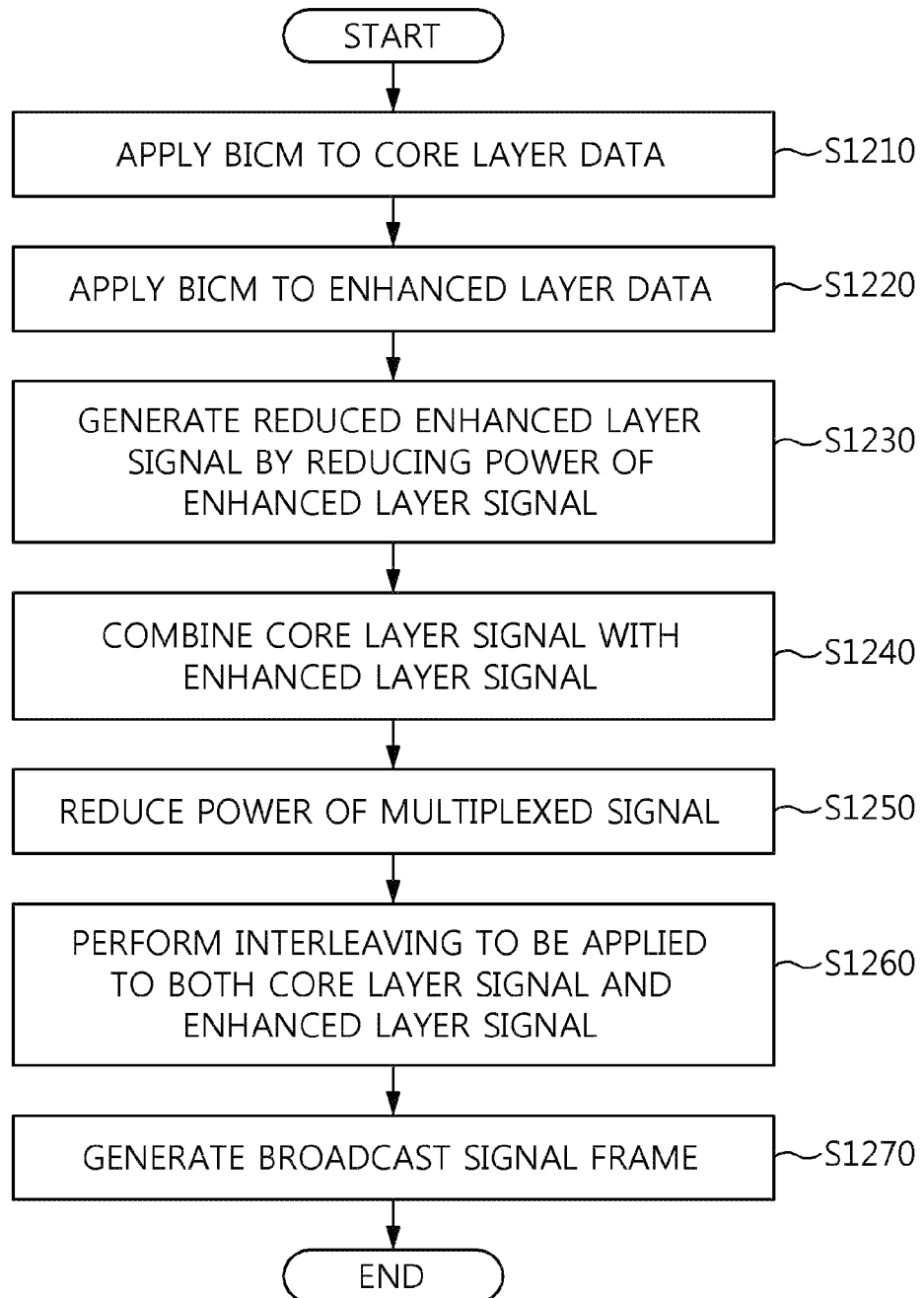
FIG. 14 is an operation flowchart showing a method of generating broadcast signal frame according to an embodiment of the present invention.

FIG. 14 is an operation flowchart showing a method of generating broadcast signal frame according to an embodiment of the present invention.

Referring to FIG. 14, in the method according to the embodiment of the present invention, BICM is applied to core layer data at step S1210.

Furthermore, in the method according to the embodiment of the present invention, BICM is applied to enhanced layer data at step S1220.

The BICM applied at step S1220 may be different from the BICM applied to step S1210. In this case, the BICM applied at step S1220 may be less robust than the BICM applied to step S1210. In this case, the bit rate of the BICM applied at step S1220 may be less robust than that of the BICM applied to step S1210.

In this case, an enhanced layer signal may correspond to the enhanced layer data that is restored based on cancellation corresponding to the restoration of the core layer data corresponding to a core layer signal.

Furthermore, in the method according to the embodiment of the present invention, a power-reduced enhanced layer signal is generated by reducing the power of the enhanced layer signal at step S1230.

In this case, at step S1230, an injection level may be changed from 00 dB to 25.0 dB in steps of 0.5 dB or 1 dB.

Furthermore, in the method according to the embodiment of the present invention, a multiplexed signal is generated by combining the core layer signal and the power-reduced enhanced layer signal at step S1240.

That is, at step S1240, the core layer signal and the enhanced layer signal are combined at different power levels so that the power level of the enhanced layer signal is lower than the power level of the core layer signal.

In this case, at step S1240, one or more extension layer signals having lower power levels than the core layer signal and the enhanced layer signal may be combined with the core layer signal and the enhanced layer signal.

Furthermore, in the method according to the embodiment of the present invention, the power of the multiplexed signal is reduced at step S1250.

In this case, at step S1250, the power of the multiplexed signal may be reduced to the power of the core layer signal. In this case, at step S1250, the power of the multiplexed signal may be reduced by a level by which the power has been increased at step S1240.

Furthermore, in the method according to the embodiment of the present invention, a time-interleaved signal is generated by performing time interleaving that is applied to both the core layer signal and the enhanced layer signal is performed at step S1260.

Furthermore, in the method according to the embodiment of the present invention, a broadcast signal frame including a preamble for signaling type information and size information of Physical Layer Pipes (PLPs) and time interleaver information shared by the core layer signal and the enhanced layer signal is generated using the time-interleaved signal at step S1270.

In this case, the step S1270 may include generating the bootstrap; generating the preamble; and generating a superimposed payload corresponding to the time-interleaved signal.

In this case, the preamble may include a PLP identification information for identifying Physical Layer Pipes (PLPs); and a layer identification information for identifying layers corresponding to division of layers.

In this case, the PLP identification information and the layer identification information may be included in the preamble as fields different from each other.

In this case, the time interleaver information may be included in the preamble for each of the Physical Layer Pipes (PLPs) without checking a condition of a conditional statement corresponding to the layer identification information (j).

In this case, the preamble may selectively include an injection level information corresponding to the injection level controller for each of the Physical Layer Pipes (PLPs) based on a result of comparing (IF(j>0)) the layer identification information with a predetermined value.

In this case, the bootstrap may be shorter than the preamble, and have a fixed-length.

In this case, the bootstrap may include a symbol representing a structure of the preamble, the symbol corresponding to a fixed-length bit string representing a combination of a modulation scheme/code rate, a FFT size, a guard interval length and a pilot pattern of the preamble.

In this case, the symbol may correspond to a lookup table in which a preamble structure corresponding to a second FFT size is allocated prior to a preamble structure corresponding to a first FFT size, the second FFT size being less than the first FFT size when the modulation scheme/code rates are the same, and a preamble structure corresponding to a second guard interval length is allocated prior to a preamble structure corresponding to a first guard interval length, the second guard interval length being longer than the first guard interval length when the modulation scheme/code rates are the same and the FFT sizes are the same.

In this case, the broadcast signal frame may be an ATSC 3.0 frame.

In this case, the L1 signaling information may include injection level information and/or normalizing factor information.

In this case, the preamble may include type information, start position information and size information of the Physical Layer Pipes In this case, the type information may be for identifying one among a first type corresponding to a non-dispersed physical layer pipe and a second type corresponding to a dispersed physical layer pipe.

In this case, the non-dispersed physical layer pipe may be assigned for contiguous data cell indices, and the dispersed physical layer pipe may include two or more subslices.

In this case, the type information may be selectively signaled according to a result of comparing the layer identification information with a predetermined value for each of the Physical Layer Pipes (PLPs).

In this case, the type information may be signaled only for the core layer.

In this case, the start position information may be identical to an index corresponding to the first data cell of the physical layer pipe.

In this case, the start position information may indicate the start position of the physical layer pipe using cell addressing scheme.

In this case, the start position information may be included in the preamble for each of the Physical Layer Pipes (PLPs) without checking a condition of a conditional statement corresponding to the layer identification information.

In this case, the size information may be generated based on the number of data cells assigned to the physical layer pipe.

In this case, the size information may be included in the preamble for each of the Physical Layer Pipes (PLPs) without checking a condition of a conditional statement corresponding to the layer identification information.

Although not explicitly shown in FIG. 14, the method may further include the step of generating signaling information including injection level information corresponding to step S1230. In this case, the signaling information may be L1 signaling information.

The method of generating broadcast signal frame shown in FIG. 14 may correspond to step S210 shown in FIG. 2.

Figure 15:
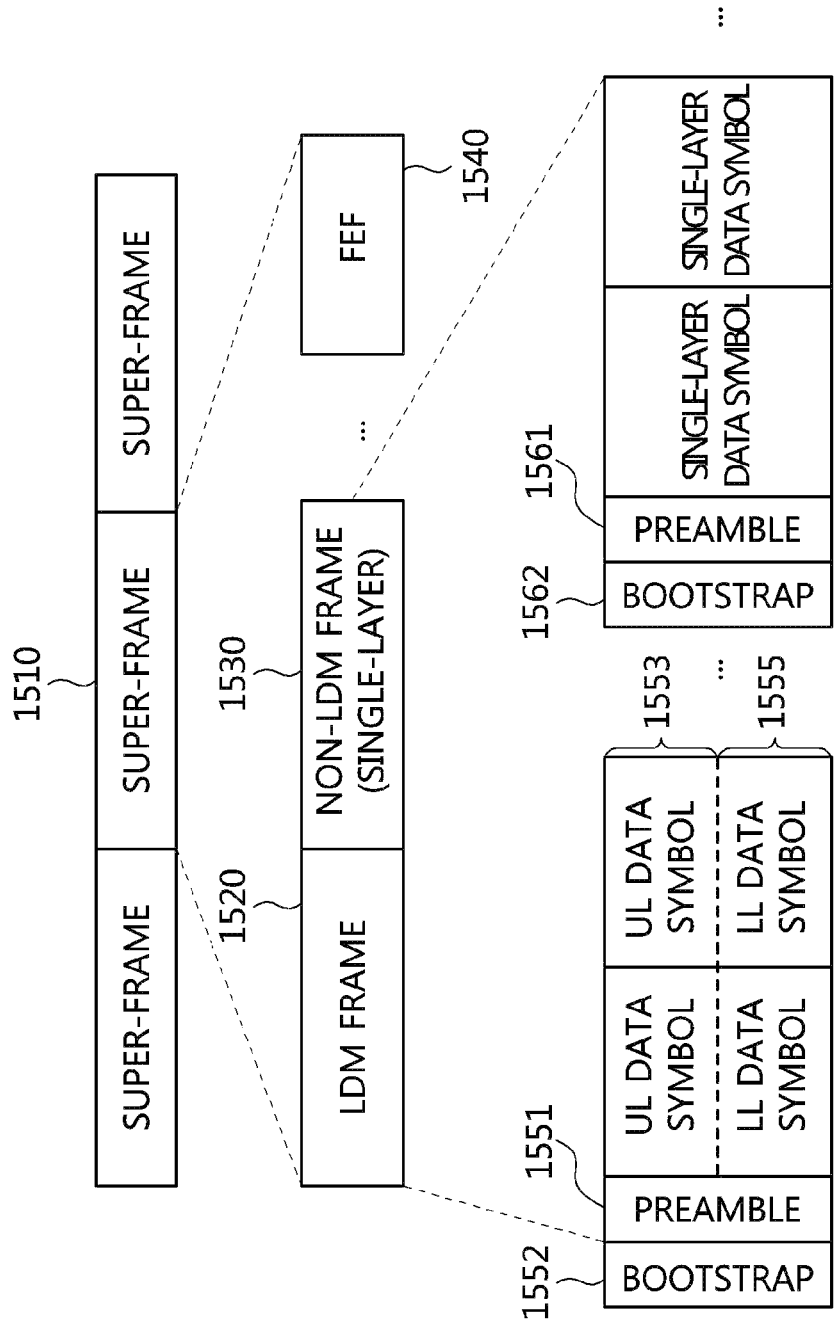
FIG. 15 is a diagram showing a structure of a super-frame which includes broadcast signal frames according to an embodiment of the present invention.

FIG. 15 is a diagram showing a structure of a super-frame which includes broadcast signal frames according to an embodiment of the present invention.

Referring to FIG. 15, the super-frame based on the Layered Division Multiplexing (LDM) configures at least one of frame, and each frame configures at least one of OFDM symbol.

In this case, each OFDM symbol may start with at least one preamble symbol. Moreover, the frame may include a reference symbol or a pilot symbol.

The super-frame 1510 illustrated in FIG. 15, may include an LDM frame 1520, a single layer frame without LDM 1530 and a Future Extension Frame (FEF) for future extensibility 1540 and may be configured using Time Division Multiplexing (TDM).

The LDM frame 1520 may include an Upper Layer (UL) 1553 and a Lower Layer (LL) 1555 when two layers are applied.

In this case, the upper layer 1553 may correspond to the core layer and the lower layer 1555 may correspond to the enhanced layer.

In this case, the LDM frame 1520 which includes the upper layer 1553 and the lower layer 1555 may a bootstrap 1552 and a preamble 1551.

In this case, the upper layer data and the lower layer data may share the time interleaver for reducing complexity and memory size and may use the same frame length and FFT size.

Moreover, the single-layer frame 1530 may include the bootstrap 1562 and the preamble 1561.

In this case, the single-layer frame 1530 may use a FFT size, time interleaver and frame length different from the LDM frame 1520. In this case, the single-layer frame 1530 may be multiplexed with the LDM frame 1520 in the super-frame 1510 based on TDM scheme.

Figure 16:
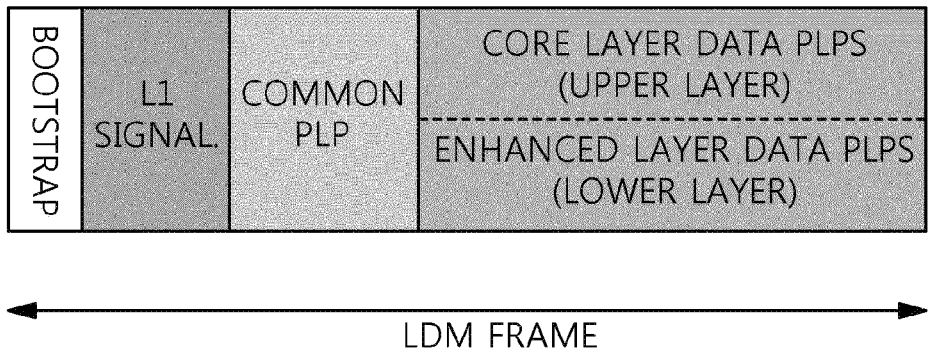
FIG. 16 is a diagram showing an example of an LDM frame including multiple-physical layer pipes and using LDM of two layers.

FIG. 16 is a diagram showing an example of an LDM frame using LDM of two layers and multiple-physical layer pipes.

Referring to FIG. 16, the LDM frame starts with a bootstrap signal including version information of the system or general signaling information. The L1 signaling signal which includes code rate, modulation information, number information of physical layer pipes may follow the bootstrap as a preamble.

The common Physical Layer Pipe (PLP) in a form of burst may be transferred following the preamble (L1 SIGNAL). In this case, the common physical layer pipe may transfer data which can be shared with other physical layer pipes in the frame.

The Multiple-Physical Layer Pipes for servicing broadcasting signals which are different from each other may be transferred using LDM scheme of two layers. In this case, the service (720p or 1080p HD, etc.) which needs robust reception performance such as indoor/mobile may use the core layer (upper layer) data physical layer pipes. In this case, the fixed reception service (4K-UHD or multiple HD, etc.) which needs high transfer rate may use the enhanced layer (lower layer) data physical layer pipes.

If the multiple physical layer pipes are layer-division-multiplexed, it can be seen that the total number of physical layer pipes increases.

In this case, the core layer data physical layer pipe and the enhanced layer data physical layer pipe may share the time interleaver for reducing complexity and memory size. In this case, the core layer data physical layer pipe and the enhanced layer data physical layer pipe may have the same physical layer pipe size (PLP size), and may have physical layer pipe sizes different from each other.

In accordance with the embodiments, the layer-divided PLPs may have PLP sizes different from one another, and information for identifying the stat position of the PLP or information for identifying the size of the PLP may be signaled.

Figure 17:
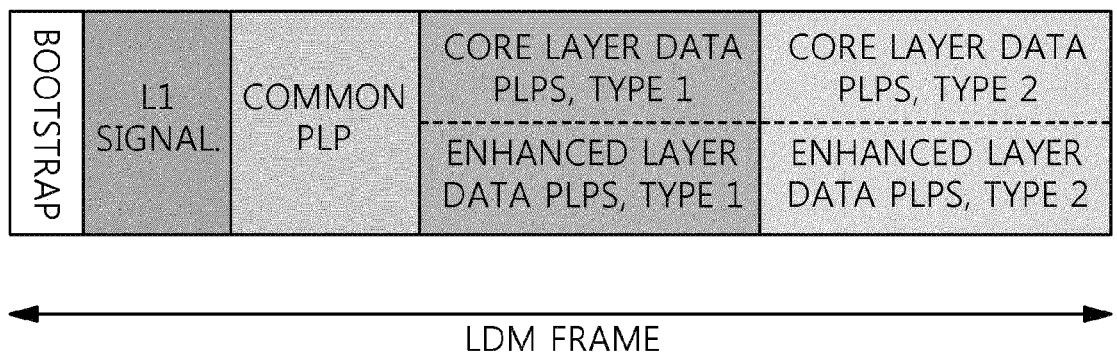
FIG. 17 is a diagram showing another example of an LDM frame including multiple-physical layer pipes and using LDM of two layers.

FIG. 17 is a diagram showing another example of an LDM frame using LDM of two layers and multiple-physical layer pipes.

Referring to FIG. 17, the LDM frame may include the common physical layer pipe after the bootstrap and the preamble (L1 SIGNAL). The core layer data physical layer pipes and the enhanced layer data physical layer pipes may be transferred using two-layer LDM scheme after the common physical layer pipe.

In particular, the core layer data physical layer pipes and the enhanced layer data physical layer pipes of FIG. 17 may correspond to one type among type 1 and type 2. The type 1 and the type 2 may be defined as follows:
Type 1 PLP
It is transferred after the common PLP if the common PLP exists
It is transferred in a form of burst (one slice) in the frame
Type 2 PLP
It is transferred after the type 1 PLP if the type 1 PLP exists
It is transferred in a form of two or more sub-slices in the frame
The time diversity and the power consumption increase as the number of sub-slices increases
In this case, the type 1 PLP may correspond to a non-dispersed PLP, and the type 2 PLP may correspond to a dispersed PLP. In this case, the non-dispersed PLP may assigned for contiguous data cell indices. In this case, the dispersed PLP may assigned to two or more sub slices.

Figure 18:
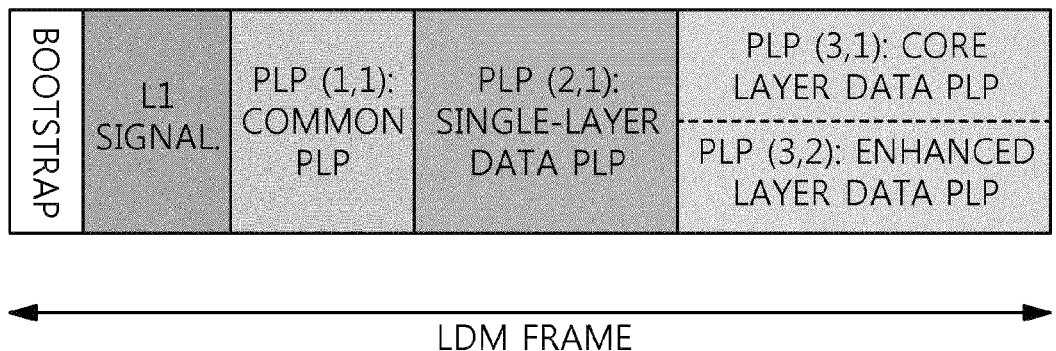
FIG. 18 is a diagram showing an application example of an LDM frame using multiple-physical layer pipes and LDM of two layers.

FIG. 18 is a diagram showing an application example of LDM frame using LDM of two layers and multiple physical layer pipes.

Referring to FIG. 18, the common physical layer pipe (PLP(1,1)) may be included after the bootstrap and the preamble in the LDM frame. The data physical layer pipe (PLP(2,1)) for robust audio service may be included in the LDM frame using the time-division scheme.

Moreover, the core layer data physical layer pipe (PLP (3,1)) for mobile/indoor service (720p or 1080p HD) and the enhanced layer data physical layer pipe (PLP(3,2)) for high data rate service (4K-UHD or multiple HD) may be transferred using 2-layer LDM scheme.

Figure 19:
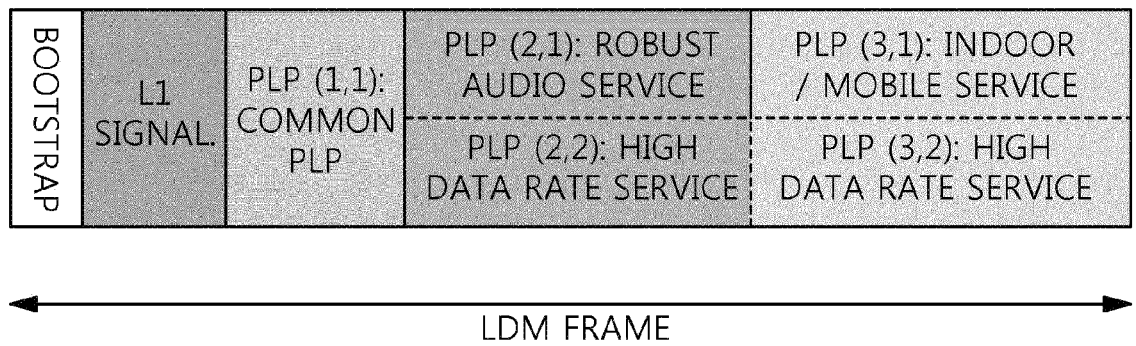
FIG. 19 is a diagram showing another application example of an LDM frame using multiple-physical layer pipes and LDM of two layers.

FIG. 19 is a diagram showing another application example of an LDM frame using LDM of two layers and multiple physical layer pipes.

Referring to FIG. 19, the LDM frame may include the bootstrap, the preamble, the common physical layer pipe (PLP(1,1)). In this case, the robust audio service and mobile/indoor service (720p or 1080p HD) may be transferred using core layer data physical layer pipes (PLP(2,1),PLP(3,1)), and the high data rate service (4K-UHD or multiple HD) may be transferred using the enhanced layer data physical layer pipes (PLP(2,2),PLP(3,2)).

In this case, the core layer data physical layer pipe and the enhanced layer data physical layer pipe may use the same time interleaver.

In this case, the physical layer pipes (PLP(2,2),PLP(3,2)) which provide the same service may be identified using the PLP_GROUP_ID indicating the same PLP group.

In accordance with the embodiment, the service can be identified using the start position and the size of each physical layer pipe without PLP_GROUP_ID when the physical layer pipes which have sizes different from each other for different LDM layers are used.

Although multiple physical layer pipes and layers corresponding to the layered division multiplexing are identified by PLP(i,j) in FIG. 18 and FIG. 19, the PLP identification information and the layer identification information may be signaled as fields different from each other.

In accordance with the embodiment, different layers may use PLPs having different sizes. In this case, each service may be identified using the PLP identifier.

The PLP start position and the PLP size may be signaled for each PLP when PLPs having different sizes are used for different layers.

The following pseudo code is for showing an example of fields included in the preamble according to an embodiment of the present invention. The following pseudo code may be included in the L1 signaling information of the preamble.

[Pseudo Code]

```
SUB_SLICES_PER_FRAME              (15 bits)
NUM_PLP                           (8 bits)
NUM_AUX                           (4 bits)
AUX_CONFIG_RFU                    (8 bits)
for i=0.. NUM_RF-1 {
   RF_IDX                         (3 bits)
   FREQUENCY                      (32 bits)
}
IF S2=='xxx1' {
   FEF_TYPE                       (4 bits)
   FEF_LENGTH                     (22 bits)
   FEF_INTERVAL                   (8 bits)
}
for i=0 .. NUM_PLP-1 {
   NUM_LAYER                      (2~3 bits)
      for j=0 .. NUM_LAYER-1{
      / * Signaling for each layer */
      PLP_ID (i, j)               (8 bits)
      PLP_GROUP_ID                (8 bits)
      PLP_TYPE                    (3 bits)
      PLP_PAYLOAD_TYPE            (5 bits)
      PLP_COD                     (4 bits)
      PLP_MOD                     (3 bits)
      PLP_SSD                     (1 bit)
      PLP_FEC_TYPE                (2 bits)
      PLP_NUM_BLOCKS_MAX          (10 bits)
      IN_BAND_A_FLAG              (1 bit)
      IN_BAND_B_FLAG              (1 bit)
      PLP_MODE                    (2 bits)
      STATIC_PADDING_FLAG         (1 bit)
      IF (j > 0)
         LL_INJECTION_LEVEL       (3~8 bits)
      } / * End of NUM_LAYER loop */
   / * Common signaling for all layers */
   FF_FLAG                        (1 bit)
   FIRST_RF_IDX                   (3 bits)
   FIRST_FRAME_IDX                (8 bits)
   FRAME_INTERVAL                 (8 bits)
   TIME_IL_LENGTH                 (8 bits)
   TIME_IL_TYPE                   (1 bit)
   RESERVED_1                     (11 bits)
   STATIC_FLAG                    (1 bit)
   PLP_START                      (24 bits)
   PLP_SIZE                       (24 bits)
} / * End of NUM_PLP loop */
FEF_LENGTH_MSB                    (2 bits)
RESERVED_2                        (30 bits)
for i=0 .. NUM_AUX-1 {
   AUX_STREAM_TYPE                (4 bits)
   AUX_PRIVATE_CONF               (28 bits)
}
```

The NUM_LAYER may correspond to two bits or three bits in the above pseudo code. In this case, the NUM_LAYER may be a field for identifying the number of layers in each PLP which is divided in time. In this case, the NUM_LAYER may be defined in the NUM_PLP loop so that the number of the layers can be different for each PLP which is divided in time.

The LL_INJECTION_LEVEL may correspond to 3~8 bits. In this case, the LL_INJECTION_LEVEL may be a field for identifying the injection level of the lower layer (enhanced layer). In this case, the LL_INJECTION_LEVEL may correspond to the injection level information.

In this case, the LL_INJECTION_LEVEL may be defined from the second layer (j>0) when the number of layers is two or more.

The fields such as PLP_ID(i,j), PLP_GROUP_ID, PLP_TYPE, PLP_PAYLOAD_TYPE, PLP_COD, PLP_MOD, PLP_SSD, PLP_FEC_TYPE, PLP_NUM_B-LOCKS_MAX, IN_BAND_A_FLAG, IN_BAND_

B_FLAG, PLP_MODE, STATIC_PADDING_FLAG, etc. may correspond to parameters which are defined for each layer, and may be defined inside of the NUM_LAYER loop.

In this case, the PLP_ID(i,j) may correspond to the PLP identification information and the layer identification information. For example, the 'i' of the PLP_ID(i,j) may correspond to the PLP identification information and the 'j' of the PLP_ID(i,j) may correspond to the layer identification information.

In accordance with embodiments, the PLP identification information and the layer identification information may be included in the preamble as fields different from each other.

Moreover, the time interleaver information such as the TIME_IL_LENGTH and TIME_IL_TYPE, etc., the FRAME_INTERVAL which is related to the PLP size and fields such as FF_FLAG, FIRST_RF_IDX, FIRST_FRAME_IDX, RESERVED_1, STATIC_FLAG, etc. may be defined outside of the NUM_LAYER loop and inside of the NUM_PLP loop.

In particular, the PLP_TYPE corresponds to type information of the physical layer pipes and may correspond to 1 bit for identifying one among two types, type 1 and type 2. The PLP_TYPE is included in the preamble without checking a condition of a conditional statement corresponding to the layer identification information (j) in the above pseudo code, but the PLP_TYPE may be selectively signaled (transferred only for the core layer) based on a result (if(j=0)) of comparing the layer identification information (j) with a predetermined value (0).

The PLP_TYPE is defined in the NUM_LAYER loop in the above pseudo code, but the PLP_TYPE may be defined outside of the NUM_LAYER loop and inside of the NUM_PLP loop.

In the above pseudo code, the PLP_START corresponds to a start position of the corresponding physical layer pipe. In this case, the PLP_START may identify the start position using cell addressing scheme. In this case, the PLP_START may be an index corresponding to a first data cell of the corresponding PLP.

In particular, the PLP_START may be signaled for every physical layer pipe and may be used for identifying services using the multiple-physical layer pipes together with a field for signaling the size of the PLP.

The PLP_SIZE in the above pseudo code corresponds to size information of the physical layer pipes. In this case, the PLP_SIZE may be identical to the number of data cells assigned to the corresponding physical layer pipe.

That is, the PLP_TYPE may be signaled based on the layer identification information and the PLP_SIZE and the PLP_START may be signaled for every physical layer pipe without considering the layer identification information.

Channel bonding (CB) enables the bundling of multiple RF channels to provide enhanced spectrum flexibility for broadcasting. CB spreads the data of a single service (PLP) across two classical RF channels. Channel bonding enables increased peak service data rate beyond that offered by a single RF channel. The RF channels do not necessarily need to be adjacent to each other. Thus it is possible to receive channels from the same (e.g. UHF-UHF) and different bands (e.g. VHF-UHF).

Another advantage by channel bonding is a potential increased frequency diversity by extending frequency interleaving across more than one RF channel (inter-RF frequency interleaving). This can be translated into a coverage gain for the reception of all the services transmitted into the two RF channels as well as an increased robustness against potential interferences in each one. A uniform distribution of the encoded data across two RF channels might allow the recovery of data even when one of the RF channels is corrupted as soon as a proper code rate is selected.

The increased robustness against interferences can also benefit frequency planning by means of tighter frequency reuse patterns whereby more RF channels can be used per transmitter station.

Figure 20:
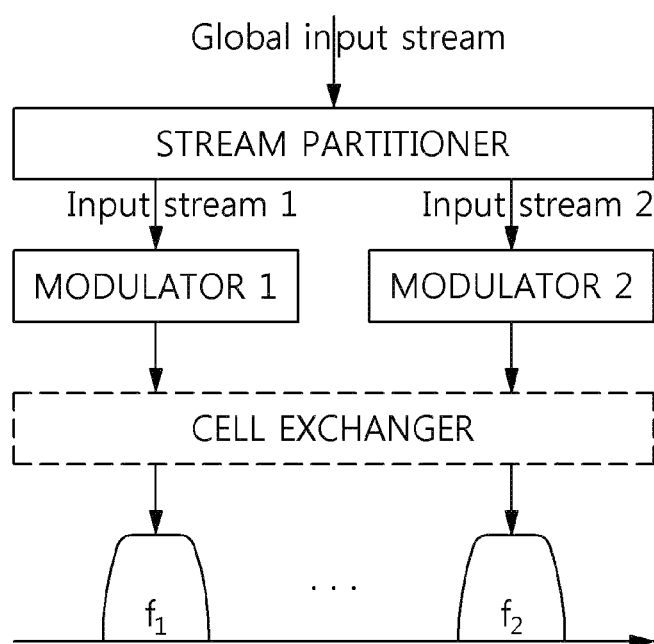
FIG. 20 is a block diagram showing a channel bonding transmitter.

FIG. 20 is a block diagram showing a channel bonding transmitter.

Referring to FIG. 20, the implementation of channel bonding shares most of the blocks of the broadcast signal transmitter (the apparatus for transmitting broadcast signal) using signal RF channel.

At the transmitter, the data of a high-capacity stream is divided into two sub-streams that are independently modulated and transmitted over two different RF channels.

Figure 21:
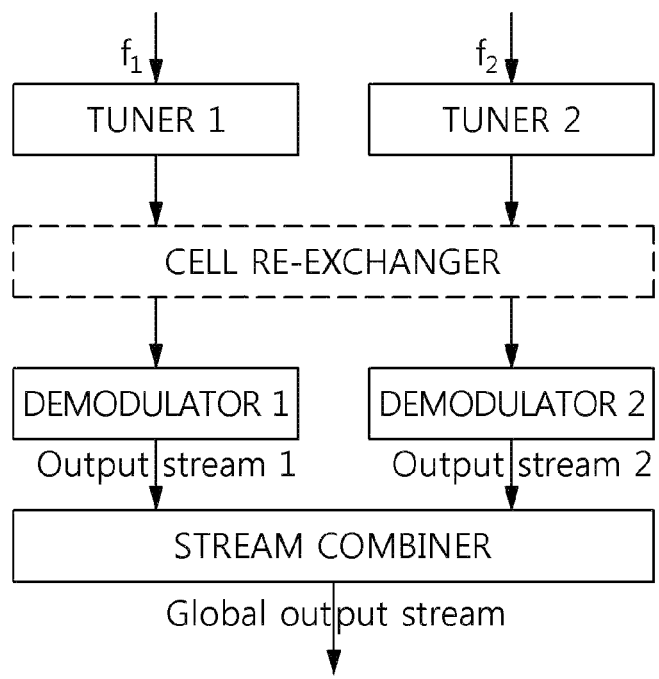
FIG. 21 is a block diagram showing a channel bonding receiver.

FIG. 21 is a block diagram showing a channel bonding receiver.

Referring to FIG. 21, two tuners are required to simultaneously demodulate the data of the two RF channels.

Two BICM decoding chains are also required. The demodulated streams are re-combined to generate the original single data stream.

The cell exchanger and cell re-exchanger of FIG. 20 and FIG. 21 may be by-passed with plain channel bonding and active with SNR averaging channel bonding.

The plain channel bonding enables the transmission of services that exceed single RF channel throughput as a basic mode.

The SNR averaging channel bonding exploits inter-RF frequency interleaving across the two RF channels, improving transmission robustness as a second operation mode. The cell exchanger is employed to ensure an even distribution of the data across two RF channels.

Figure 22:
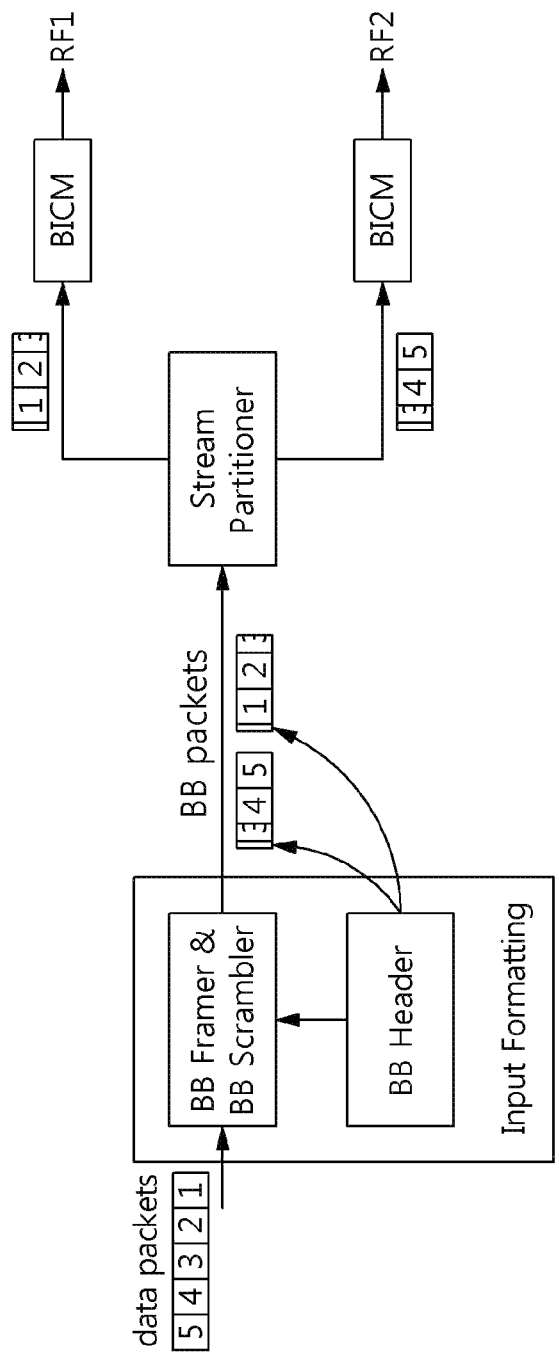
FIG. 22 is a block diagram showing a broadcast signal transmitter with an input formatting block for BB header insertion.

FIG. 22 is a block diagram showing a broadcast signal transmitter with an input formatting block for BB header insertion.

Previous to the stream partitioner, transmitted data shall pass through an input formatting block, where the baseband header (BB header) is inserted. The BB header contains a specific ID for the correct reordering of the packets at receiver side. Once data have been partitioned in BB packets, they are FEC encoded, modulated and transmitted independently on different RF channels.

Figure 23:
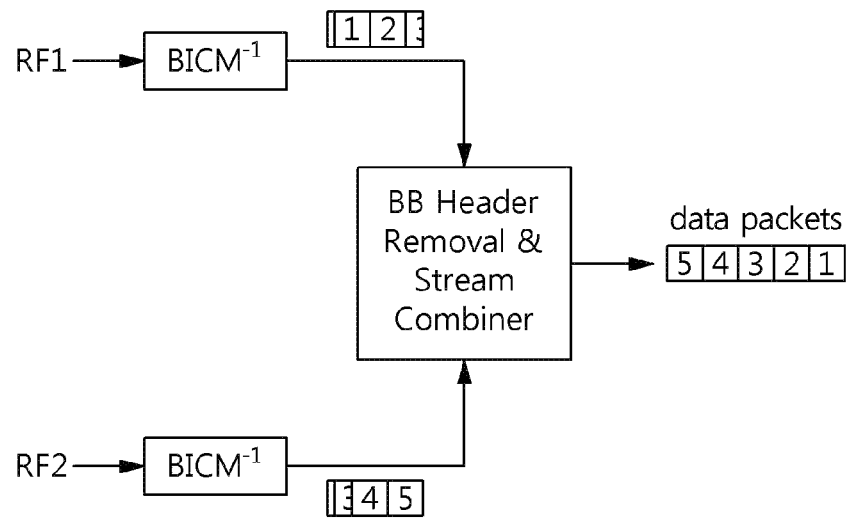
FIG. 23 is a block diagram showing a broadcast signal receiver with a block for BB header removal.

FIG. 23 is a block diagram showing a broadcast signal receiver with a block for BB header removal.

The BB packets are assigned to the two modulation chains of the RF channel proportionally to their rates so that the memory size of the stream combiner circuit at the receiver is not excessive.

BB header removal followed by stream combining is performed at the receiver.

The cell exchanger of FIG. 20 distributes the odd and even cells of each FEC codeword in each RF channel, respectively. The reverse operation takes place at the receiver to recover data.

Figure 24:
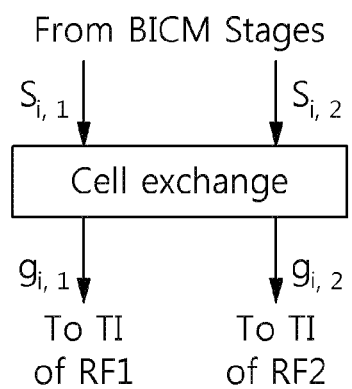
FIG. 24 is a diagram for explaining an operation of the cell exchanger.

FIG. 24 is a diagram for explaining an operation of the cell exchanger.

Referring to FIG. 24, the cell exchanger enables uniform distribution of encoded data across the two RF channels.

FIG. 25 is a diagram for mathematically expressing the output of the cell exchanger.

In FIG. 25, $s_{i,1}$ and $s_{i,2}$ indicates the input cells of the cell exchanger and $g_{i,1}$ and $g_{i,2}$ indicates the output cells.

If the two RF channels are allocated in the same frequency band, SNR averaging CB may be the optimum mode to be used. This mode imposes the PLP rates of both streams to be the same since the cell exchanger requires the same cell rate in each transmitter branch. This way, it is possible to double peak service data rate and obtain an improved RF performance.

Figure 26:
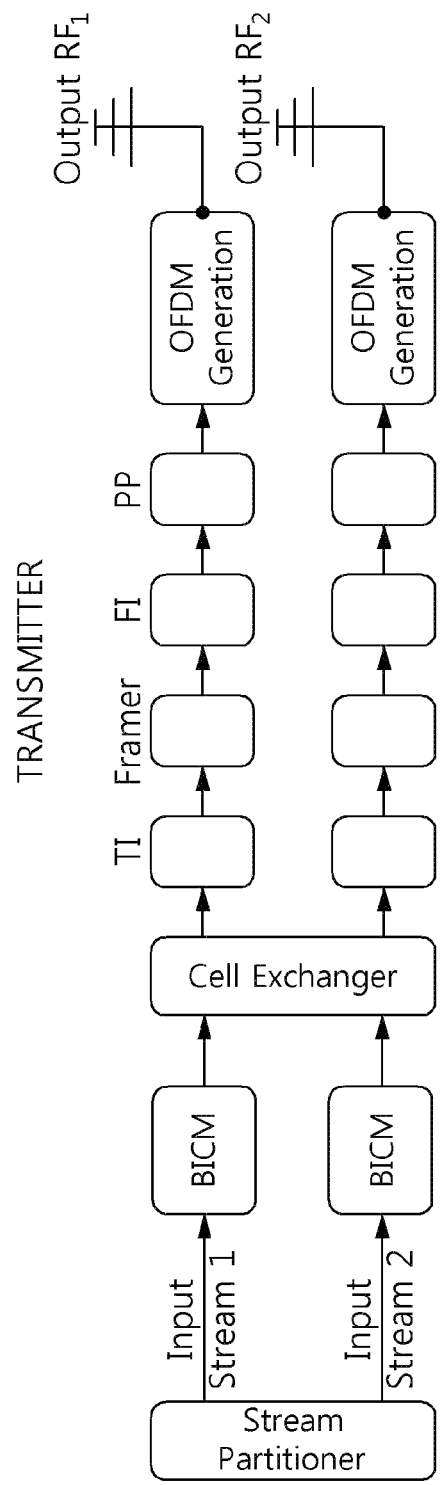
FIG. 26 is a block diagram showing an apparatus for transmitting broadcast signal using SNR averaging CB and same band allocation.

FIG. 26 is a block diagram showing an apparatus for transmitting broadcast signal using SNR averaging CB and same band allocation.

Referring to FIG. 26, the stream partitioner and the cell exchanger are used.

The block denoted as TI in FIG. 26 is a time interleaver, and may be the same as the time interleaver 350 of FIG. 3. The block denoted as Framer in FIG. 26 is a frame builder, and may be the same as the frame builder 370 of FIG. 3.

Moreover, the BICM of FIG. 26 may be the same as the BICM unit 310 or 320 of FIG. 3. The OFDM transmitter (OFDM generation) of FIG. 26 may be the same as the OFDM transmitter 113 of FIG. 1.

The block denoted as FI in FIG. 26 is a frequency interleaver and may perform interleaving corresponding to a frequency domain.

The block denoted as PP is a pilot pattern insertion unit and may perform the pilot pattern insertion.

Figure 27:
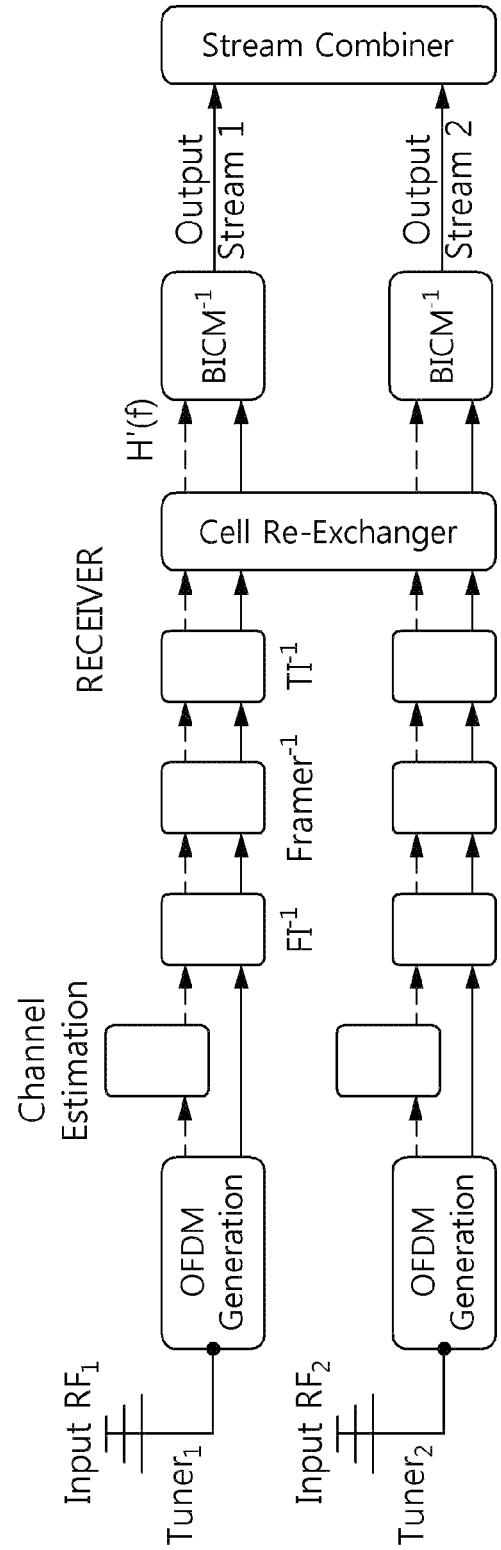
FIG. 27 is a block diagram showing an apparatus for receiving broadcast signal using SNR averaging CB and same band allocation.

FIG. 27 is a block diagram showing an apparatus for receiving broadcast signal using SNR averaging CB and same band allocation.

Referring to FIG. 27, the cell re-exchanger and the stream combiner are used.

The block denoted as $TI^{-1}$ of FIG. 27 is a time deinterleaver and may be the same as the time deinterleaver 510 of FIG. 8. The block denoted as $Framer^{-1}$ may be a block configured to perform a reverse operation of the frame builder.

Moreover, the block denoted as $BICM^{-1}$ of FIG. 27 may be the same as the BICM decoder 520 or 540 of FIG. 8. The OFDM receiver (OFDM generation) of FIG. 27 may be the same as the OFDM receiver 133 of FIG. 1.

The block denoted as $FI^{-1}$ is a frequency deinterleaver and may perform deinterleaving corresponding to the frequency domain.

The channel estimation unit (Channel Estimation) may perform channel estimation using received signals. In this case, the pilot patterns may be used for the channel estimation.

When the RF channels are allocated on different frequency bands, receivers must implement two different types of antenna. The use of SNR averaging is less attractive. Instead, plain CB may be used in this case and also in connection to SHVC (Scalable High efficiency Video Coding). The plain CB with SHVC would make possible to transmit a low data rate layer (SHVC base layer) in one RF channel and a SHVC enhanced layer in the other RF channel. This use case is advantageous for the joint delivery of services for mobile and fixed reception. For example, a mobile device implementing an embedded UHF antenna might be able to demodulate the lower data rate SHVC base layer. Fixed receivers with a UHF+VHF antenna might be able to receive a high quality service by means of combining the base layer with the enhanced layer, the latter one transmitted in the VHF channel.

Figure 28:
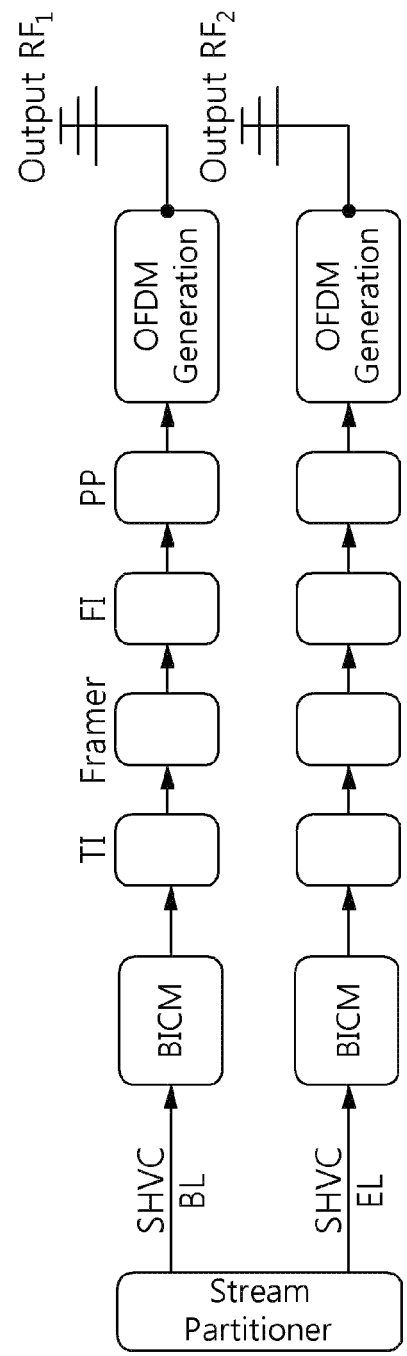
FIG. 28 is a block diagram showing an apparatus for transmitting broadcast signal using plain CB and different bands allocation.

FIG. 28 is a block diagram showing an apparatus for transmitting broadcast signal using plain CB and different bands allocation.

Referring to FIG. 28, each BICM chain modulates each different SHVC layer.

The operations of the blocks of FIG. 28 have been explained through FIG. 26.

Figure 29:
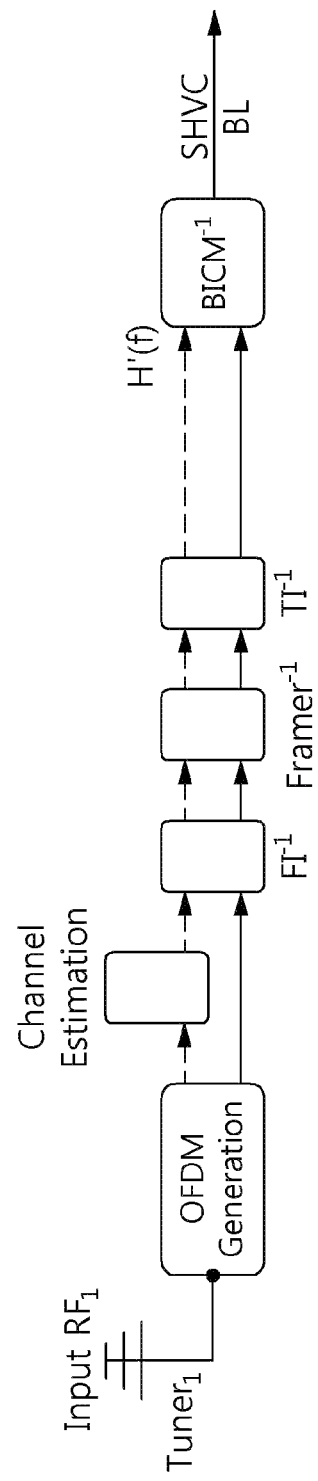
FIG. 29 is a block diagram showing a mobile receiver using plain CB and different bands allocation.

FIG. 29 is a block diagram showing a mobile receiver using plain CB and different bands allocation.

Referring to FIG. 29, the mobile receiver only acquires the SHVC base layer signal (SHVC BL).

Figure 30:
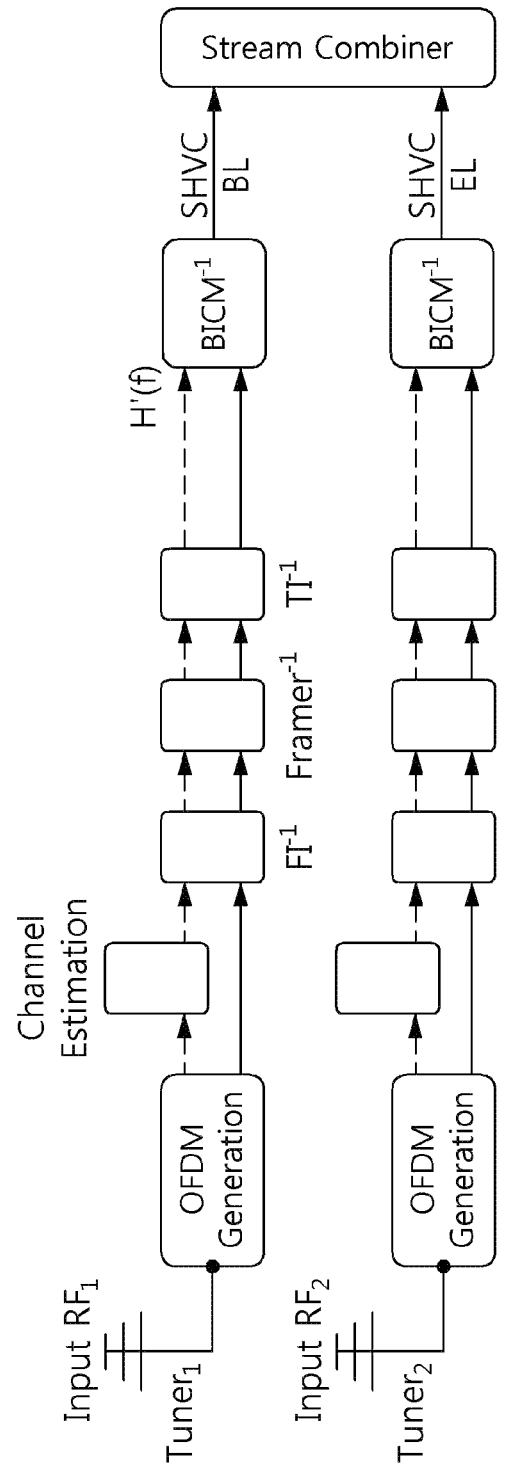
FIG. 30 is a block diagram showing a fixed receiver using plain CB and different bands allocation.

FIG. 30 is a block diagram showing a fixed receiver using plain CB and different bands allocation.

Referring to FIG. 30, the fixed receiver recovers both SHVC layers (SHVC BL, SHVC EL).

The operations of the blocks of FIGS. 29 and 30 have been explained through FIG. 27.

The main purpose of layered division multiplexing (LDM) is the simultaneous provision of fixed and mobile services sharing the same time-frequency resources. The combination (joint implementation) of LDM and CB leads to the following use cases:

Plain CB for the LDM Enhanced Layer

In this use case, CB is applied only to the LDM fixed service layer. The peak data rate of the service can be doubled although no frequency diversity gain is achieved. The LDM mobile layer would not implement CB, which does not increase mobile receiver complexity.

LDM with CB SNR Averaging

In this use case, the mobile and fixed service data rates can be doubled because of the combination of 2 RF channels. SNR averaging can exploit inter-RF frequency diversity to enhance the transmission robustness. From an implementation point of view, the use of the cell-exchanger imposes that the same LDM transmission mode is used in the two RF channels.

In plain CB for the LDM Enhanced Layer, the LDM core layer does not benefit from an increased peak service data rate. However, this would not force the implementation of two tuners at mobile receivers, thus, relaxing the mobile receiver complexity. On the other hand, the EL would benefit from the Plain CB advantages.

The plain CB may be the only admissible CB mode due to the impossibility of mixing two independent core layer (CL) streams at the cell exchanger.

Figure 31:
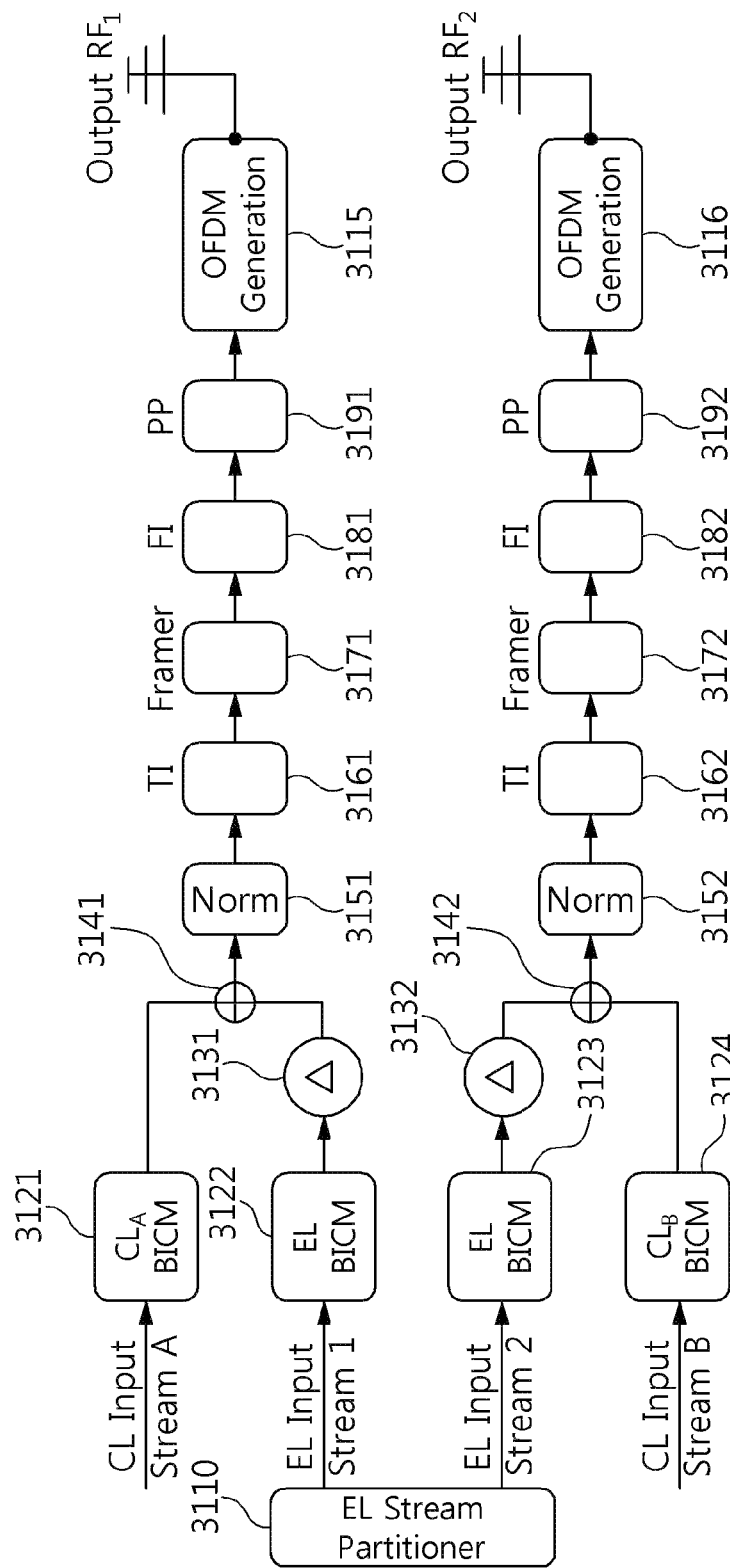
FIG. 31 is a block diagram showing an apparatus for transmitting broadcast signal according to an embodiment of the present invention.

FIG. 31 is a block diagram showing an apparatus for transmitting broadcast signal according to an embodiment of the present invention.

Referring to FIG. 31, the apparatus for transmitting broadcast signal according to an embodiment of the present invention includes an enhanced layer stream partitioner 3110, the first core layer BICM unit 3121, the second core layer BICM unit 3124, the first and second enhanced layer BICM units 3122 and 3123, the first and second injection level controllers 3131 and 3132, combiners 3141 and 3142, power normalizers 3151 and 3152, time interleavers 3161 and 3162, frame builders 3171 and 3172, frequency interleavers 3181 and 3182, pilot pattern insertion units 3191 and 3192, and OFDM transmitters 3115 and 3116.

The enhanced layer stream partitioner 3110 generates the first enhanced layer partitioned signal (EL Input Stream 1) and the second enhanced layer partitioned signal (EL Input Stream 2) by partitioning an enhanced layer stream.

Each of the first and the second core layer BICM units 3121, 3124 and the first and second enhanced layer BICM units 3122 and 3123 may be one of the BICM units 310 and 320 of FIG. 3.

Each of the injection level controllers 3131 and 3132 may be the injection level controller 330 of FIG. 3.

The combiner 3141 generates the first multiplexed signal corresponding to the first enhanced layer partitioned signal (EL input stream 1). The combiner 3142 generates the second multiplexed signal corresponding to the second enhanced layer partitioned signal (EL input stream 2). Each of the combiners 3141 and 3142 may be the combiner 340 of FIG. 3. The combiner 3141 may generate the first multiplexed signal by combining the first core layer signal and the first enhanced layer partitioned signal at power levels different from each other. The combiner 3142 may generate the second multiplexed signal by combining the second core layer signal and the second enhanced layer partitioned signal at power levels different from each other.

The power normalizer 3151 reduces the power of the first multiplexed signal to power level corresponding to the first core layer signal. The power normalizer 3152 reduces the power of the second multiplexed signal to power level corresponding to the second core layer signal. Each of the power normalizers 3151 and 3152 may be the power normalizer 345 of FIG. 3.

The time interleaver 3161 generates the first time-interleaved signal corresponding to the first enhanced layer partitioned signal. The time interleaver 3162 generates the second time-interleaved signal corresponding to the second enhanced layer partitioned signal. Each of the time interleavers 3161 and 3162 may be the time interleaver 350 of FIG. 3.

Each of the frame builders 3171 and 3172 may be the frame builder 370 of FIG. 3.

The operations of the frequency interleavers 3181, 3182 and pilot pattern insertion units 3191 and 3192 have already been explained.

The OFDM transmitter 3115 transmits the signal corresponding to the first time-interleaved signal using the OFDM communication scheme. The OFDM transmitter 3116 transmits the signal corresponding to the second time interleaved signal using the OFDM communication scheme. Each of the OFDM transmitters 3115 and 3116 may be the OFDM transmitter 113 of FIG. 1.

In the exemplary embodiment of FIG. 31, the first core layer signal and the second core layer signal may be independent from each other.

The inputs of the apparatus of FIG. 31 are two independent core layer (CL) streams and one enhanced layer (EL) stream that is divided into two EL sub-streams. Each EL sub-stream (each enhanced layer partitioned signal) is LDM-aggregated to one of the CL streams forming two LDM signals which are transmitted in different RF channels. Thus, the stream partitioner is only applied to the EL stream.

Figure 32:
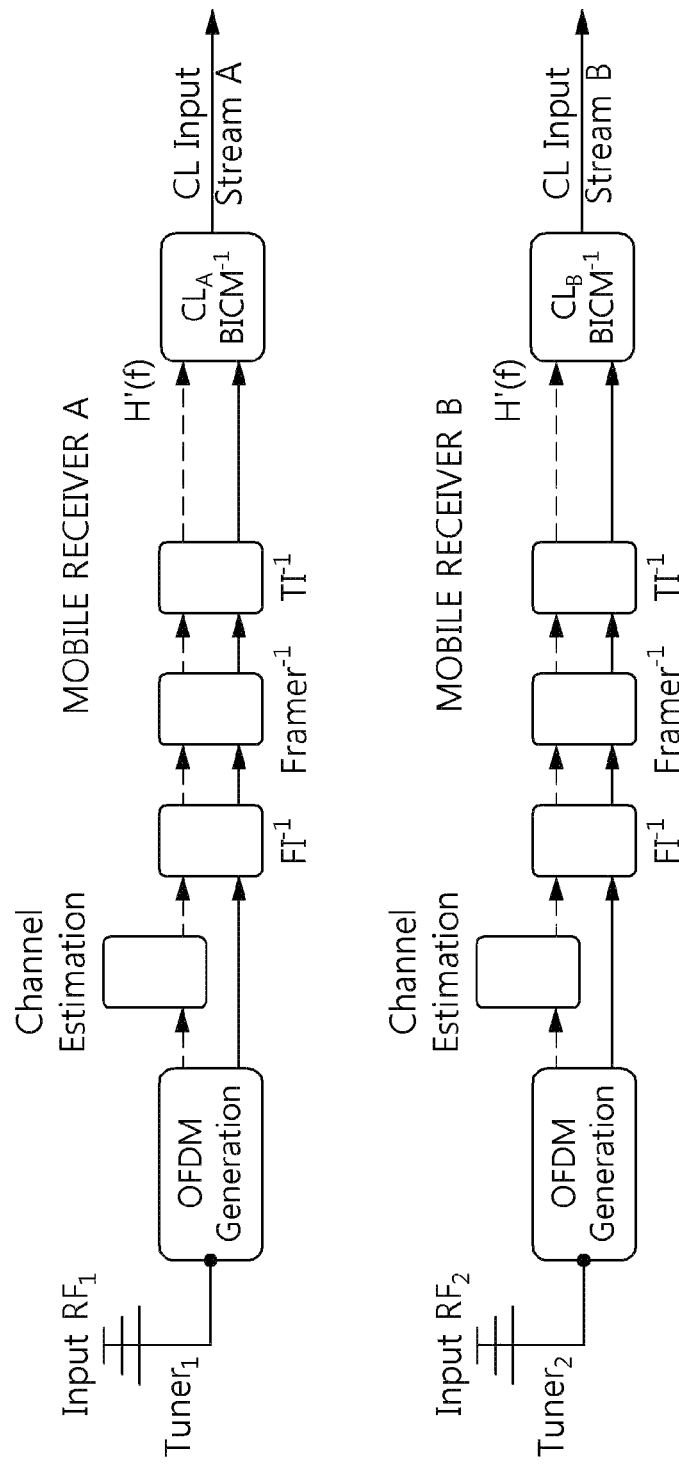
FIG. 32 is a block diagram showing a mobile broadcast signal receivers according to an embodiment of the present invention.

FIG. 32 is a block diagram showing a mobile broadcast signal receivers according to an embodiment of the present invention.

Referring to FIG. 32, the mobile broadcast signal receivers according to an embodiment of the present invention are single-tuner receivers, respectively.

Each of the mobile broadcast signal receivers of FIG. 32 receives one CL stream depending on the RF channel to which they are tuned.

Figure 33:
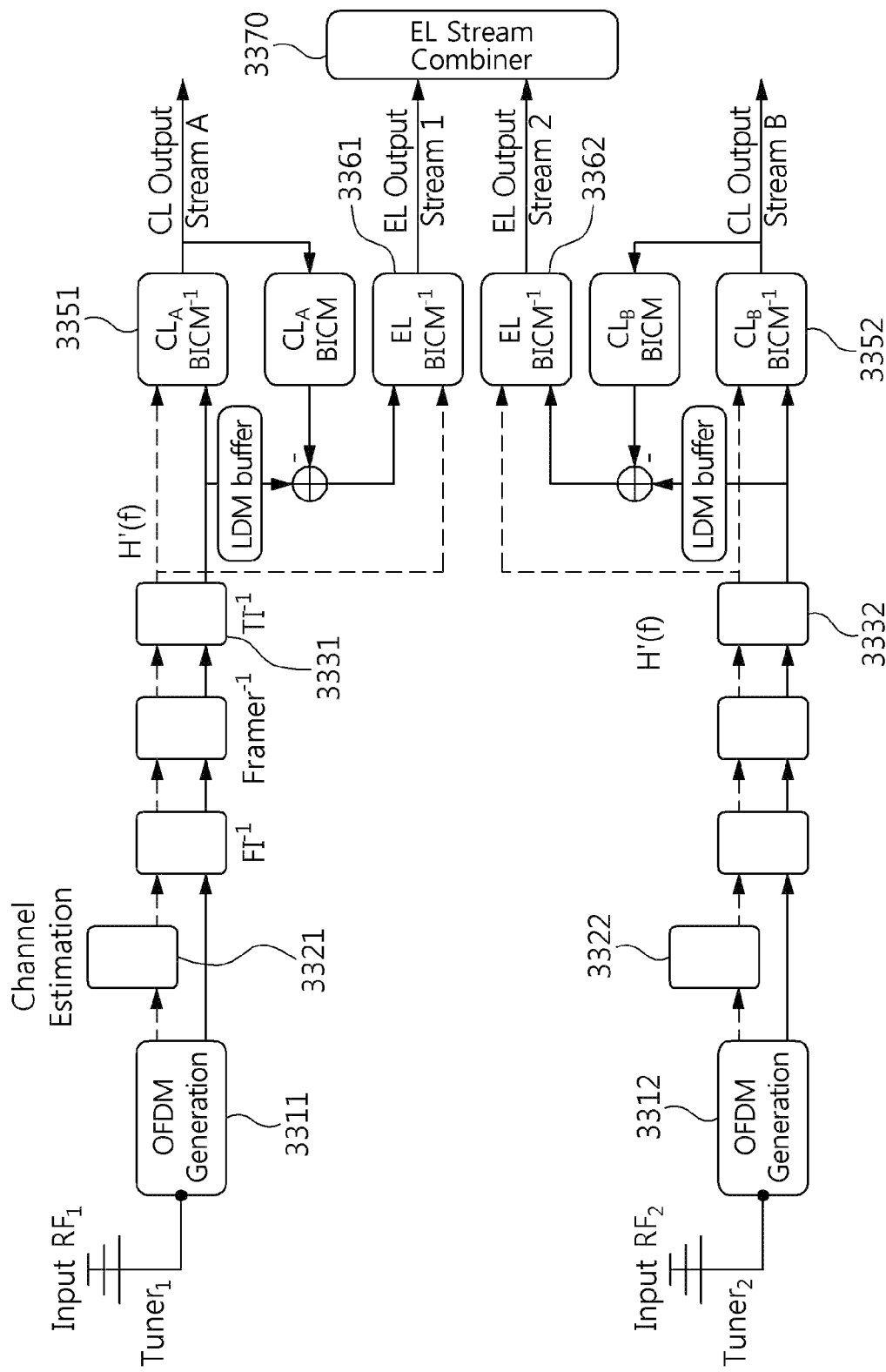
FIG. 33 is a block diagram showing a fixed broadcast signal receiver according to an embodiment of the present invention.

FIG. 33 is a block diagram showing a fixed broadcast signal receiver according to an embodiment of the present invention.

Referring to FIG. 33, the fixed broadcast signal receiver according to an embodiment of the present invention includes OFDM receivers 3311, 3312, channel estimation units 3321, 3322, time deinterleavers 3331, 3332, core layer BICM decoders 3351, 3352, enhanced layer BICM decoders 3361, 3362 and an enhanced layer stream combiner 3370.

The OFDM receiver 3311 receives the first receiving signal. The OFDM receiver 3312 receives the second receiving signal. Each of the OFDM receivers 3311 and 3312 may be the OFDM receiver 133 of FIG. 1.

The time deinterleaver 3331 generates the first time deinterleaving signal by applying time deinterleaving to the first receiving signal. The time deinterleaver 3332 generates the second time deinterleaving signal by applying time deinterleaving to the second receiving signal. Each of the time deinterleaver 3331 and 3332 may be the time deinterleaver 510 of FIG. 8.

The core layer BICM decoder 3351 restores the first core layer signal (CL Output Stream A) from the signal corresponding to the first receiving signal. The core layer BICM decoder 3352 restores the second core layer signal (CL Output Stream B) from the signal corresponding to the second receiving signal. Each of the core layer BICM decoders 3351 and 3352 may be the core layer BICM decoder 520 of FIG. 8.

The enhanced layer BICM decoder 3361 restores the first enhanced layer partitioned signal (EL Output Stream 1) based on cancellation corresponding to the first core layer signal. The enhanced layer BICM decoder 3362 restores the second enhanced layer partitioned signal (EL Output Stream 2) based on cancellation corresponding to the second core layer signal. Each of the enhanced layer BICM decoder 3361 and 3362 may be the enhanced layer BICM decoder 540 of FIG. 8.

The enhanced layer stream combiner 3370 generates the enhanced layer stream by combining the first enhanced layer partitioned signal (EL Output Stream 1) and the second enhanced layer partitioned signal (EL Output Stream 1).

In this case, the first core layer signal and the second core layer signal may be independent from each other.

The fixed broadcast signal receiver of FIG. 33 first recovers the two independent CL streams with two different tuners. Then, the LDM cancellation process takes place in order to obtain the two EL sub-streams, which are finally re-combined in the stream combiner.

In LDM with CB SNR averaging, the SNR averaging channel bonding is applied for both LDM layers (the core layer and enhanced layer). Although the use of plain CB for both layers is also possible, the implementation of SNR averaging CB is proper when the two RF channels are in the same band in order to also exploit the frequency diversity gain.

Figure 34:
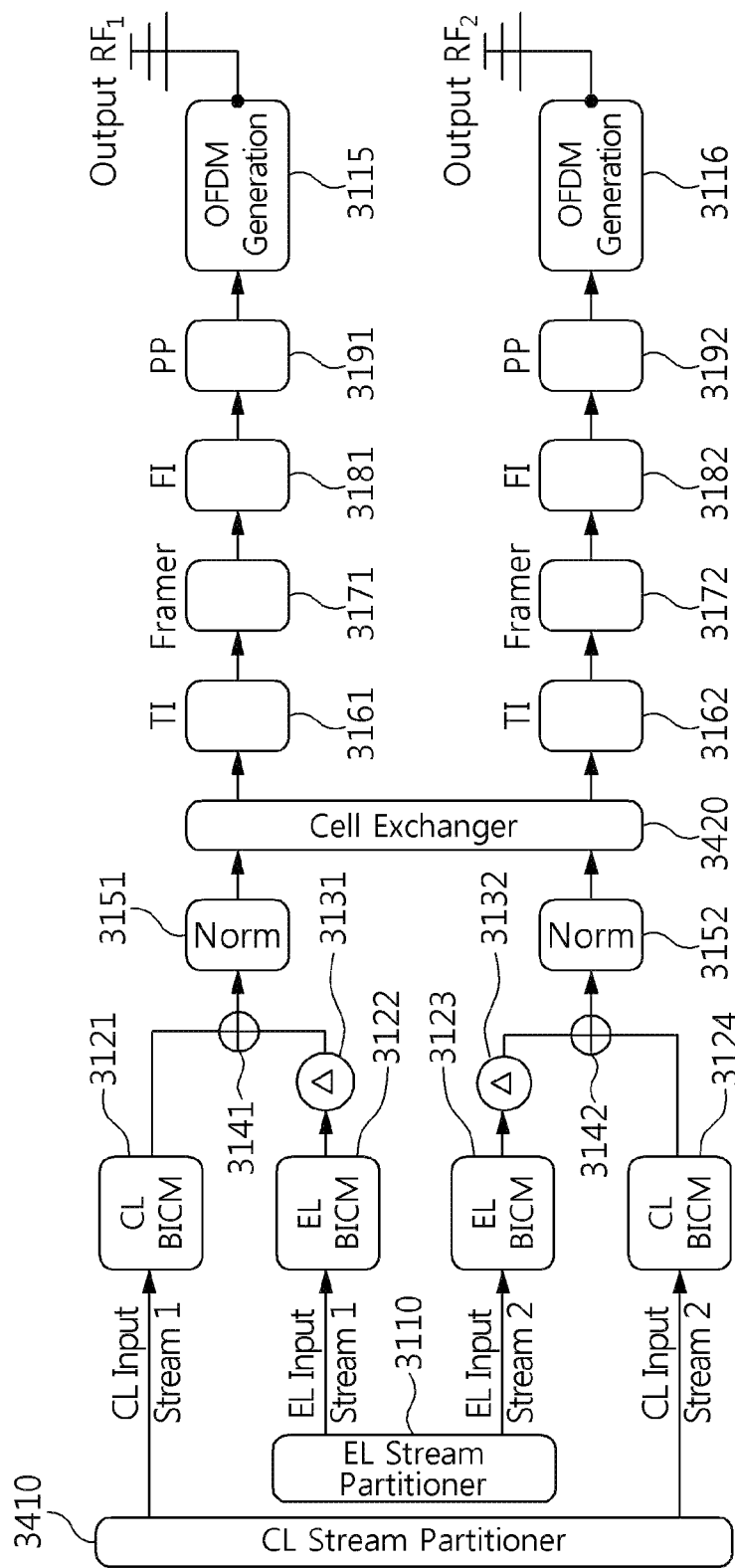
FIG. 34 is a block diagram showing an apparatus for transmitting broadcast signal according to another embodiment of the present invention.

FIG. 34 is a block diagram showing an apparatus for transmitting broadcast signal according to another embodiment of the present invention.

Referring to FIG. 34, the apparatus for transmitting broadcast signal according to another embodiment of the present invention includes a core layer stream partitioner 3410, a cell exchanger 3420, an enhanced layer stream partitioner 3110, the first core layer BICM unit 3121, the second core layer BICM unit 3124, the first and second enhanced layer BICM units 3122 and 3123, the first and second injection level controllers 3131 and 3132, combiners 3141 and 3142, power normalizers 3151 and 3152, time interleavers 3161 and 3162, frame builders 3171 and 3172, frequency interleavers 3181 and 3182, pilot pattern insertion units 3191 and 3192, and OFDM transmitters 3115 and 3116.

The core layer stream partitioner 3410 generates the first core layer signal (CL Input Stream 1) and the second core layer signal (CL Input Stream 2) by partitioning a core layer stream.

The enhanced layer stream partitioner 3110 generates the first enhanced layer partitioned signal (EL Input Stream 1) and the second enhanced layer partitioned signal (EL Input Stream 2) by partitioning the enhanced layer stream.

Each of the first and the second core layer BICM units 3121, 3124 and the first and second enhanced layer BICM units 3122 and 3123 may be one of the BICM units 310 and 320 of FIG. 3.

Each of the injection level controllers 3131 and 3132 may be the injection level controller 330 of FIG. 3.

The combiner 3141 generates the first multiplexed signal corresponding to the first enhanced layer partitioned signal (EL input stream 1). The combiner 3142 generates the second multiplexed signal corresponding to the second enhanced layer partitioned signal (EL input stream 2). Each of the combiners 3141 and 3142 may be the combiner 340 of FIG. 3. The combiner 3141 may generate the first multiplexed signal by combining the first core layer signal and the first enhanced layer partitioned signal at power levels different from each other. The combiner 3142 may generate the second multiplexed signal by combining the second core layer signal and the second enhanced layer partitioned signal at power levels different from each other.

The power normalizer 3151 reduces the power of the first multiplexed signal to power level corresponding to the first core layer signal. The power normalizer 3152 reduces the power of the second multiplexed signal to power level corresponding to the second core layer signal. Each of the power normalizers 3151 and 3152 may be the power normalizer 345 of FIG. 3.

The cell exchanger 3420 distributes odd and even cells from the output signals of the power normalizers 3151 and 3152.

The time interleaver 3161 generates the first time-interleaved signal corresponding to the first enhanced layer partitioned signal. The time interleaver 3162 generates the second time-interleaved signal corresponding to the second enhanced layer partitioned signal. Each of the time interleavers 3161 and 3162 may be the time interleaver 350 of FIG. 3.

Each of the frame builders 3171 and 3172 may be the frame builder 370 of FIG. 3.

The operations of the frequency interleavers 3181, 3182 and pilot pattern insertion units 3191 and 3192 have already been explained.

The OFDM transmitter 3115 transmits the signal corresponding to the first time-interleaved signal using the OFDM communication scheme. The OFDM transmitter 3116 transmits the signal corresponding to the second time interleaved signal using the OFDM communication scheme. Each of the OFDM transmitters 3115 and 3116 may be the OFDM transmitter 113 of FIG. 1.

In this case, the OFDM transmitters 3115 and 3116 may use the same frequency band.

In contrast to the embodiment of FIG. 31, the CL substreams are no longer independent but form part of a stream that is partitioned in the embodiment of FIG. 34. In such case, two stream partitioners (one per layer stream) are required. The cell exchanger 3420 is in charge of uniform distribute the CL+EL cells.

Figure 35:
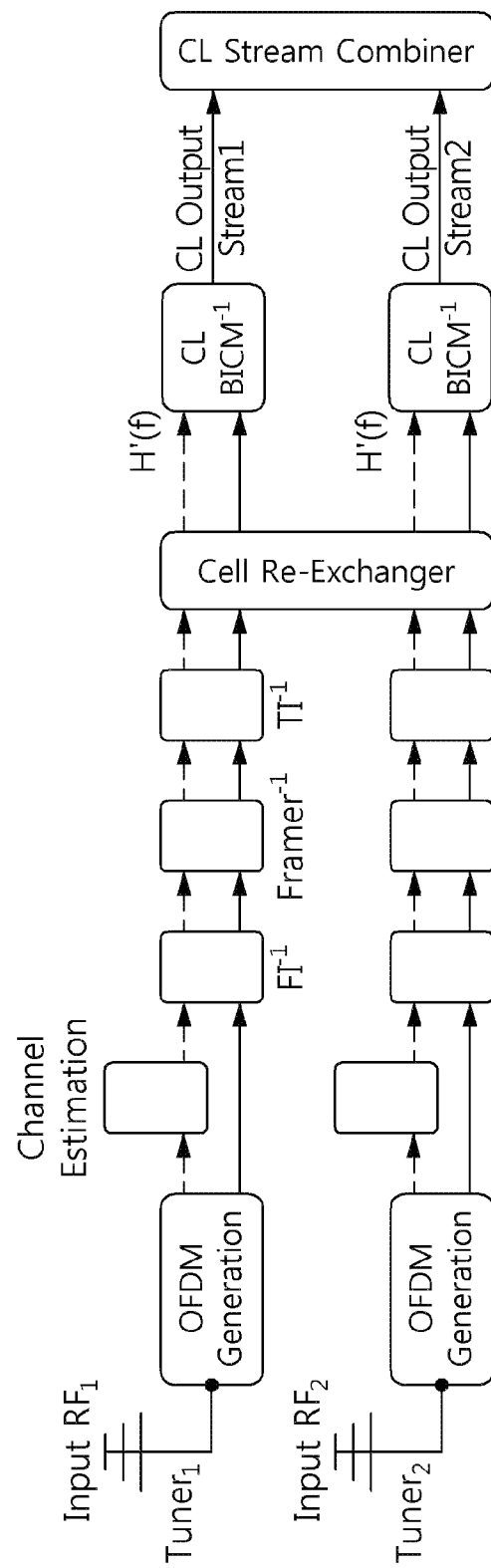
FIG. 35 is a block diagram showing a mobile broadcast signal receiver according to another embodiment of the present invention.

FIG. 35 is a block diagram showing a mobile broadcast signal receiver according to another embodiment of the present invention.

Referring to FIG. 35, the mobile broadcast signal receiver should implement two tuners. The cell re-exchanger is used in order to get the core layer stream.

Figure 36:
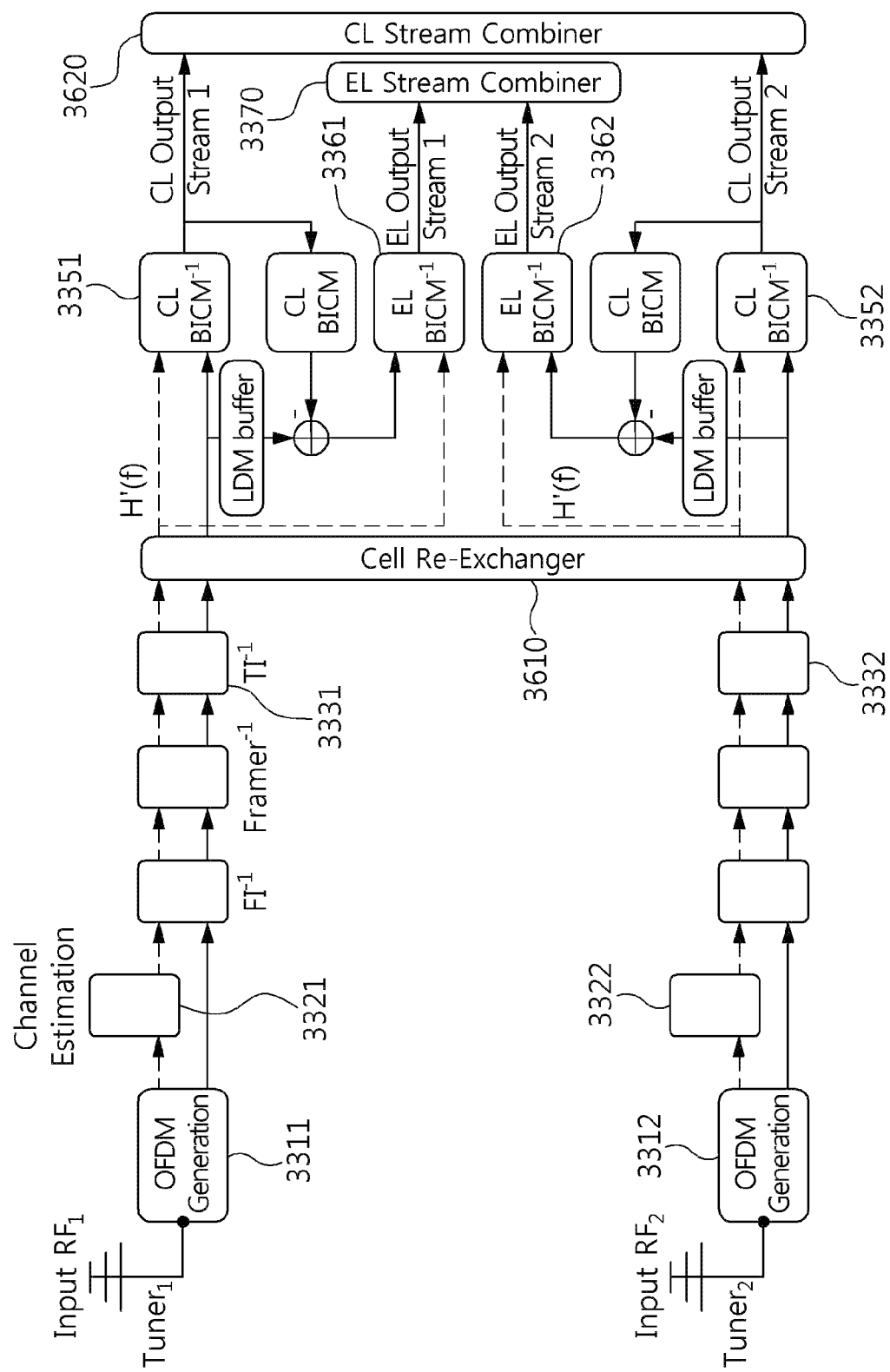
FIG. 36 is a block diagram showing a fixed broadcast signal receiver according to another embodiment of the present invention.

FIG. 36 is a block diagram showing a fixed broadcast signal receiver according to another embodiment of the present invention.

Referring to FIG. 36, the fixed broadcast signal receiver according to another embodiment of the present invention includes OFDM receivers 3311, 3312, channel estimation units 3321, 3322, time deinterleavers 3331, 3332, a cell re-exchanger 3610, core layer BICM decoders 3351, 3352, enhanced layer BICM decoders 3361, 3362, an enhanced layer stream combiner 3370 and a core layer stream combiner 3620.

The OFDM receiver 3311 receives the first receiving signal. The OFDM receiver 3312 receives the second receiving signal. Each of the OFDM receivers 3311 and 3312 may be the OFDM receiver 133 of FIG. 1.

The time deinterleaver 3331 generates the first time deinterleaving signal by applying time deinterleaving to the first receiving signal. The time deinterleaver 3332 generates the second time deinterleaving signal by applying time deinterleaving to the second receiving signal. Each of the time deinterleaver 3331 and 3332 may be the time deinterleaver 510 of FIG. 8.

The cell re-exchanger 3610 performs a cell re-exchange corresponding to output signals of the time deinterleavers 3331 and 3332.

The core layer BICM decoder 3351 restores the first core layer signal (CL Output Stream A) from the signal corresponding to the first receiving signal. The core layer BICM decoder 3352 restores the second core layer signal (CL Output Stream B) from the signal corresponding to the second receiving signal. Each of the core layer BICM decoders 3351 and 3352 may be the core layer BICM decoder 520 of FIG. 8.

The enhanced layer BICM decoder 3361 restores the first enhanced layer partitioned signal (EL Output Stream 1) based on cancellation corresponding to the first core layer signal. The enhanced layer BICM decoder 3362 restores the second enhanced layer partitioned signal (EL Output Stream 2) based on cancellation corresponding to the second core layer signal. Each of the enhanced layer BICM decoders 3361 and 3362 may be the enhanced layer BICM decoder 540 of FIG. 8.

The enhanced layer stream combiner 3370 generates the enhanced layer stream by combining the first enhanced layer partitioned signal (EL Output Stream 1) and the second enhanced layer partitioned signal (EL Output Stream 1).

The core layer stream combiner 3620 generates the core layer stream by combining the first core layer signal (CL output Stream 1) and the second core layer signal (CL Output Stream 2).

In this case, the OFDM receivers 3311 and 3312 may use the same frequency band.

The fixed broadcast signal receiver of FIG. 36 performs the LDM cancellation process twice for the enhanced layer recovery. Moreover, the fixed broadcast signal receiver of FIG. 36 includes a second stream combiner for the enhanced layer in comparison with the mobile receiver of FIG. 35.

Figure 37:
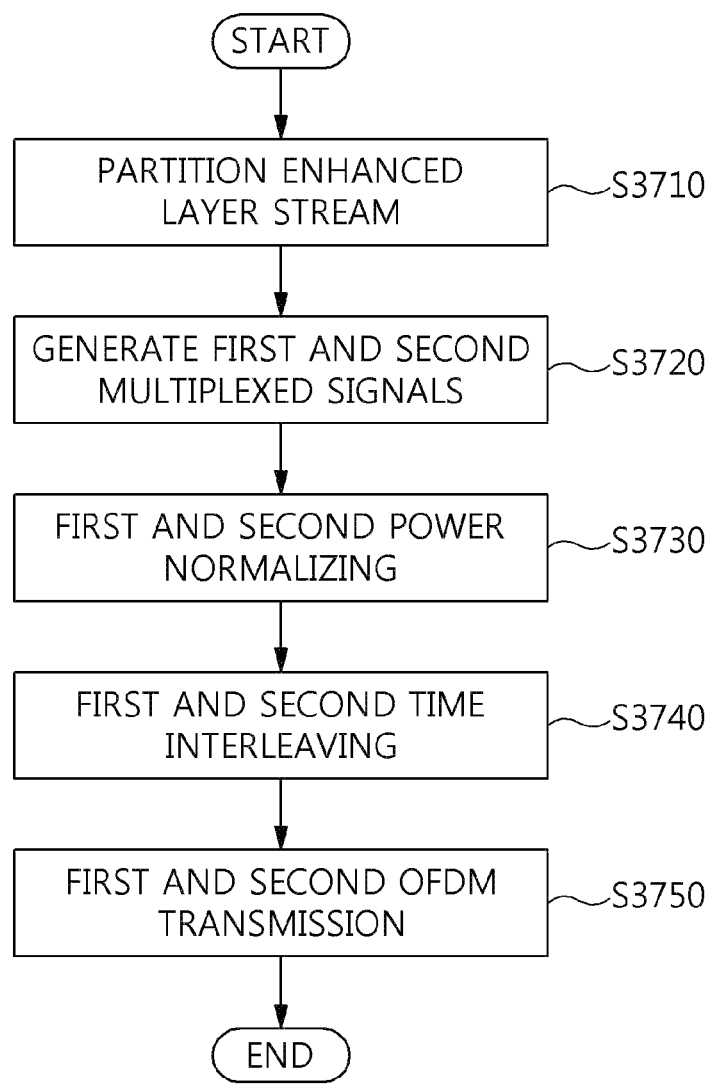
FIG. 37 is an operation flowchart showing a method of transmitting broadcast signal according to an embodiment of the present invention.

FIG. 37 is an operation flowchart showing a method of transmitting broadcast signal according to an embodiment of the present invention.

Referring to FIG. 37, in the method of transmitting broadcast signal according to the embodiment of the present invention, the first enhanced layer partitioned signal and the second enhanced layer partitioned signal are generated by partitioning the enhanced layer stream at step S3710.

Furthermore, in the method according to the embodiment of the present invention, the first multiplexed signal corresponding to the first enhanced layer partitioned signal and the second multiplexed signal corresponding to the second enhanced layer partitioned signal are generated at step S3720.

Furthermore, in the method according to the embodiment of the present invention, the powers of the first and second multiplexed signals are reduced to power levels corresponding to the first core layer signal and the second core layer signal, respectively, at step S3730.

Furthermore, in the method according to the embodiment of the present invention, the first time interleaved signal corresponding to the first enhanced layer partitioned signal and the second time interleaved signal corresponding to the second enhanced layer partitioned signal are generated at step S3740.

Furthermore, in the method according to the embodiment of the present invention, the signals corresponding to the first time interleaved signal and the second time interleaved signal are transmitted using an OFDM communication scheme at step S3750.

In this case, at step S3720, the first multiplexed signal may be generated by combining the first core layer signal and the first enhanced layer partitioned signal at different power levels, and the second multiplexed signal may be generated by combining the second core layer signal and the second enhanced layer partitioned signal at different power levels.

In this case, the first core layer signal and the second core layer signal may be independent from each other.

Although not explicitly shown in FIG. 37, the method may further include the step of distributing odd and even cells from the output signals of the step S3730.

Although not explicitly shown in FIG. 37, the method may further include the step of generating the first core layer signal and the second core layer signal by partitioning a core layer stream.

In this case, the step S3750 may use the same frequency band.

In channel bonding, data of a single PLP connection is spread over two or more different RF channels. In this case, the channel bonding may be used for improving service data rates and may be used to exploit the frequency diversity among multiple RF channels. A plurality of RF channels used for channel bonding may be located at adjacent channel frequencies or not necessarily adjacent to each other.

Figure 38:
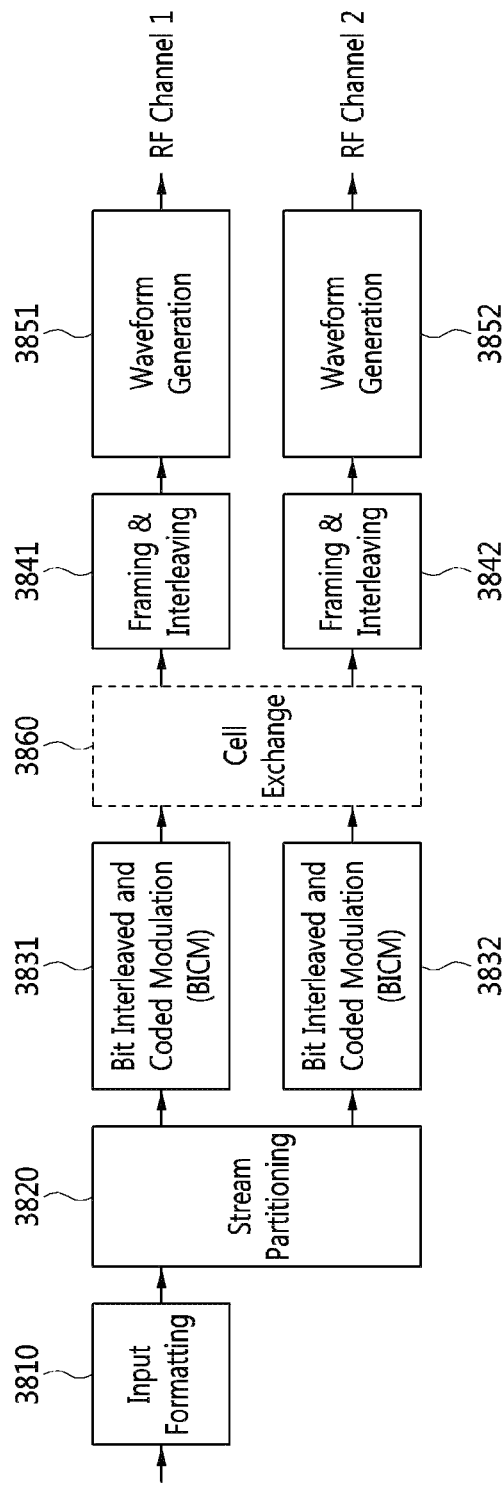
FIG. 38 is a block diagram showing one exemplarily embodiment of an apparatus for transmitting broadcast signal to which channel bonding is applied.

FIG. 38 is a block diagram showing one exemplarily embodiment of an apparatus for transmitting broadcast signal to which channel bonding is applied.

Referring to FIG. 38, the apparatus for transmitting broadcast signal includes an input formatting unit 3810, a stream partitioner 3820, BICM units 3831 and 3832, framing/interleaving units 3841 and 3842, and waveform generators 3851 and 3852. The apparatus for transmitting broadcast signal may further include a cell exchanger 3860 when SNR averaging channel bonding is applied.

Although only the structure of the transmitting apparatus is illustrated in FIG. 38, a receiving apparatus corresponding to the transmitting apparatus of FIG. 38 may also be clearly explained from the structure illustrated in FIG. 38.

The input formatting unit 3810 generates baseband packets corresponding to a plurality of packet types using data corresponding to a single physical layer pipe.

The baseband packet generation and the BB header insertion operation of the input formatting unit 3810 have already been described above. In this case, the extension field of the baseband packet header may be used as a counter for correctly reordering baseband packets transmitted through different RF channels at the receiver.

In this case, the packet types may be one-to-one mapped to RF channels to be channel bonded. That is, the packet types may be for distinguishing packets transmitted through different RF channels. In this case, a baseband packet corresponding to a specific packet type may have the same length as a baseband packet corresponding to another packet type or may have a different length from the baseband packet corresponding to another packet type. For example, the packet type may be distinguished (identified) by a combination of an RF channel identifier L1D_rf_id and a physical layer pipe identifier L1D_plp_id.

In this case, the input formatting unit 3810 may generate baseband packets corresponding to one of the plurality of packet types using a baseband packet length corresponding to BICM parameters for one of the RF channels RF Channel 1 and RF Channel 2.

In this case, the BICM parameters may include at least one of a FEC type parameter, a code rate parameter and/or a modulation parameter corresponding to the one of the RF channels.

In this case, the FEC type parameter L1D_plp_fec_type may be a 4-bit parameter and may indicate a forward error correction method.

For example, L1D_plp_fec_type which is "0000" may indicate that BCH and 16200 LDPC are used as the forward error correction method, L1D_plp_fec_type which is "0001" may indicate that BCH and 64800 LDPC are used as the forward error correction method, L1D_plp_fec_type which is "0010" may indicate that CRC and 16200 LDPC are used as the forward error correction method, L1D_plp_fec_type which is "0011" may indicate that CRC and 64800 LDPC are used as the forward error correction method, L1D_plp_fec_type which is "0100" may indicate that only 16200 LDPC is used as the forward error correction method, and L1D_plp_fec_type which is "0101" may indicate that only 64800 LDPC is used for the forward error correction method.

In this case, BCH indicates Bose, Chaudhuri, Hocquenghem, CRC indicates Cyclic Redundancy Check, and LDPC indicates Low-Density Parity Check.

In this case, the code rate parameter L1D_plp_code may be a 4-bit parameter and may indicate a code rate.

For example, L1D_plp_code which is "0000" may indicate that the code rate is 2/15, L1D_plp_code which is "0001" may indicate that the code rate is 3/15, L1D_plp_code which is "0010" may indicate that the code rate is 4/15, L1D_plp_code which is "0011" may indicate that the code rate is 5/15, L1D_plp_code which is "0100" may indicate that the code rate is 6/15, L1D_plp_code which is "0101" may indicate that the code rate is 7/15, L1D_plp_code which is "0110" may indicate that the code rate is 8/15, L1D_plp_code which is "0111" may indicate that the code rate is 9/15, L1D_plp_code which is "1000" may indicate that the code rate is 10/15, L1D_plp_code which is "1001" may indicate that the code rate is 11/15, L1D_plp_code which is "1010" may indicate that the code rate is 12/15, and L1D_plp_code which is "1011" may indicate that the code rate is 13/15.

In this case, the modulation parameter L1D_plp_mode may be a 4-bit parameter and may indicate a modulation scheme.

For example, L1D_plp_mode which is "0000" may indicate QPSK, L1D_plp_mode which is "0001" may indicate 16QAM-NUC, L1D_plp_mode which is "0010" may indicate 64QAM-NUC, L1D_plp_mode which is "0011" may indicate 256QAM-NUC, L1D_plp_mode which is "0100" may indicate 1024QAM-NUC, and L1D_plp_mode which is "0101" may indicate 4096QAM-NUC. In this case, QPSK indicates Quadrature Phase Shift Keying, QAM indicates Quadrature Amplitude Modulation, and NUC indicates Non-Uniform Constellation.

The stream partitioner 3820 partitions the baseband packets into a plurality of partitioned streams corresponding to the plurality of packet types. The stream partitioner 3820 has already been described above with reference to FIG. 26 or 28. In this case, the partitioned streams may be identified by a combination of the RF channel identifier L1D_rf_id corresponding to one of the RF channels RF Channel 1 and RF Channel 2, and the physical layer pipe identifier L1D_plp_id corresponding to the single physical layer pipe.

In this case, the input formatting unit 3810 may decide the number ($N_{BBpacket}$) of consecutive baseband packets for each of the packet types, and may allocate consecutively as many baseband packets as the number of consecutive baseband packets corresponding to each of the packet types.

In this case, the stream partitioner 3820 may perform partitioning using the number of consecutive baseband packets corresponding to each of the packet types.

At the output of the stream partitioner 3820, the baseband packets of the bonded PLP for each of the two partitioned streams are FEC encoded, interleaved and modulated individually and transmitted on different RF channels.

In particular, for plane channel bonding, the two transmission chains operates without any interaction after the stream partitioner 3820. In this case, each RF channel may use different parameter settings such as bandwidth, modulation, coding, FFT, guard interval length, and so on. Each RF channel is effectively handled as a standalone signal.

When bonded RF channels are configured with different BICM parameters for a channel bonded PLP, the baseband packets for that channel bonded PLP may have a different length on each of those bonded RF channels. When the baseband packet is generated for the channel bonded PLP, the input formatting unit 3810 shall use the baseband packet length corresponding to the channel bonded PLP's BICM parameters for the RF channel over which that baseband packet will be processed and transmitted.

In this case, the stream partitioner 3820 may allocate no more than 5 consecutive baseband packets to the same RF channel.

In this case, the baseband packets may include baseband packets corresponding to two or more different baseband packet lengths.

Each of the BICM units 3831 and 3832 performs error correction encoding, interleaving and modulation corresponding to each of the plurality of partitioned streams. The BICM units 3831 and 3832 have already been explained above with reference to FIG. 26 or 28.

In this case, the BICM units 3831 and 3832 may perform the error correction encoding, the interleaving and the modulation for each of the plurality of partitioned streams individually.

The cell exchanger 3860 exchanges cells corresponding to two RF channels RF Channel 1 and RF Channel 2 shown in FIG. 38. The cell exchanger 3860 has been explained above with reference to FIG. 24, 26 or 28.

Each of the framing/interleaving units 3841 and 3842 performs framing and interleaving operation corresponding to each of the two RF channels RF Channel 1 and RF Channel 2. In this case, each of the framing/interleaving units 3841 and 3842 may include TI block, Framer block and FI block explained through FIG. 26 or 28.

Each of the waveform generators 3851 and 3852 generates RF transmission signal corresponding to each of the plurality of partitioned streams. In this case, each of the waveform generators 3851 and 3852 may include the PP block and the OFDM generation explained thorough FIG. 26 or FIG. 28.

Figure 39:
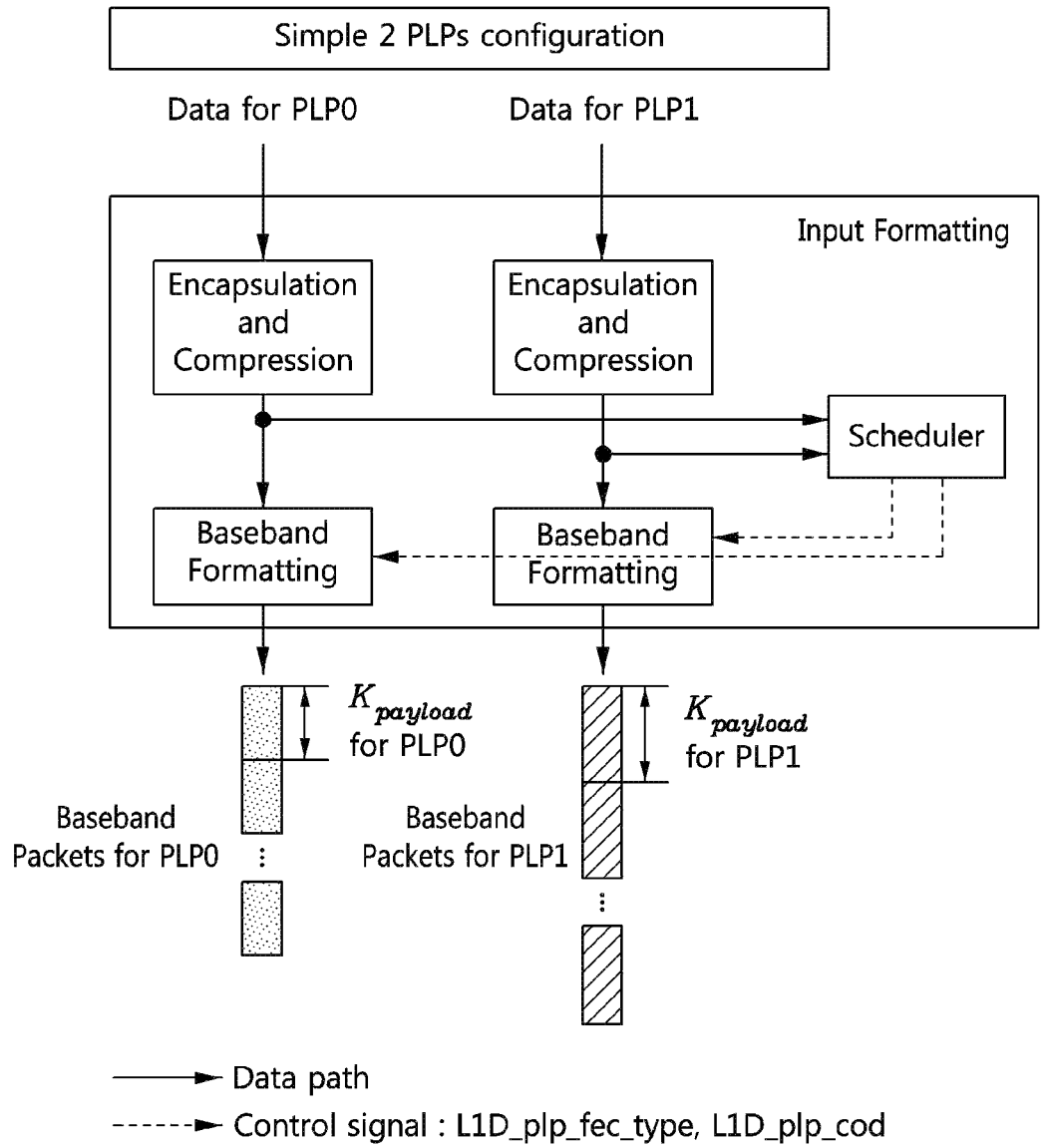
FIG. 39 is a block diagram showing a case in which the input formatting unit of FIG. 38 generates baseband packets for two PLPs.

FIG. 39 is a block diagram showing a case in which the input formatting unit of FIG. 38 generates baseband packets for two PLPs.

Referring to FIG. 39, the input formatting unit 3810 of FIG. 38 generates baseband packets corresponding to two physical layer pipes PLP0 and PLP1.

$K_{payload}$ in FIG. 39 indicates the length of the baseband packet. In this case, FEC frame may be generated by adding parity bits to the bit string corresponding to $K_{payload}$.

$K_{payload}$ of each physical layer pipe may be decided by a FEC type parameter L1D_plp_fec_type and a code rate parameter L1D_plp_cod among the BICM parameters In general, each combination of the FEC type parameter L1D_plp_fec_type and the code rate parameter L1D_plp_cod creates different $K_{payload}$.

However, when CRC is used for outer code, $K_{payload}$ may be the same for different combination of the FEC type parameter L1D_plp_fec_type and the code rate parameter L1D_plp_cod. That is, different combination of the FEC type parameter L1D_plp_fec_type and the code rate parameter L1D_plp_cod may result in different baseband packet length in general, but there may be a case in which $K_{payload}$ is the same. For example, $K_{payload}$ is 8608 for the code length of 64800 and the code rate of 2/15, and $K_{payload}$ is 8608 ($K_{payload}$ is the same) for the code length of 16200 and the code rate of 8/15 when CRC is used for outer code. For example, $K_{payload}$ is 12928 for the code length of 64800 and the code rate of 3/15, and $K_{payload}$ is 12928 ($K_{payload}$ is the same) for the code length of 16200 and the code rate of 12/15 when CRC is used for outer code.

Figure 40:
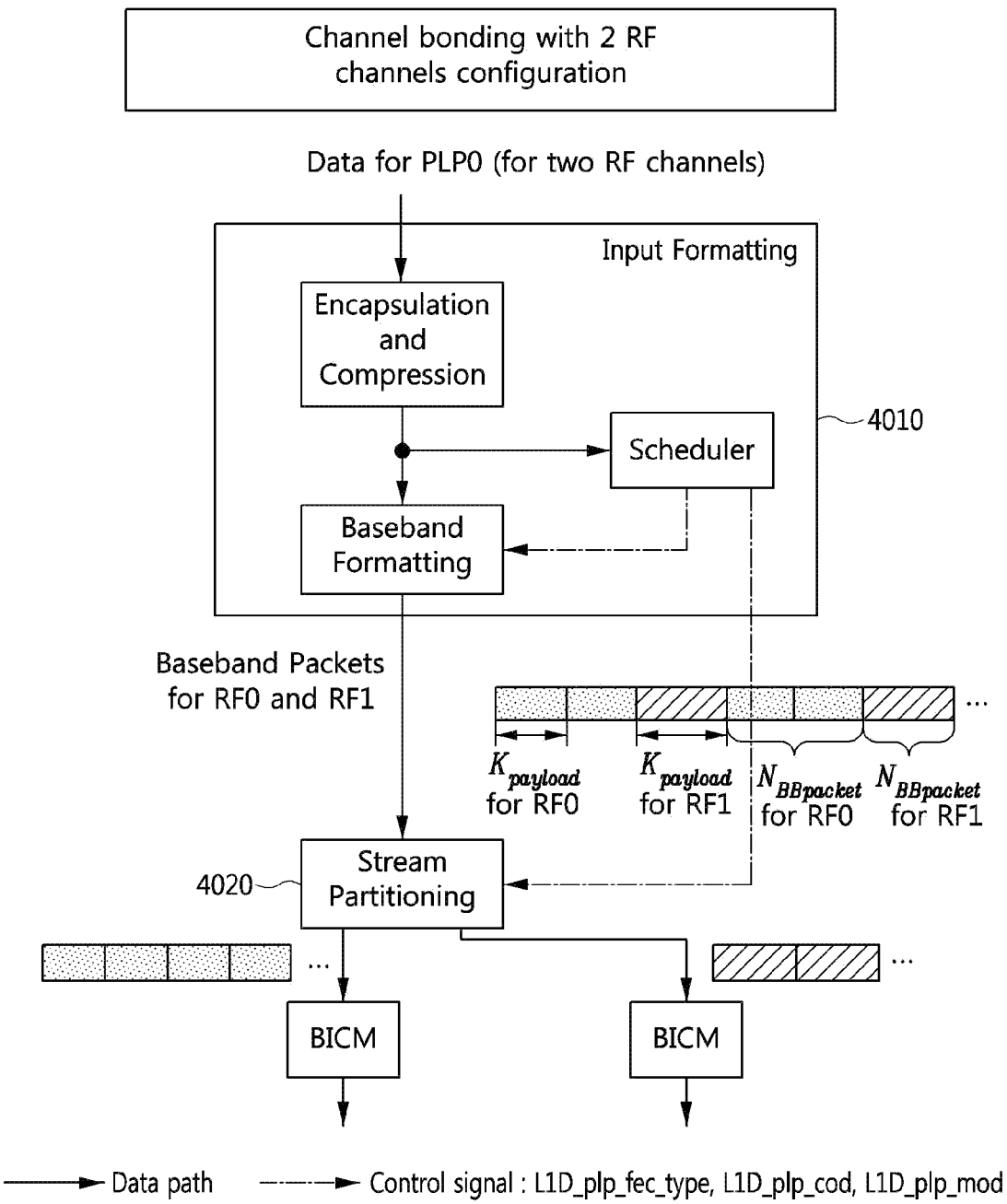
FIG. 40 is a block diagram showing a case in which the input formatting unit of FIG. 38 channel-bonds two RF channels.

FIG. 40 is a block diagram showing a case in which the input formatting unit of FIG. 38 channel-bonds two RF channels.

Referring to FIG. 40, the input formatting unit 4010 generates baseband packets corresponding to a plurality of packet types, and the stream partitioner 4020 partitions the baseband packets for each packet type. In this case, the packet type may indicate the RF channel through which the corresponding packets are to be transmitted. For example, the baseband packet lengths may be different for different packet types, and the same baseband packet length may be used for different packet types.

In this case, the baseband packets which are generated by the input formatting unit 4010 may include baseband packets with different lengths. For example, the baseband packet for the second RF channel and the baseband packet for the first RF channel may have the same length.

In an example of FIG. 40, the input formatting unit 4010 may correspond to the input formatting unit 3810 in FIG. 38, and the stream partitioner 4020 may correspond to the stream partitioner 3820 of FIG. 38.

When channel bonding is used, the input formatting unit 4010 may use a modulation parameter L1D_plp_mod as well as a FEC type parameter L1D_plp_fec_type and a code rate parameter L1D_plp_cod. In this case, the modulation parameter L1D_plp_mod may be used in order to keep transmission cell rate for each RF channel the same.

In this case, $N_{BBpacket}$ may indicate the number of consecutive baseband packets for each RF channel. That is, $N_{BBpacket}$ for each RF channel may be defined as the number of consecutive baseband packets for each RF channel in output stream of the input formatting unit 4010. In an example of FIG. 40, $N_{BBpacket}$ for the RF channel RF0 may be 2 and $N_{BBpacket}$ for the RF channel RF1 may be 1. In this case, the ratio of $N_{BBpacket}$ for the RF channel RF0 and $N_{BBpacket}$ for the RF channel RF1 may be decided by the ratio of code length×modulation order for each RF channel.

For example, the ratio of $N_{BBpacket}$ of the RF channel RF0 and $N_{BBpacket}$ of the RF channel RF1 may be 2:1 when the code length is 64800 and the modulation order is 2 (QPSK) for the RF channel RF0 and the code length is 16200 and the modulation order is 4 (16QAM) for the RF channel RF1. That is, $N_{BBpacket}$ for RF0:$N_{BBpacket}$ for RF1=64800×2: 16200×4=2:1.

As shown in the example of FIG. 40, when $N_{BBpacket}$ of the RF channel RF0 is decided to 2 and $N_{BBpacket}$ of the RF channel RF1 is decided to 1, the input formatting unit 4010 illustrated in FIG. 40 assigns two baseband packets for the RF channel RF0 and assigns one baseband packet for the RF channel RF1, and then assigns two baseband packets for the RF channel RF0 and assigns one baseband packet for the RF channel RF1, and these operations are repeated.

The stream partitioner 4020 may extract the baseband packets only for each channel from the output stream of the input formatting unit 4010 and assign the extracted baseband packets properly to the BICM unit for each RF channel if the stream partitioner 4020 knows the ratio (2:1) of $N_{BBpacket}$s for RF channels.

In FIG. 40, the cell rates of the two RF channels are equally adjusted but $N_{BBpacket}$ corresponding to each RF channel may be set regardless of the cell rate when plane channel bonding is applied.

Figure 41:
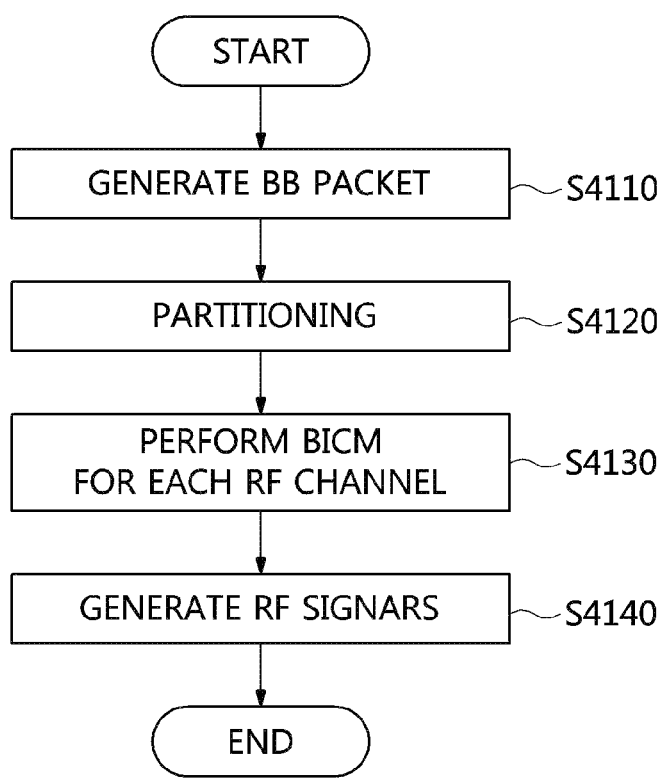
FIG. 41 is an operation flowchart showing a method of transmitting broadcast signal using channel bonding according to an embodiment of the present invention.

FIG. 41 is an operation flowchart showing a method of transmitting broadcast signal using channel bonding according to an embodiment of the present invention.

Referring to FIG. 41, the method of transmitting broadcast signal using channel bonding according to an embodiment of the present invention generates broadband packets corresponding to a plurality of packet types using data corresponding to a physical layer pipe (S4110).

In this case, the packet types may be one-to-one mapped to RF channels to be channel bonded.

In this case, the step S4110 may generate baseband packets corresponding to one of the plurality of packet types using a baseband packet length corresponding to BICM parameters for one of the RF channels.

In this case, the BICM parameters may include at least one of a FEC type parameter, a code rate parameter and/or a modulation parameter corresponding to the one of the RF channels.

In this case, the step S4110 may decide the number ($N_{BBpacket}$) of consecutive baseband packets for each of the packet types, and allocate consecutively as many baseband packets as the number of consecutive baseband packets corresponding to each of the packet types.

In this case, the baseband packets may include baseband packets corresponding to two or more different baseband packet lengths.

Further, the method of transmitting broadcast signal partitions the baseband packet into a plurality of partitioned streams corresponding to the plurality of packet types (S4120).

In this case, the step S4120 may be performed using the number of consecutive baseband packets corresponding to each of the packet types.

In this case, the step S4120 may allocate no more than 5 consecutive baseband packets to the same RF channel.

In this case, the partitioned streams may be identified corresponding to a combination of a RF channel identifier (L1D_rf_id) corresponding to one of the RF channels and a physical layer pipe identifier (L1D_plp_id) corresponding the physical layer pipe.

Further, the method of transmitting broadcast signal performs error correction encoding, interleaving and modulation corresponding to each of the plurality of partitioned streams (S4130).

In this case, the step S4130 may be performed individually for each of the plurality of partitioned streams.

Further, the method of transmitting broadcast signal generates RF transmission signals corresponding to the plurality of partitioned streams, respectively (S4140).

As described above, the apparatus and method for transmitting/receiving broadcasting signal according to the present invention are not limited to the configurations and methods of the aforementioned embodiments, but some or all of the embodiments may be selectively combined such that the embodiments are modified in various manners.

The invention claimed is:

1. An apparatus of receiving a broadcast signal, comprising:
    RF receiving units configured to receive RF transmission signals transmitted by using channel bonding of multiple RF channels; and
    a stream combiner configured to generate data corresponding to a single physical layer pipe (PLP) using a plurality of partitioned streams corresponding to a plurality of packet types,
    wherein the plurality of partitioned streams correspond to baseband packets corresponding to the plurality of packet types,
    wherein the channel bonding is performed in one of a plain channel bonding mode and a SNR averaging channel bonding mode, and cell exchanging is used for the SNR averaging channel bonding mode and the cell exchanging is not used for the plane channel bonding mode,
    wherein the channel bonding spreads data of the single physical layer pipe across the multiple RF channels, and
    wherein baseband packets corresponding to one of the plurality of packet types are generated by using a baseband packet length corresponding to BICM parameters for one of the multiple RF channels and no more than five consecutive baseband packets are assigned to the same RF channel when the plain channel bonding mode is used.

2. The apparatus of claim 1, wherein the BICM parameters includes any one or any combination of any two or more of a FEC type parameter, a code rate parameter and a modulation parameter corresponding to the one of the multiple RF channels.

3. The method of claim 1, wherein the baseband packets are generated by using a number of consecutive baseband packets for each of the plurality of packet types.

4. The method of claim 1, wherein the baseband packets includes baseband packets corresponding to two or more different baseband packet lengths.

5. The method of claim 1, wherein the plurality of partitioned streams are identified corresponding to a combination of a RF channel identifier corresponding to one of the multiple RF channels and a physical layer pipe identifier corresponding the single physical layer pipe.

6. A method of receiving a broadcast signal, comprising:
    receiving RF transmission signals transmitted by using channel bonding of multiple RF channels; and generating data corresponding to a single physical layer pipe (PLP) using a plurality of partitioned streams corresponding to a plurality of packet types, wherein the plurality of partitioned streams correspond to baseband packets corresponding to the plurality of packet types, wherein the channel bonding is performed in one of a plain channel bonding mode and a SNR averaging channel bonding mode, and cell exchanging is used for the SNR averaging channel bonding mode and the cell exchanging is not used for the plane channel bonding mode, wherein the channel bonding spreads data of the single physical layer pipe across the multiple RF channels, and wherein baseband packets corresponding to one of the plurality of packet types are generated by using a baseband packet length corresponding to BICM parameters for one of the multiple RF channels and no more than five consecutive baseband packets are allocated to the same RF channel when the plain channel bonding mode is used.

* * * * *